US00RE38640E1

(19) United States
(12) Reissued Patent
Jundt

(10) Patent Number: US RE38,640 E
(45) Date of Reissued Patent: Oct. 26, 2004

(54) PROCESS CONTROL TERMINAL

(75) Inventor: Larry O. Jundt, Round Rock, TX (US)

(73) Assignee: Fisher-Rosemount Systems, Inc., Austin, TX (US)

(21) Appl. No.: 08/527,886

(22) Filed: Sep. 14, 1995

Related U.S. Patent Documents

Reissue of:
(64) Patent No.: 5,006,976
Issued: Apr. 9, 1991
Appl. No.: 07/314,549
Filed: Feb. 23, 1989

U.S. Applications:
(63) Continuation of application No. 08/045,034, filed on Apr. 8, 1993, now abandoned.

(51) Int. Cl.[7] ..... G05B 9/02

(52) U.S. Cl. ..... 700/79; 700/9; 700/80

(58) Field of Search ..... 364/188, 189, 364/146, 474.22, 184, 185; 700/17, 79, 80, 9, 84, 85, 180

(56) References Cited

U.S. PATENT DOCUMENTS 3,971,000 A * 7/1976 Cromwell ..... 700/84
4,135,662 A * 1/1979 Dlugos ..... 714/46
4,270,185 A * 5/1981 Cohen et al. ..... 711/167
4,303,973 A * 12/1981 Williamson, Jr. et al. ... 364/189
4,412,294 A * 10/1983 Watts et al. ..... 364/518
4,451,701 A * 5/1984 Bendig ..... 379/96
4,543,567 A * 9/1985 Shirata et al. ..... 340/519
4,550,386 A * 10/1985 Hirosawa et al. ..... 364/900
4,555,775 A * 11/1985 Pike ..... 364/900
4,588,987 A * 5/1986 Stephens ..... 340/525
4,621,319 A * 11/1986 Braun et al. ..... 364/200
4,644,478 A * 2/1987 Stephens et al. ..... 702/188
4,761,642 A * 8/1988 Huntzinger ..... 340/721
4,803,039 A * 2/1989 Impink, Jr. et al. ..... 364/188
4,829,294 A * 5/1989 Iwami et al. ..... 340/723
4,853,175 A * 8/1989 Book, Sr. ..... 376/216
4,858,152 A * 8/1989 Estes ..... 702/186
5,065,343 A * 11/1991 Inoue ..... 345/558

* cited by examiner

*Primary Examiner*—Emanuel Todd Voeltz
(74) *Attorney, Agent, or Firm*—Kinney & Lange, P.A.

(57) ABSTRACT

A process control terminal may be used in a computer network consisting of a process control network of process controllers and an application network of host computers. The process control terminal allows a process control operator access to both process control functions and application programs being executed by a host computer. The process control terminal includes an Ethernet controller and it emulates a standard DEC terminal in order to facilitate its use in preexisting computer systems. The process control terminal displays information relating to process control functions in a first portion of its associated CRT screen and information relating to applications programs in a second portion of the CRT screen, the second portion being exclusive of the first portion so that process control information is not overwritten by applications information. The process control terminal also includes an automatic login feature that allows an operator to automatically login to an application program without typing a username or a password.

49 Claims, 37 Drawing Sheets

PROCESS CONTROL TERMINAL

Matter enclosed in heavy brackets [ ] appears in the original patent but forms no part of this reissue specification; matter printed in italics indicates the additions made by reissue.

*Notice: More than one reissue application has been filed for the reissue of Pat. No. 5,006,976. The reissue applications are application Nos. 08/045,034 now abandoned, and 08/527,886 (the present application) which is a continuation of application Ser. No. 08/045,034.*

BACKGROUND OF THE INVENTION

The present invention relates to a process control terminal, and more particularly to a process control terminal having the capability to simultaneously display process control information and other unrelated information in mutually exclusive portions of a display screen.

The field of process control relates to the interactive control of complicated processes such as chemical processes used in chemical and oil refineries, processes used in food processing, processes used in pulp and paper producing plants, etc. The typical variables that need to be controlled during such processes include temperatures, pressures, flow rates, and quantities.

In order to monitor and control such processes, process control networks are typically used. Such a network includes a number of process control terminals connected to a plurality of process controllers which monitor the processes. The process control terminals are monitored closely by operators, who may be required to respond quickly to visual alarm messages on the process control terminal screens. Such alarm messages may indicate dangerous or undesirable conditions, such as a dangerously high pressure or a temperature that is out of range, which could result in damage to the process control facility, such as rupture of a conduit or boiler, or in defective product.

The operator is also be required to respond to attention messages generated on the process control terminal screens. Such an attention message indicates the need for the operator to take a particular action, depending upon the particular message. For example, the supply of a chemical used in a process may be low. In this case, the process controller monitoring the supply of the chemical would transmit an electronic low supply message to the appropriate process control terminal, which would then show the corresponding visual message on the screen. The operator, upon seeing the message, would make sure that the particular chemical supply would be refilled.

When monitoring a process control terminal, an operator typically experiences relatively extended periods of time during which no alarm or attention messages are generated. As a result, the operator has nothing to do. Not only is this lack of duties an inefficient utilization of the operator's time, but the operator may become bored. One approach to remedying this problem might be to provide the operator with a separate computer and display screen so that the operator could perform additional tasks during his spare time. However, this approach suffers the drawback that another display screen and computer are required, resulting in the need for extra space as well as cost.

One general approach to a similar problem is described in U.S. Pat. No. 4,761,642 to Huntzinger. Huntzinger discloses a computer system which has the capability of simultaneously responding to multiple application programs being executed by a host computer. A single display terminal is connected to the computer system, and a window is shown for each active application program being executed by the host computer. The Huntzinger system has serious disadvantages in the context of process control terminals. One using the Huntzinger system may hide windows from view by "burying" one window behind another window so that portions of the buried window do not appear on the screen. Furthermore, the user may "collapse" a window, which causes the entire window to disappear from the screen, the only remnant of the collapsed window being a small icon displayed along the edge of the screen.

If used in a process control system, the Huntzinger system could have disastrous consequences. If the operator were to partially obscure one or more windows relating to process control, the operator might miss alarm or attention messages, which could result in damage to the process control facility or defective product. Moreover, the application of the Huntzinger system to the process control area would defeat the operator's primary responsibility, that of monitoring the process.

SUMMARY OF THE INVENTION

The present invention overcomes these and other disadvantages by providing a process control terminal which allows an operator to perform both process control functions and application functions which may be unrelated to process control functions. The application functions are performed in connection with a host computer connected to the process control terminal. To prevent application information for display on the screen of the process control terminal from overwriting process control information, including alarm messages, for display on the screen, the process control terminal reserves a first portion of the screen exclusively for process control information and a second portion of the screen exclusively for application information.

In a preferred embodiment, this feature of the invention is accomplished by adding a predetermined vertical pixel offset to the application information received from the host computer for display on screen of the process control terminal. As a result of the offset, the application information is guaranteed not to be displayed in the screen portion reserved for process control information including alarms.

In a preferred method in accordance with the invention, the process control terminal receives process control information from a process controller, determines the existence of an alarm condition, and displays process control information in a first screen portion reserved exclusively for process control information. The process control terminal also receives application information from a host computer and displays the application information in a second screen portion reserved exclusively for application information. As a result, of the mutually exclusive screen portions, application information cannot overwrite process control information and thus cause a process control operator to miss alarm conditions.

In another aspect, the process control terminal of the invention emulates a standard Digital Equipment Corporation (DEC) terminal so that the invention may be used in preexisting computer systems. A process control terminal in accordance with this aspect of the invention responds to various electronic signals the same way a standard DEC terminal would. For example, the process control terminal moves a cursor on the screen up in response to the receipt of the character "A" from the host computer; moves the cursor down in response to the receipt of the character "B"; erases a portion of a line of text in response to the receipt of the character "K"; deletes a portion of a line of text in response to the receipt of the character "M"; and draws a curve in response to the receipt of a character string including the character "C."

Another feature of the invention is an automatic login feature that allows an operator to login to a computer program without the need for typing in a username or password. This feature of the invention is accomplished by accessing a predetermined portion of memory in response to an operator login request. If the predetermined portion of memory contains login information, this login information is compared with preselected login information to determine whether access to the computer program should be granted. If the stored login information matches to the preselected login information, the operator is logged in to the computer program automatically without the need for the operator to type a username or password.

These and other objects, features, and advantages of the present invention will be apparent to those of ordinary skill in the art in view of the detailed description of the preferred embodiments, which is made with reference to the drawings, a brief description of which is provided below.

DETAILED DESCRIPTION OF A PREFERRED EMBODIMENT

Figure 1:
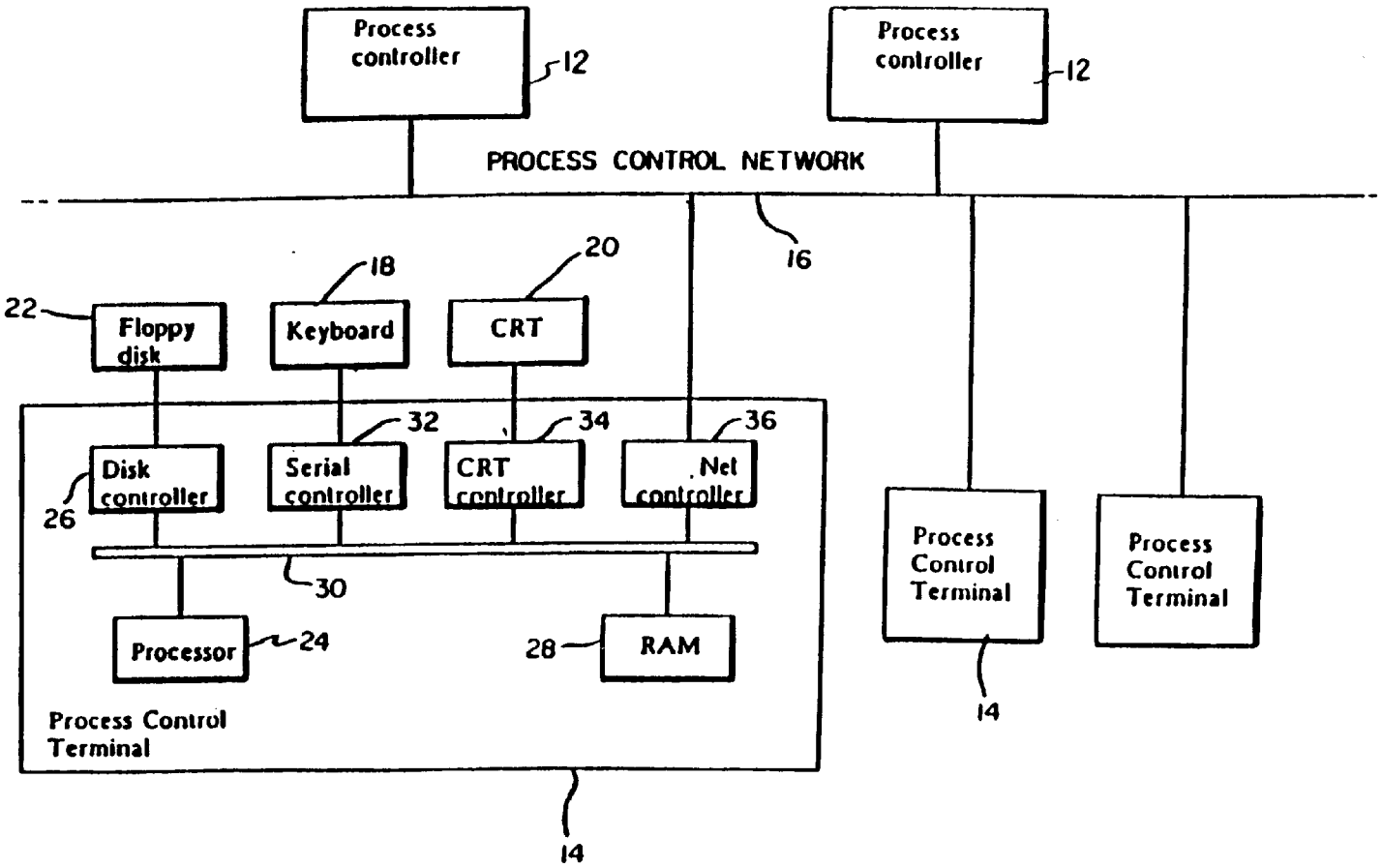
FIGURE 1 PRIOR ART
FIG. 1 is a block diagram of a prior art process control terminal network.

A prior art process control terminal network is shown in FIG. 1. This prior art network is described prior to the description of the preferred embodiment of the invention below to facilitate better understanding of the invention. Now referring to FIG. 1, a process control terminal network 10 includes a number of process controllers 12 connected to a number of process control terminals 14 by means of a link, such as a local area network 16. The process controllers 12 monitor and control various processes such as chemical processes, food processes, pulp and paper processes, etc. The controllers 12 monitor and control such variables as temperatures, pressures, flow rates, etc. so that the process being controlled is executed within specifications. Each controller 12 may monitor different processes or variables than the other controllers.

The process control terminals 14 facilitate the human interface between the process controllers 12 and the process control operators. One of the process control terminals 14 is shown in the left-hand portion of FIG. 1 to include a keyboard 18 for accepting operator input, a cathode ray tube (CRT) 20 for displaying information concerning the processes being controlled, and a floppy disk drive 22. The purpose of the disk drive 22 is to allow a computer program to be loaded into the terminal 14 to control its interaction with the process controllers 12.

The internal structure of the process control terminals 14 includes a processor 24 which controls the overall operation of the terminal 14 by means of a computer program. The processor 24 is connected to a disk controller 26 and to a random access memory (RAM) 28 by means of an internal bus 30. Each time the terminal 14 is turned on, the operator may input the computer program into the terminal 14 by means of the floppy disk drive 22, and the disk controller 26 then reads the program from the disk drive 22 and stores the program in the RAM 28 in a conventional fashion. A serial controller 32 is connected to the bus 30 to facilitate operator input via the keyboard 18. The serial controller 32 may also be connected to a serial printer (not shown) to facilitate written reports. A conventional CRT controller 34 is connected between the CRT and the internal bus 30 to control the display on the CRT screen. A conventional network controller 36 connected to the internal bus 30 facilitates communication between the terminal 14 and the process controllers 12.

Figure 2:
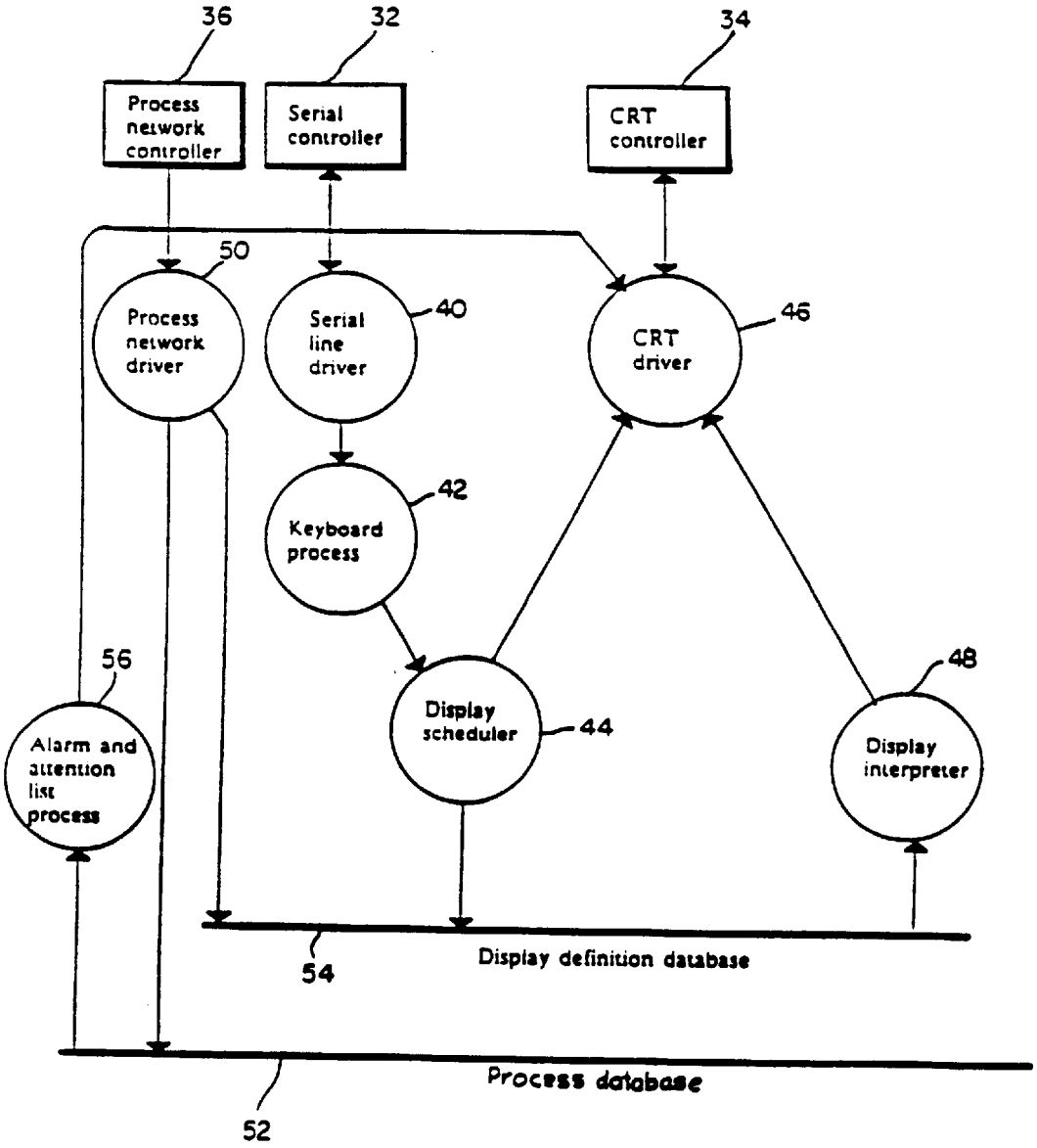
FIGURE 2 PRIOR ART
FIG. 2 is a block diagram of the overall computer software of a prior art process control terminal.

Now referring to FIG. 2, a portion of the process control terminal 14 of FIG. 1 and a prior art diagram of a number of computer program modules executed by the processor 24 are shown to include a serial line driver 40 connected to the serial controller 32. The serial line driver 40 is a conventional software module which passes electronic data representing the various keyboard characters input from the keyboard 18 to a keyboard process 42. The function of the keyboard process 42 is to react to the electronic data generated by the line driver 40 and send electronic messages to a display scheduler 44 and a CRT driver 46 in response. The display scheduler 44 controls which display is to be shown on the CRT screen, since more than one display may exist at a time in the RAM 28. The term "display" as used herein generally refers to the pictorial and textual information displayed, and not the physical CRT screen itself. The CRT driver 46 responds to electronic commands from the keyboard process 42, the display scheduler 44, and a display interpreter 48 by displaying the requested information on the CRT screen.

The network controller 36 is connected to a process network driver 50. The network driver 50 responds to commands from the network controller 36 to store data in and retrieve data from a process database 52 in the RAM 28. The process database 52 contains electronic data as to the current state of the various processes controlled by the process controllers 12 as well as alarm data relating to operator-selected alarm limits, such as high pressure or high temperature limits, for example. The network driver 50 also sends data to a display definition database 54 in the RAM 28. The display definition database 54 contains electronic data relating to the displays which may be shown on the CRT screen, which typically include pictorial representations in addition to text. Only one of the displays is shown at a time.

Finally, the process control terminal of FIG. 2 includes an alarm and attention list process 56 connected between the process database 52 and the CRT driver 46. The alarm and attention list process 56 periodically searches the alarm and attention linked lists created by the network driver 50, generates electronic alarm and attention messages in case alarm or attention conditions exist, and sends these messages to the CRT driver 46 to cause visual alarm and attention messages to appear on the CRT screen.

Figure 3:
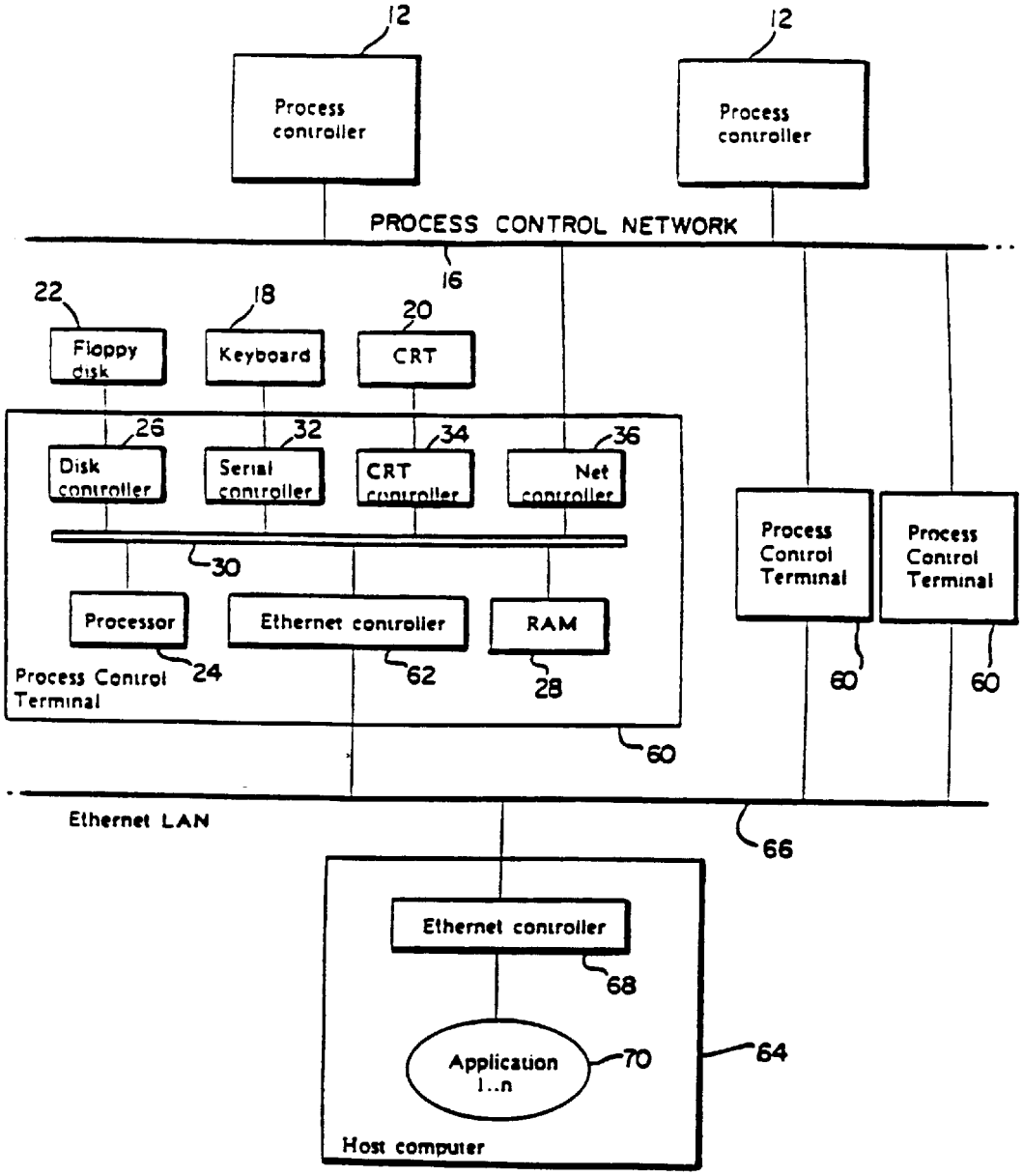
FIG. 3 is a block diagram of a process control terminal network in accordance with the present invention.

A process control terminal in accordance with the invention is used in a process control system shown in FIG. 3. The process control system of FIG. 3 is similar to the system described above in that it includes a network of process controllers 12 and process control terminals. However, the system of FIG. 3 also includes a host computer network connected to the process control network. The inclusion of the host computer network allows process control operators to monitor various processes as well as run application programs by means of a single process control terminal and its associated CRT screen. The elements shown in FIG. 3 which are substantially identical to the the corresponding elements of FIG. 1 are identified by like numerals; however, the process control terminal of FIG. 3 has been substantially modified in accordance with the invention, and thus is designated with a different numeral in FIG. 3 than in FIG. 1.

Now referring to FIG. 3, a process control terminal 60 in accordance with the invention is similar to the process control terminal 14 of FIG. 1. In particular, each of the hardware elements, including the processor 24, disk controller 26, RAM 28, internal bus 30, serial controller 32, CRT controller 34, and network controller 36, is substantially identical to the corresponding element of FIG. 1. However, the process control terminal 60 in accordance with the invention also includes an Ethernet controller 62 connected to the internal bus 30. The Ethernet controller 62, which is a conventional controller commercially available from Digital Equipment Corporation of Maynard, Mass., is connected to one or more conventional host computers 64 by means of an Ethernet local area network (LAN) 66. The host computer 64 includes a second conventional Ethernet controller 68 for communicating with the controller 62 of the terminal 60 in a conventional manner.

The host computer 64 has the capability to execute a number of application programs 70, the application programs being unrelated to the process control program and information normally associated with a process control terminal. The connection of the host computer network allows a process control operator to utilize application software that need not be related to the process he is controlling during any idle time he might have. The application programs would allow the operator to perform such tasks as issuing material requisitions, recording shift notes, logging hours, etc., or virtually any other task that can be performed in connection with a computer.

Figure 4:
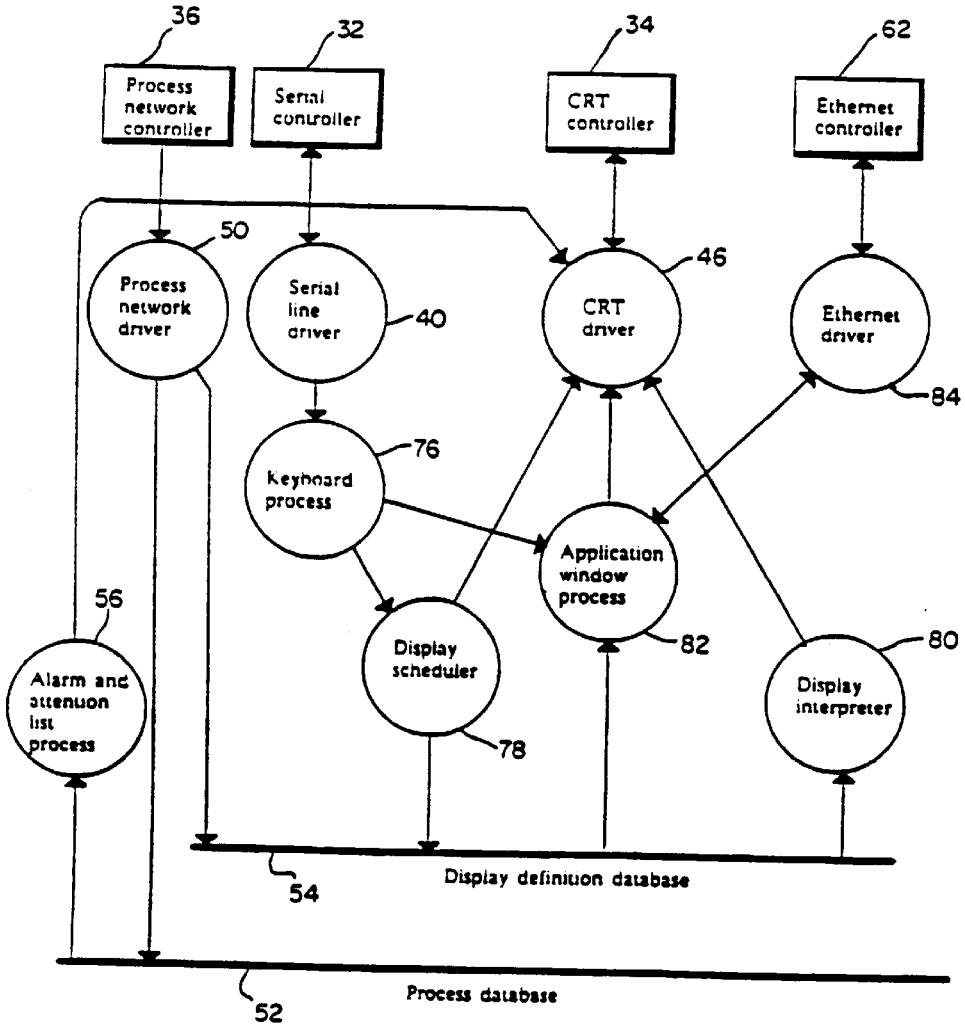
FIG. 4 is a block diagram of the overall computer software of a process control terminal in accordance with the present invention.

A portion of the process control terminal 60 and a diagram of a number of operating processes executed by the processor 24 are shown in FIG. 4. The elements shown in FIG. 4 which are substantially identical to the the corresponding elements of FIG. 2 are identified by like numerals; however, elements in FIG. 4 which are substantially different than the corresponding elements of FIG. 2 are identified below by different numerals.

Now referring to FIG. 4, the software modules that have been substantially modified in connection with the invention are a keyboard process 76, a display scheduler 78, and a display interpreter 80. An application window process 82 and a conventional Ethernet driver 84 have been added to the process control terminal 60. The Ethernet driver 84, which is a conventional software package commercially available from Digital Equipment Corporation, facilitates communication between the application window process 82 and the Ethernet controller 62.

The software modules shown in FIG. 4, which are described in detail below, control the overall operation of the process control terminal 60, including the displays shown on the CRT screen. An important feature of the invention lies in the control of the CRT screen. While the capability added to the process control terminal 60 which allows an operator to perform additional tasks unrelated to process control is itself advantageous, this added capability is carefully controlled so that it does not interfere with the most important duty of the process control operator, i.e. to monitor the process under control and quickly respond to alarm and attention messages. In particular, this feature of the invention causes the CRT screen to be controlled so that process control information and information relating to unrelated applications programs are displayed in mutually exclusive portions of the CRT screen. As a result, the process control operator cannot inadvertently bury a process control window and miss important alarm and attention messages as a result.

Figure 5:
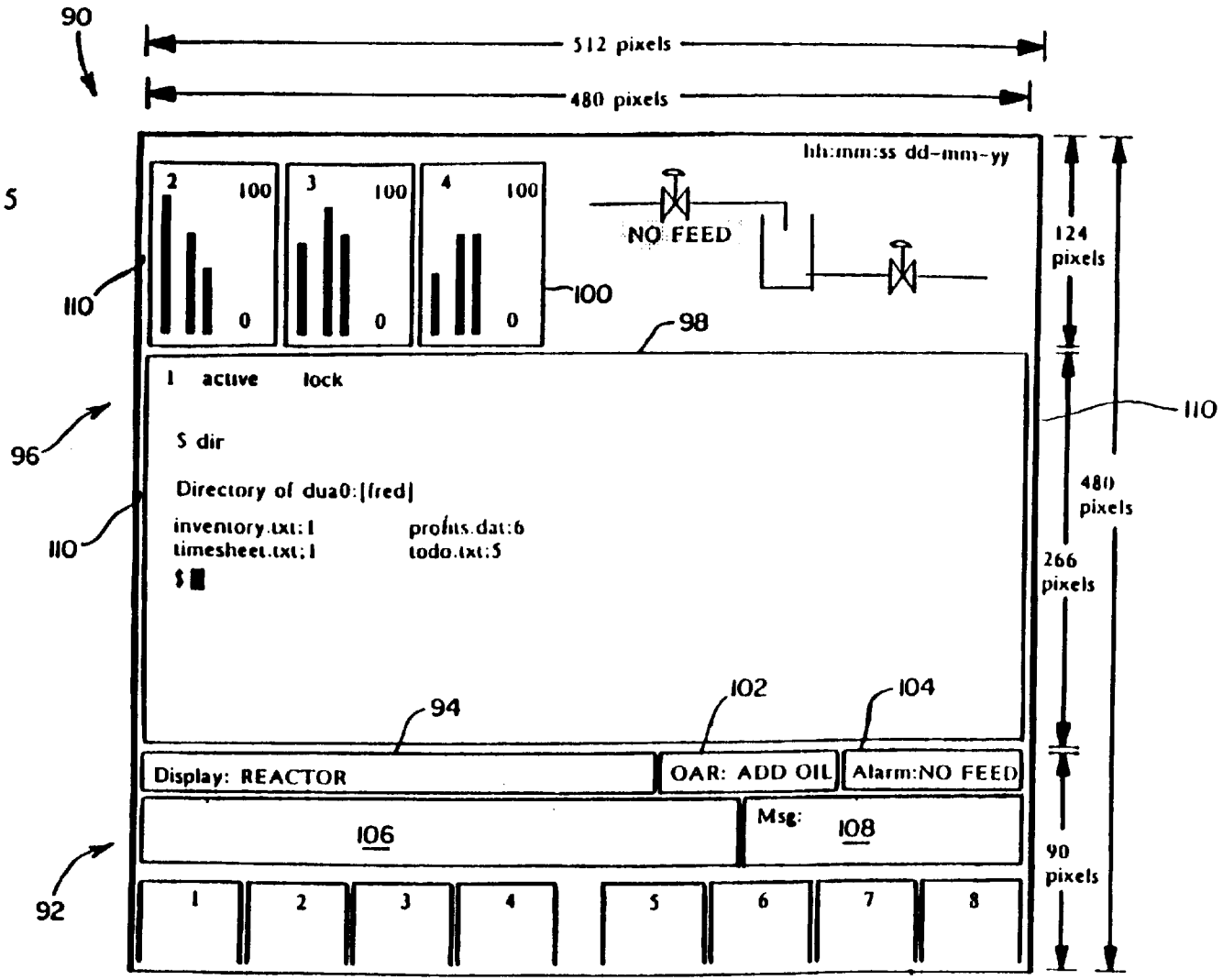
FIG. 5 is a display shown on the CRT screen of a process control terminal accordance with the invention.

Now referring to FIG. 5, one possible CRT display 90 in accordance with the invention is shown. The display 90 includes a first portion 92 that is reserved for process control information. This portion 92 lies at the lower portion of the screen and includes the lowest 90 pixels of the screen, as indicated on the right-hand side of FIG. 5. This portion 92 is dedicated to process control information, cannot be overwritten by application information, and cannot be made to disappear from the CRT screen, except by turning off the power to the process control terminal 60. In particular, this dedicated process control portion 92 may include a first window 94 which contains the name of the display currently being displayed in the upper portion 96 of the screen. This upper portion 96 consists of a 266 pixel application window 98 and another portion 124 pixels tall containing three additional windows 100. The process control portion 92 also contains an operator attention request (OAR) window 102 in which attention messages may be displayed and an alarm window 104 in which alarm messages may be displayed.

Beneath the windows 94, 102, 104 are an operator input window 106 for operator input concerning process control and a message window 108 for error messages.

The display shown in FIG. 5 has a pair of 16 pixel vertical blank borders 110 on either side of the application window 98. The entire display is 512 pixels wide and 480 pixels tall.

The display shown in FIG. 5 is one exemplary display. Additional displays may be stored in the RAM 28 and displayed on the CRT screen in response to an operator request. The displays which may be shown on the screen may vary. Some displays may not include the application window 98, and others may include the application window 98, but at a different location on the screen, such as at the very top. However, while the upper 390 pixel portion 96 of the screen may vary, the lower 90 pixel portion 92 is dedicated to process control information and will always contain the windows 94, 102, 104, 106, 108, including the alarm and attention windows 102, 104 at the same place on the screen. As a result, it is impossible for the operator to cause these windows to disappear, and thus the operator will not inadvertently miss an alarm or attention message.

As described in detail below, each screen display like the one in FIG. 5 is generated by a corresponding display list. The name of the display list of FIG. 5, which is shown in the window 94, is "Reactor." To change the display shown on the screen, the operator inputs the display number of the desired display in the window 106.

The operator may also input information to any of the upper windows 98, 100 on the display. To accomplish this, the operator types in the number of the desired window in the window 106. The window number of each window is displayed in the upper left-hand corner of the window. Thus, the application window 98 is window number 1. The window which is currently input active has a double box (not shown) surrounding the window.

While the application window 98 may be moved around in the upper portion 96 of the display, its size is fixed to correspond to a standard screen size of 24 lines of 80 characters per line. This size could be changed though.

The detailed description of the processes generally shown in FIG. 4 which accomplish the new functions relating to the interaction of the process control terminal 60 with the Ethernet network and the display of process control and application program information on the CRT screen follows.

Figure 6:
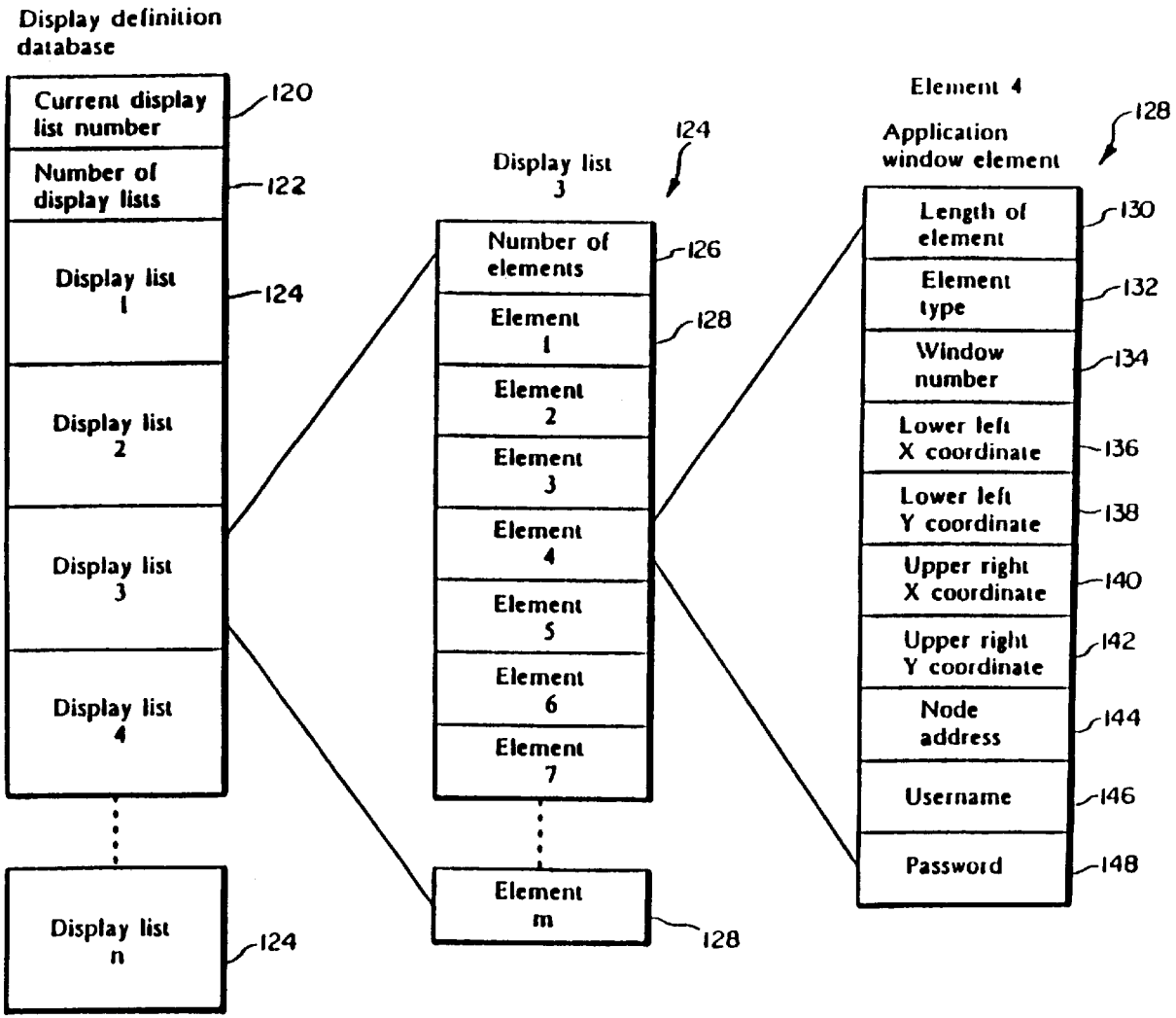
FIG. 6 is an illustration of the organization of the display definition database of FIG. 4.

Now referring to FIG. 6, the structure of the display definition database 54 of FIG. 4 is shown to include a number of memory portions, including a portion 120 which contains the current display list number, a portion 122 which specifies the number of display lists in the database 54, and a variable number of portions 124 each of which contains a respective display list 124. Each of the display lists 124 in the display definition database 54 corresponds to a CRT display, like the one shown in FIG. 5, and the selection of a particular display list from the database 54 by the operator causes the corresponding display to be shown on the CRT screen. The number of display lists which are stored in the database 54 is variable, depending on how the process control terminal 60 is programmed by the user. As described above, although there may be different display lists corresponding to different screen displays, only one of which appears on the CRT at a time, the process control window 92 never disappears from the screen, and thus is specified in each of the display lists 124.

In the middle portion of FIG. 6, a display list 124 is shown to include a number of memory portions, including a first memory portion 126 which stores the number of display elements in the display list 124, and other memory portions 128 which specify the particular display elements that make up the display list 124, and thus a particular display on the CRT screen. The display elements are relatively simple pictorial displays such as circles, boxes, symbols, etc.

A memory portion 128 of a display element corresponding to an application window is shown in detail in the right-hand portion of FIG. 6 and includes a first location 130 which includes the length of the display element, which corresponds to the number of memory locations which follow the first location 130. A memory location 132 contains a code which identifies the type of display element, which in this case would be an application window, and a location 134 specifies the window number. Four memory locations 136, 138, 140, 142 completely specify the size and location of the window by defining the X and Y coordinates of each corner of the window.

In an Ethernet network, each terminal and each host computer are assigned a unique node address to facilitate communication. Accordingly, a memory location 144 in the application window element 128 contains the node address of the host computer 64 which executes the application program corresponding to the application window element 128.

A memory location 146 contains an authorized username and a memory location 148 contains an authorized password for the application program which corresponds to the application window element 128. As described below, the memory locations 144–148 are optional, and are used in connection with an automatic login feature of the present invention.

Figure 7:
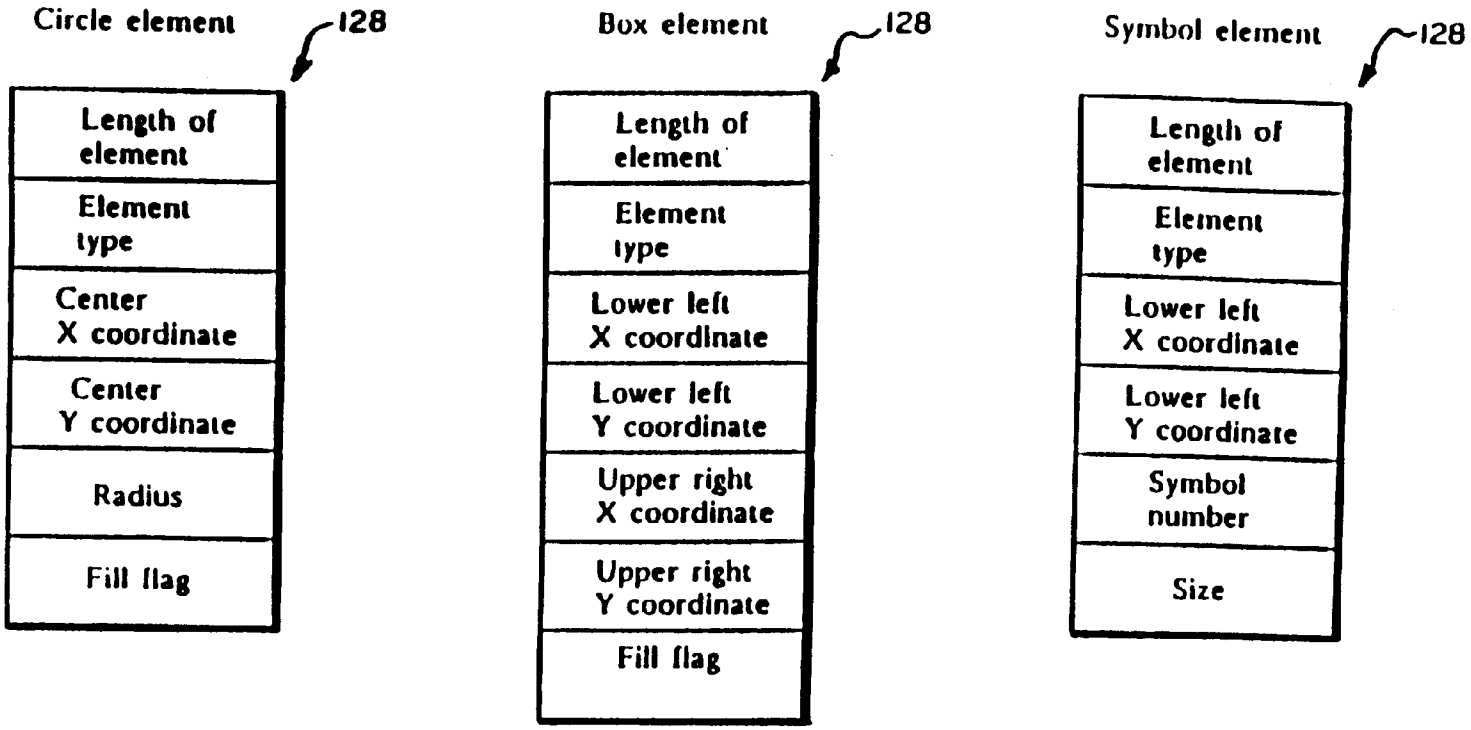
FIG. 7 is an illustration of several display elements of the type shown in FIG. 6.

The memory portions 128 corresponding to a circle display element, a box display element, and a symbol display element are shown in FIG. 7. Each of these memory portions 128 includes a first memory location specifying the number of following memory locations, a second memory location specifying the type of display element, and additional memory locations specifying the size and location of the display element. The memory portions 128 may include a memory location containing a fill flag, which specifies whether the interior of the display element should be illuminated or alternatively whether just its boundary should appear.

Figure 8:
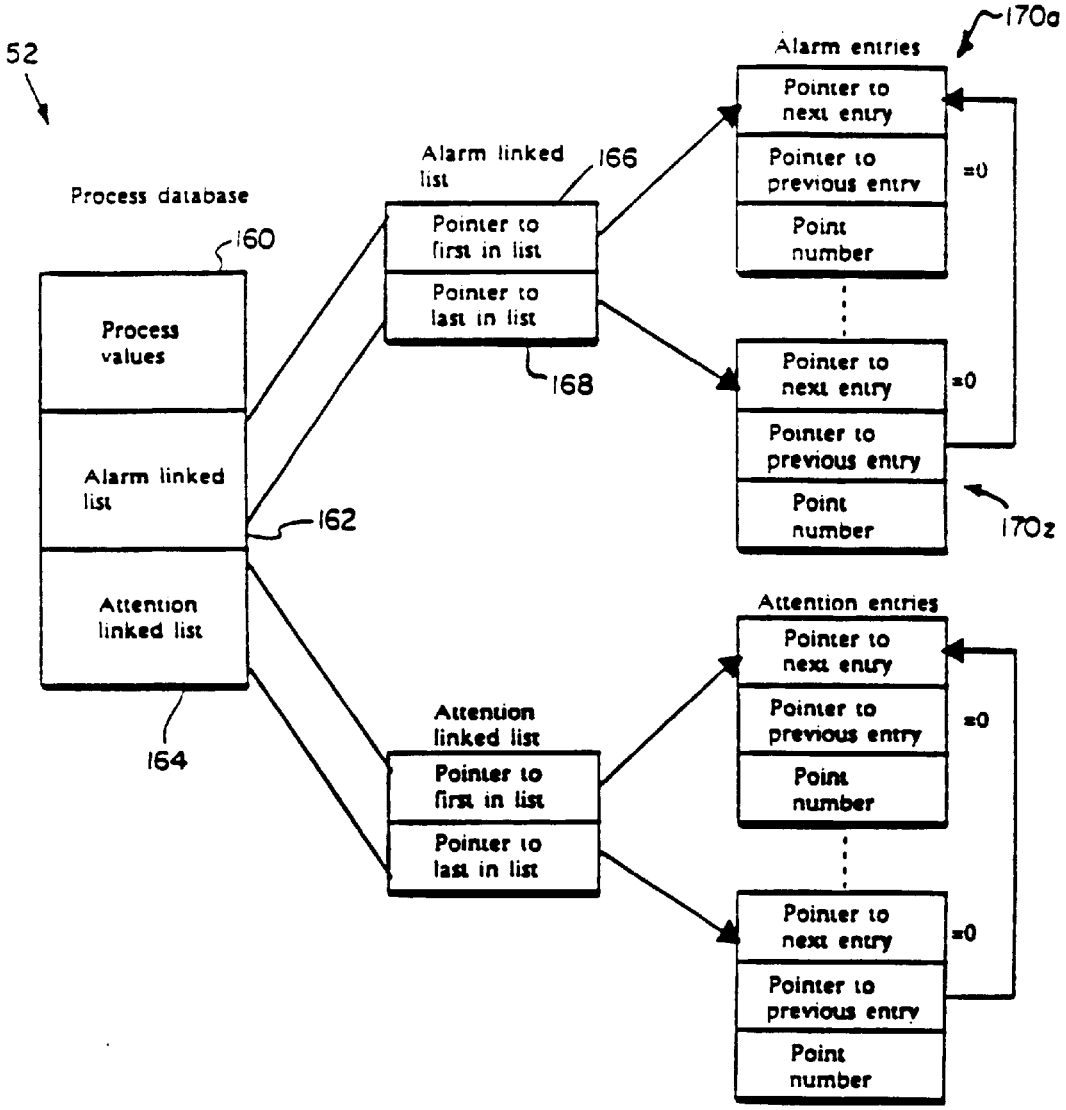
FIG. 8 is an illustration of the organization of the process database of FIG. 4.

The logical structure of the process database 52 is shown in FIG. 8. As described above, the process database contains three basic types of information: information relating to the various processes being controlled by the process controllers 12, alarm limit information such as alarm status bits, and attention limit information such as attention status bits.

Now referring to FIG. 8, the process database 52 includes a first memory portion 160 which contains information about the processes under control, including current process values and any associated alarm status bits or attention values. The alarm status bits, if enabled, signify the presence of alarm conditions. The attention values, if included in the memory portion 160, signify the existence of attention conditions. The attention values act as pointers to the addresses of attention messages which should be displayed on the CRT screen. A second memory portion 162 contains an alarm linked list, and a third portion 164 which contains an attention linked list. The alarm linked list contains a list of all process variables for which an alarm condition is indicated, and the attention linked list contains a list of all process variables for which an attention condition is indicated. An alarm or attention condition exists when the actual value of the process variable exceeds its associated alarm or attention limit, respectively. This comparison of the values of the process variables with the corresponding alarm and attention limits is typically made by the process controllers 12, which set a particular alarm status bit to signify the existence of its corresponding alarm condition and supply a numeric attention value which corresponds to a particular attention message.

The memory structure of the alarm linked list includes a memory location 166 which contains the pointer, or memory address, of the first alarm condition in the linked list, and a memory location 168 which contains the pointer, or memory address, of the last alarm condition in the list. The memory location 166 specifies the memory address of the first memory location 170a containing alarm information. The memory location 170a contains a pointer to the next memory location which contains alarm information and a pointer to the previous memory location containing alarm information, which in this case equals zero since the location 170a is the first location in the linked list. The location 170a also includes the point number for which the alarm condition exists. Each point number causes a unique alarm message to be displayed on the CRT screen.

The final alarm location 170z in the alarm linked list 162 includes pointers to the next and previous entries. In this case, the pointer to the next entry is zero since the location 170z is the last location in the linked list. Each of the intermediate alarm memory locations between the locations 170a, 170z, which are indicated by the dotted lines, has the same structure as the locations 170a, 170z. The attention linked list 164 is organized in the same manner as the alarm linked list just described. Linked lists are conventional means of storing data.

Figure 9:
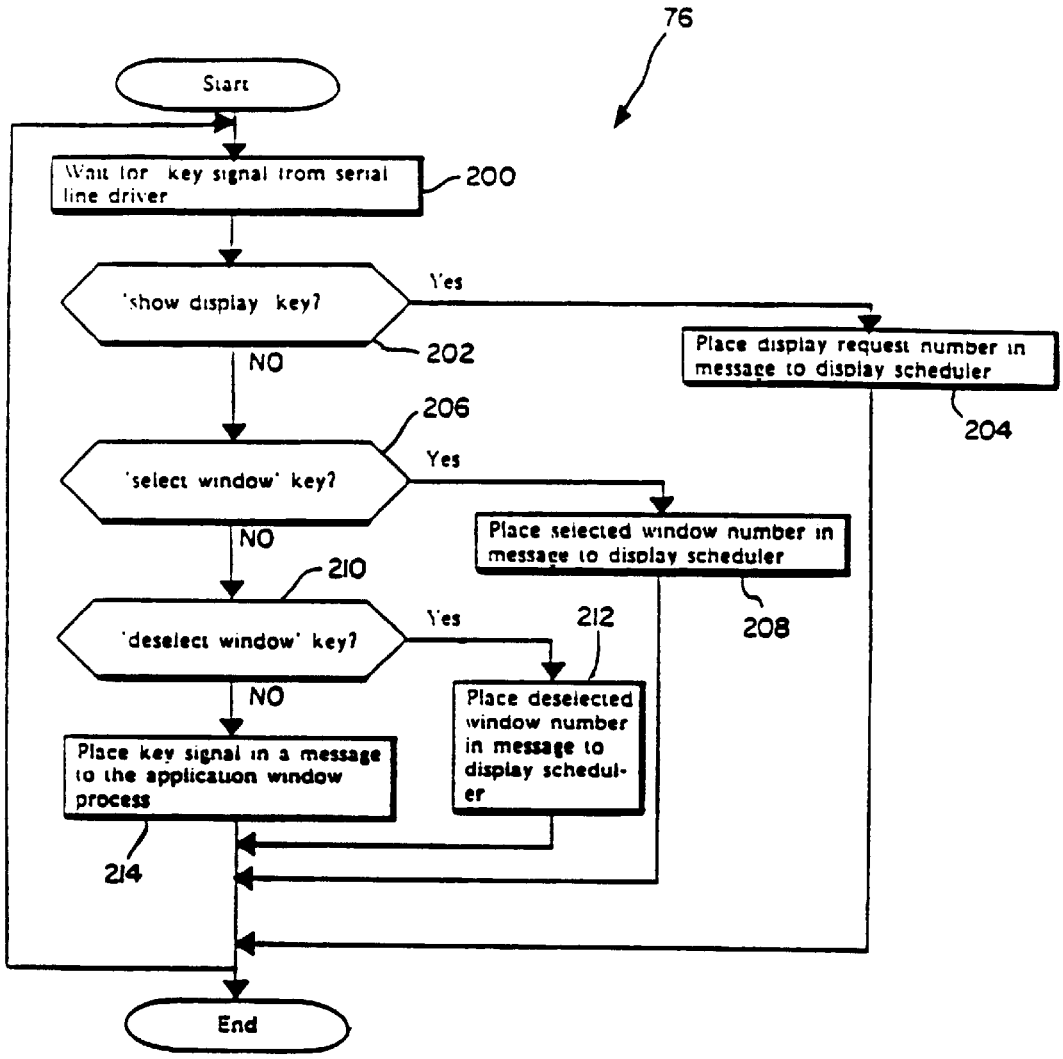
FIG. 9 is a flowchart of the keyboard process shown in FIG. 4.

A flowchart of the keyboard process 76 of FIG. 4 is shown in FIG. 9. The basic function of the keyboard process 76 is to respond to key signals transmitted from the serial line driver 40 by sending appropriate messages to the display scheduler 78 and the application window process 82. The commands sent to the display scheduler 78 include three basic types: select a window, deselect a window, and show a particular display.

In order to select a window, an operator must type a "select window" command and enter the associated window number. As a result, a double box is drawn around the window and the window is enabled for input from the operator. A "deselect window" command makes the double box around the active window disappear and disables the window for input from the operator. A "show display" command causes the display corresponding to the display number input by the operator to appear on the screen. While the selection of a window determines whether the window may accept operator input, a window may accept input from the host computer 64 as long as it is on display on the CRT screen, whether or not it is "selected."

Now referring to FIG. 9, at step 200 the keyboard process waits for a key signal from the serial line driver 40. Upon receipt of a key signal, the process branches to step 202 in order to determine whether the key signal is a "show display" key. If it is, the process branches to step 204 where a display request message, including the display list number, is created for transmission to the display scheduler 78. The display request message will ultimately cause the display specified by the display list number to appear on the CRT screen. The process then branches back to step 200 to wait for another key signal from the serial line driver 40.

At step 202, if the key signal from the serial line driver 40 was not a show display key, the process branches to step 206 to determine whether it is a "select window" key. If it is, the process branches to step 208 where the selected window number is placed in a select window message for transmission to the display scheduler 78. The process then branches back to step 200 to wait for another key signal from the serial line driver 40.

At step 206, if the key signal from the serial line driver 40 was not a select window key, the process branches to step 210 to determine whether it is a "deselect window" key. If it is, the process branches to step 212 where the deselected window number is placed in a deselect window message for transmission to the display scheduler 78. The process then branches back to step 200 to wait for another key signal from the serial line driver 40.

Finally, at step 214, since the key from the serial line driver 40 was not any of the three window select or display commands, it contains information for the application window process 82. Accordingly, a message including the key, or character, is created and sent to the application window process 82. The process then branches back to step 200 to wait for another key signal.

Figure 10:
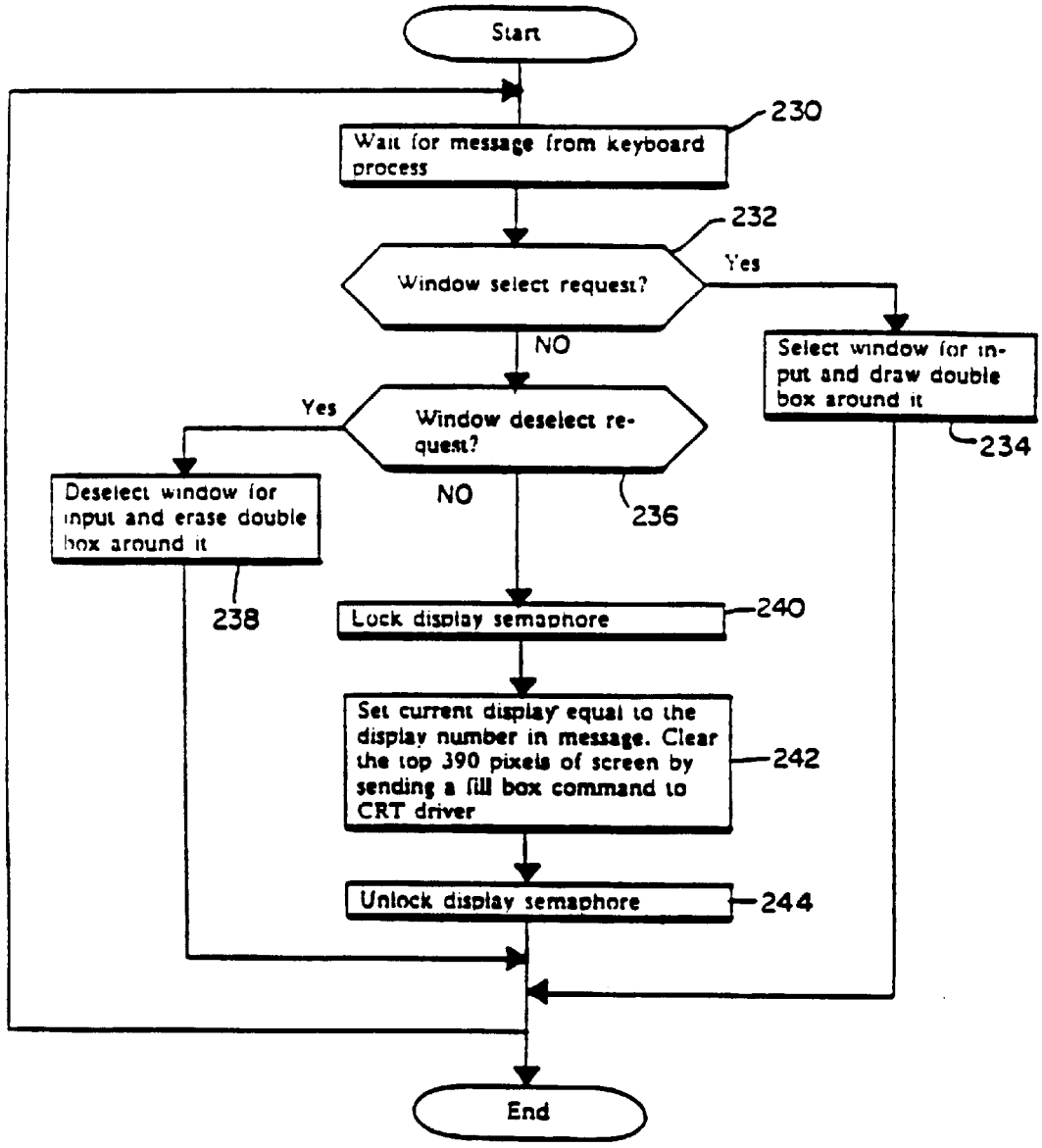
FIG. 10 is a flowchart of the display scheduler shown in FIG. 4.

A flowchart of the display scheduler 78 of FIG. 4 is shown in FIG. 10. The basic functions of the display scheduler 78 include selecting and deselecting application windows and specifying which display is to be shown on the CRT screen. The display scheduler performs these functions by responding to three types of electronic messages from the keyboard process: a window select request, a window deselect request, and a display window request.

Now referring to FIG. 10, at step 230 the program waits for a message from the keyboard process 76. At step 232 the program determines whether the message is a window select request, which would be the message received in case the operator has input a select window command. If the message is a window select request, the program branches to step 234 at which point the window is selected by sending a command to the CRT driver 46 requesting that a double box be drawn around the window and the window being made input active. The program then returns to step 230 to wait for another message.

At step 232, if the message was not a window select request, the program branches to step 236 where the program determines whether it is a window deselect request. If the message is a window deselect request, the program branches to step 238 at which point the window is deselected. In order to deselect the window, a command is sent to the CRT driver 46 requesting that the double box drawn around the window be erased and the window is made input inactive. The program then returns to step 230 to wait for another message.

At step 236, if the message was not a window deselect request, the program branches to step 240 at which point the program causes a new display to be initiated at steps 240–244. Specifically, at step 240 the display semaphore is locked in order to limit access to the display definition database 54. At step 242 the current display list number in the memory portion 120 of the display definition database 54 is set equal to the display list number contained in the message from the keyboard process 76. The CRT screen is then cleared by sending the CRT driver 46 a fill box command. Finally, at step 244 the display semaphore is unlocked so that the display definition database 54 can be accessed and the new display may be made to appear on the screen. The program then returns to step 230 at which point it waits for another message from the keyboard process 76.

Figure 11:
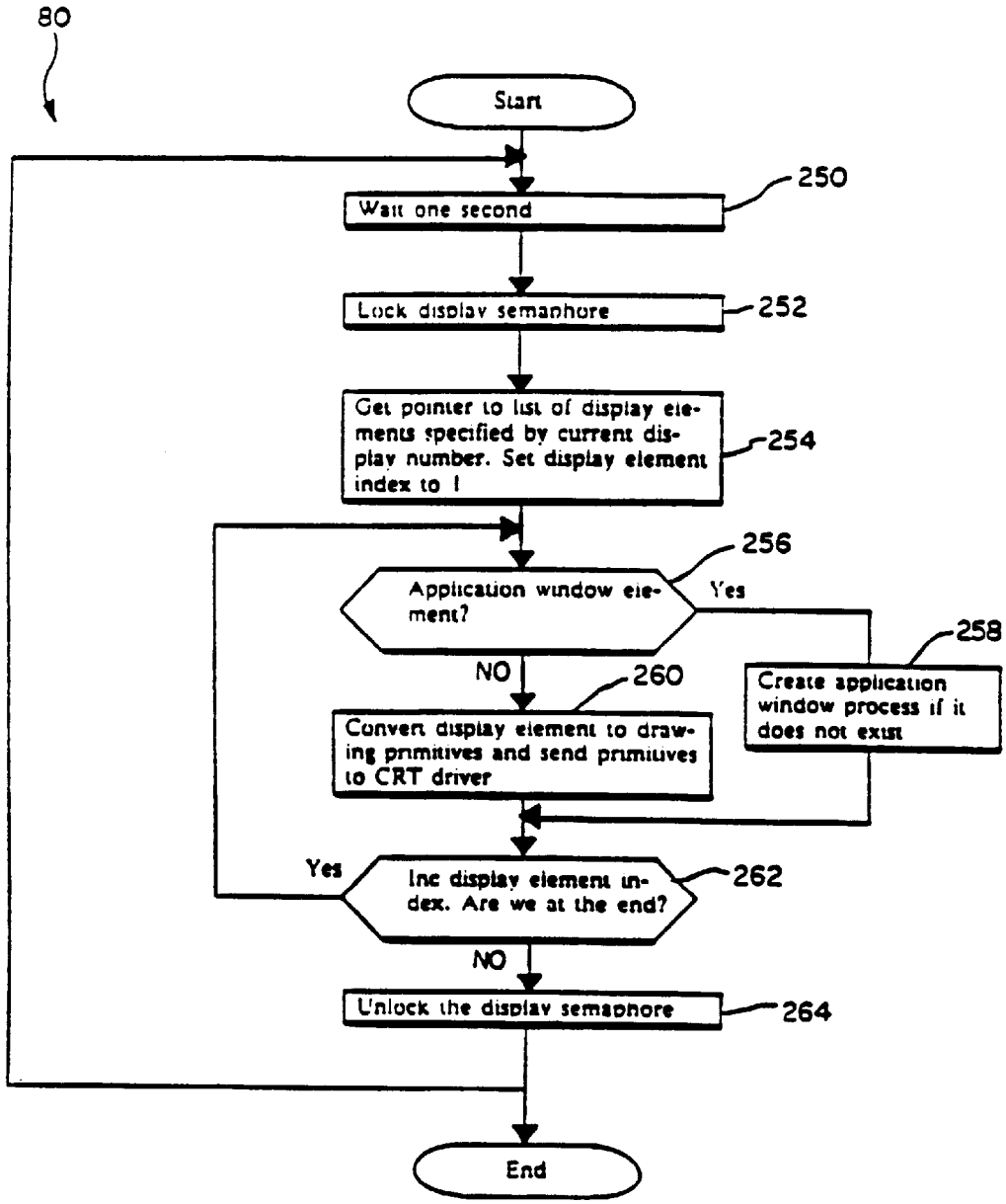
FIG. 11 is a flowchart of the display interpreter shown in FIG. 4.

A flowchart of the display interpreter 80 of FIG. 4 is shown in FIG. 11. The basic functions of the display interpreter 80 include reading the contents of the display list 124 specified by the display list number stored in the memory portion 120 of the display definition database 54, and transmitting to the CRT driver 46 drawing primitives corresponding to each of the display elements contained in the specified display list 124 in order to cause the CRT driver 46 to make the selected display appear on the CRT screen.

Now referring to FIG. 11, at step 250 the program waits for one second, which controls how frequently program 80 is executed. Then at step 252 the display semaphore is locked to prevent the display scheduler 78 and the display interpreter 80 from attempting to simultaneously access the display definition database 54. At step 254 the memory portion 120 of the display definition database 54 is accessed to determine the current display number and the pointer to the display list 124. The display element index is initialized to one. This index is used as a counter to determine when all of the display elements of the display list have been accessed.

Each of the display elements 128 contained in the display list 124 specified by the display number is displayed on the CRT screen by means of steps 256–262. Step 256 is a test to determine whether the display element specified by the display index is an application window element. If it is, the program branches to step 258 to create the application window process if it has not already been created. At step 260, the display element 128 specified by the index as well as it constituent portions, for example portions 130–148, are retrieved from the display definition database 54, and the display element 128 is converted to a set of drawing primitives in a conventional manner. The drawing primitives are sent to the CRT driver 46, which then causes the display element to be displayed on the CRT screen. At step 262, the display element index is incremented, and the current value of the index is compared to the number of display elements stored in memory location 126 to determine whether there are any additional display elements to be retrieved. If there are more display elements, the program branches back to step 256 in order to retrieve the next display element. If all the display elements have been retrieved, the program branches to step 264 at which point the display semaphore is unlocked to allow the display scheduler 78 to have access to the display definition database 54. The program then branches to step 250.

Figure 12:
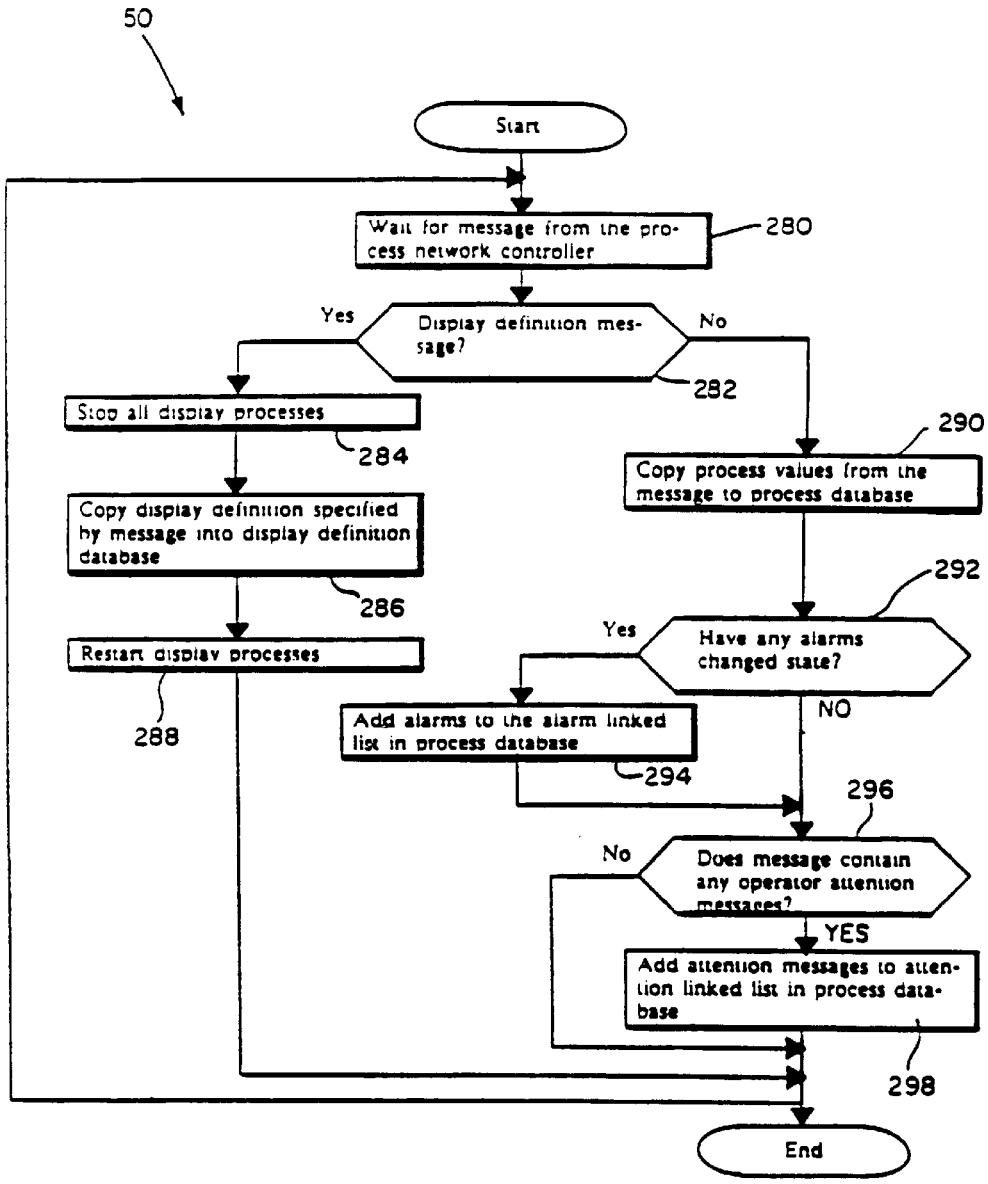
FIG. 12 is a flowchart of the process network driver shown in FIG. 4.

A flowchart of the network driver 50 of FIG. 4 is shown in FIG. 12. The basic functions of the network driver 50 include updating the information in the display definition database 54 and the process database 52. Now referring to FIG. 12, at step 280 the network driver 50 waits for a message from the network controller 36. Upon receipt of a message, the program branches to step 282 where it determines whether the message is a display definition message. There are two basic message types: display definition messages and process information messages. If the message is a display definition message, the program branches to steps 284–288 in order to update the display definition database. Specifically, at step 284 all display processes are temporarily disabled, at step 286 the display definition database 54 is updated by adding the display element specified by the message, and at step 288 the display processes are enabled. The program then branches back to step 280 in order to wait for another message from the network controller 36.

Now referring back to step 282, if the message from the network controller 36 was not a display definition message, meaning that it was a process information message, then the program branches to step 290 at which point the process database 52 is updated by storing the process values contained in the process information message into the process database 52. At step 292, the program cycles through the memory portion 160 of the process database 52 in order to determine whether any of the updated process information has caused any alarm conditions. If so, the program branches to step 294 at which point the alarms are added to the alarm linked list 162. If the message contains any operator attention messages as determined at step 296, the program branches to step 298 where the attention messages are added to the attention linked list 164 in the process database 52. The program then branches back to step 280 to wait for another message from the network controller 36.

Figure 13:
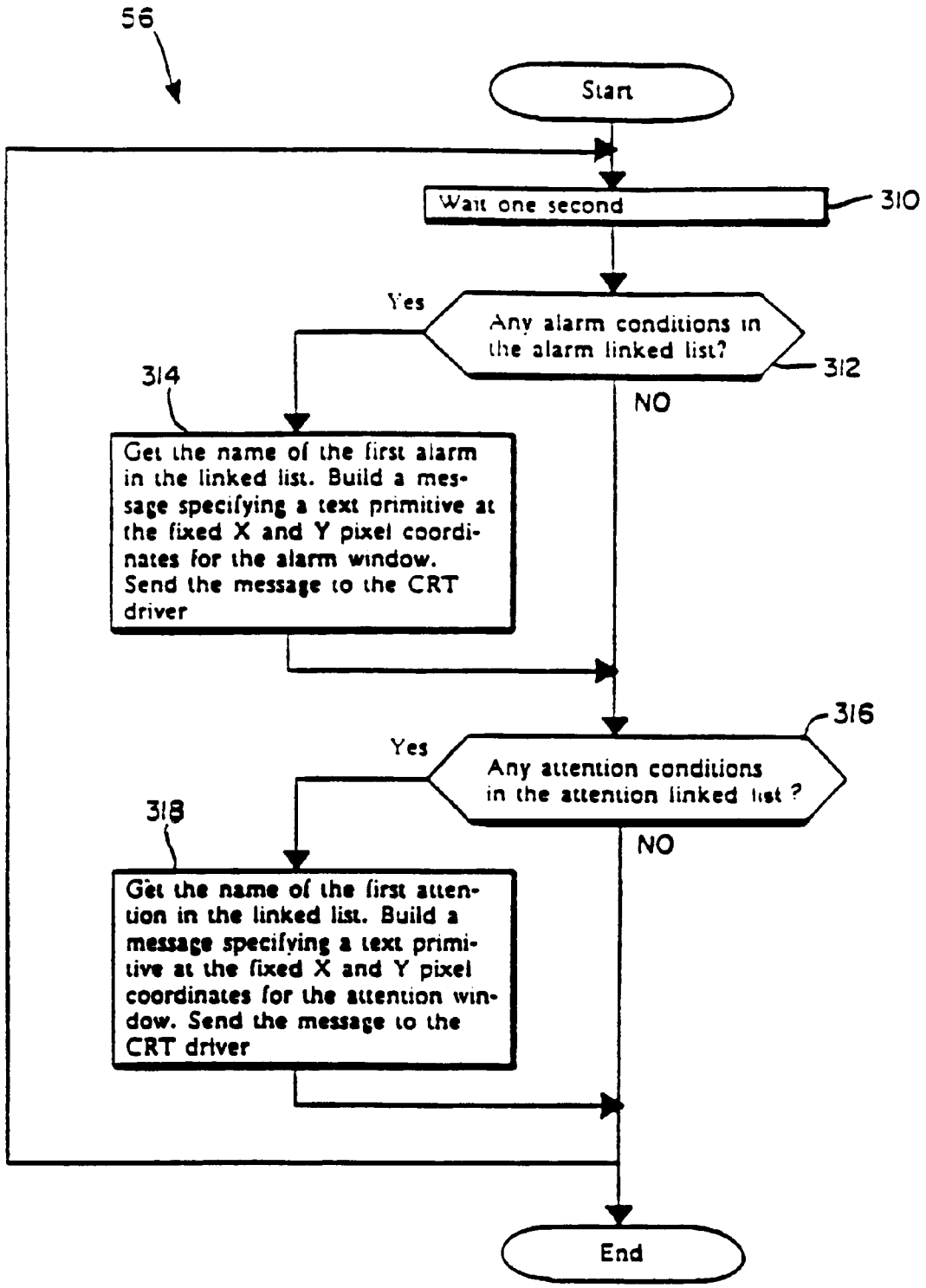
FIG. 13 is a flowchart of the alarm and attention list process shown in FIG. 4.

A flowchart of the alarm and attention list processor 56 of FIG. 4 is shown in FIG. 13. The function of the alarm and attention list processor 56 is to check the alarm linked list 162 and the attention linked list 164 once each second in order to determine the existence of any alarm or attention conditions which should be brought to the attention of the operator.

Now referring to FIG. 13, at step 310 the process waits a predetermined time period of one second, which time period controls how often the program 56 is executed. At step 312, the process checks the alarm linked list 162 to determine whether there are any alarms. If there is an alarm in the linked list 162, the first alarm in the list is retrieved, and, using the point number, an electronic alarm message is created for transmission to the CRT driver 46 so that the corresponding visual alarm message will appear on the CRT screen. The electronic alarm message includes text primitives specifying the visual message as well as coordinates specifying a predetermined portion of the CRT screen at which the visual message is to appear. This predetermined screen portion is the alarm window 104 and is specified by the X and Y pixel coordinates of that window 104. The electronic alarm message is then sent to the CRT driver 46 to cause the visual alarm message to appear in the alarm window 104.

The process then branches to step 316, where it accesses the attention linked list 164 to determine whether there are any process control conditions which need operator attention. If there is an attention condition in the linked list 164, the first attention condition in the list is retrieved, and an electronic attention message is created for transmission to the CRT driver 46 so that a visual attention message will appear on the CRT screen. The electronic attention message includes text primitives specifying the visual message as well as coordinates specifying a predetermined portion of the CRT screen at which the visual message is to appear. This predetermined screen portion is the operator attention request window 102 and is specified by the X and Y pixel coordinates of that window 102. The electronic attention message is then sent to the CRT driver 46 to cause the visual attention message to appear in the attention window 102.

The program then branches back to step 310 in order to check the alarm and attention linked lists again. If there are more than one alarm or attention conditions in either of the linked lists 162, 164, the operator may request that the entire list of the corresponding alarm or attention messages be displayed on the CRT screen.

Figure 14:
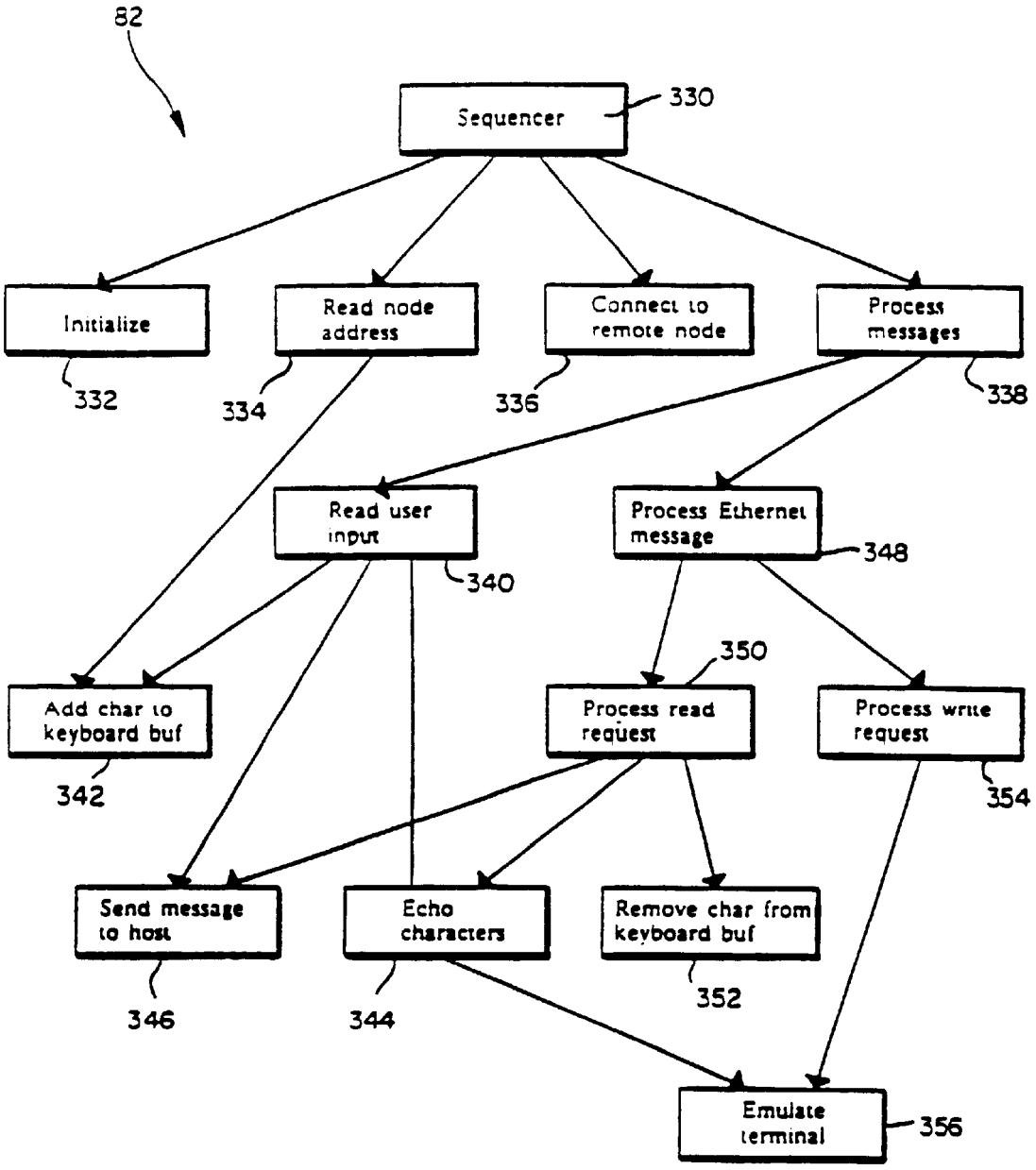
FIG. 14 is a process flow diagram of the application window process shown in FIG. 4.

A process flow diagram of the application window process 82 of FIG. 4 is shown in FIG. 14. The application window process 82 is responsible for communication between the process control terminal 60 and the host computer 64. The application window process 82 also plays a primary role in causing application windows and the visual information connected therewith to be displayed in the portion of the CRT screen reserved for information relating to the application program.

Now referring to FIG. 14, the process 82 performs four basic steps, three of which are preliminary steps. These steps, which are controlled by a program loop or sequencer 330, include an initialize step 332 where various parameters and variables are initialized, a read node address step 334, a connect to remote node step 336, and a process messages step 338. The steps 332–336 are executed once each time an application window is logged in by the operator, and they set up communication between the host computer 64 and the process control terminal 60. Once communication is set up, step 338 is executed in order to process messages transmitted between the host computer 64 and the terminal 60.

During execution of the process messages step 338, messages are transmitted from the host computer 64 to the terminal 60 and back via the Ethernet network 66. These messages may include textual information or graphics information. A read user input step 340 reacts to keystrokes input by the user at the keyboard. Upon the user typing in a terminating character, such as a carriage return or a transmit key, the characters preceding the terminating character are transmitted to the host computer 64.

The read user input step 340 has two basic types of operation, depending upon whether or not the host computer 64 has transmitted a read request message to the terminal 60, indicating that the terminal should send a read message to the computer 64. If a read request has already been received by the terminal 60, then as the operator types each key, the key is stored in the keyboard buffer (not shown) at step 342. The key is then echoed to the CRT screen at step 344, and finally, upon receipt of the terminating character, the typed characters in the keyboard buffer are included in a message to the host computer 64.

If no read request has yet been received by the terminal 60, then the typed characters, including the terminating character, are stored in the buffer until a read request is received. Upon receipt of a read request, the characters in the buffer are transmitted in a message to the host computer 64 at step 346, and then they are echoed to the screen at step 344.

The process 82 also responds to messages from the host computer 64 by processing Ethernet messages at step 348. This processing may include either a read request, described above, or a write request indicating that the host computer 64 would like to send a message to the terminal 60. In the case of a read request, the request is processed at step 350 by first removing a character from the keyboard buffer at step 352, causing the character to be echoed to the screen at the previously described step 344, and causing the message including the characters to be sent to the host 64 at the previously described step 346.

If a write request is received by the terminal 60, a process write request step 354 is executed, which causes an emulate terminal step 356 to be performed. The emulate terminal step 356, which is described in detail below, is essentially a message translator that translates Ethernet messages from the host computer 64 so that the terminal 60 can respond to them. The emulate terminal step 356 is also used by the echo characters step 344, and thus responds to characters input by the operator at the terminal 60.

Figure 15:
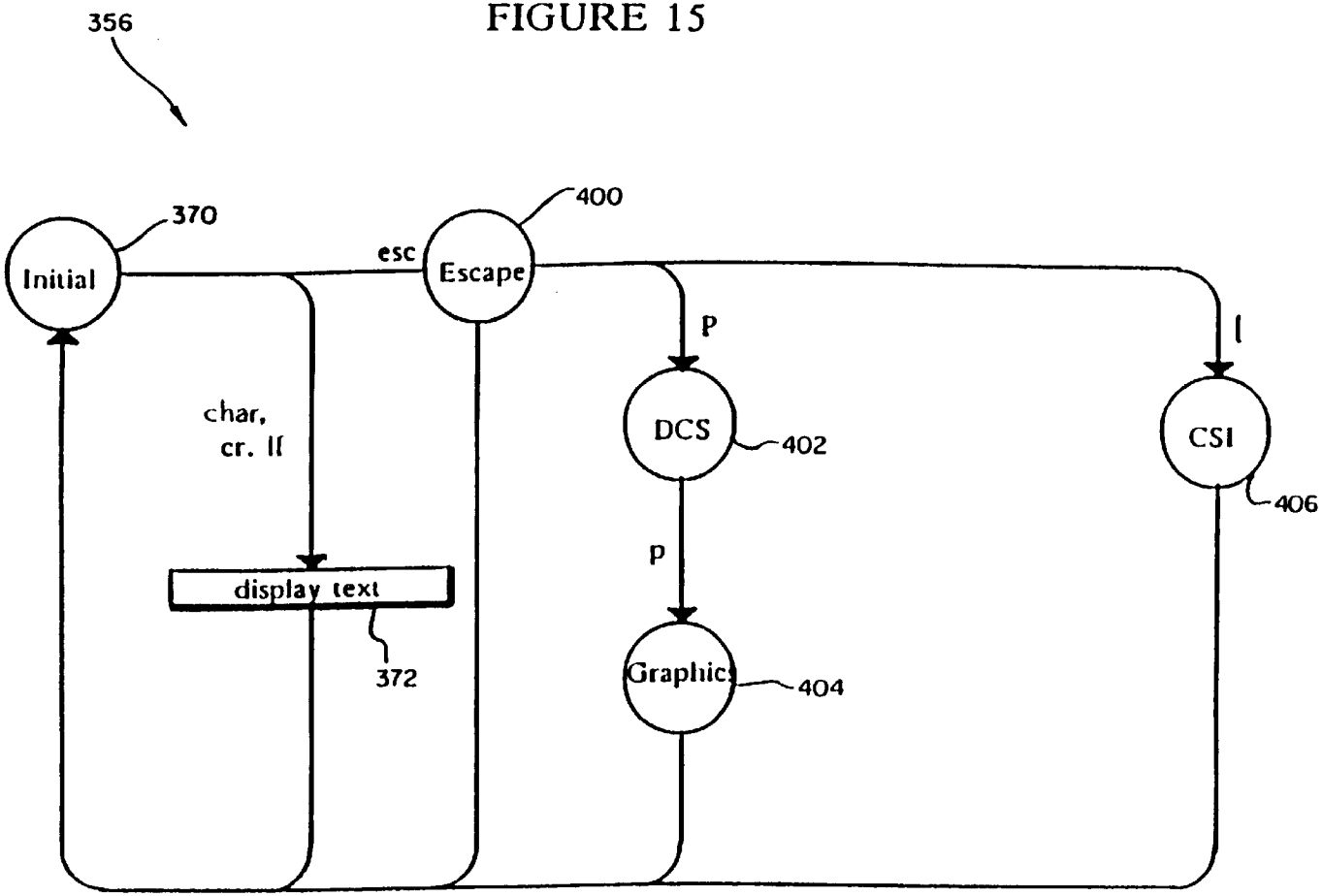
FIG. 15 is a state diagram of the emulate terminal step shown in FIG. 14.

A state diagram of the emulate terminal step 356 of FIG. 14 is shown in FIG. 15. The function of the emulate terminal step 356 is to emulate a standard Digital Equipment Corporation (DEC) terminal would by reacting to signals received from the host computer 64 in the same way that a standard DEC terminal would. The messages from the host computer 64 may include graphics information, textual information, or information relating to the positioning of the cursor on the CRT screen. The emulate terminal step 356 is also used to echo characters to the CRT screen of the terminal 60.

Now referring to FIG. 15, the state diagram begins execution in an initial state 370, which is basically a waiting state. Upon receipt of an ASCII text character that is to be displayed on the CRT screen, or a carriage return or line feed, the program branches to a display text step 372, which is shown in more detail in FIG. 16.

Figure 16:
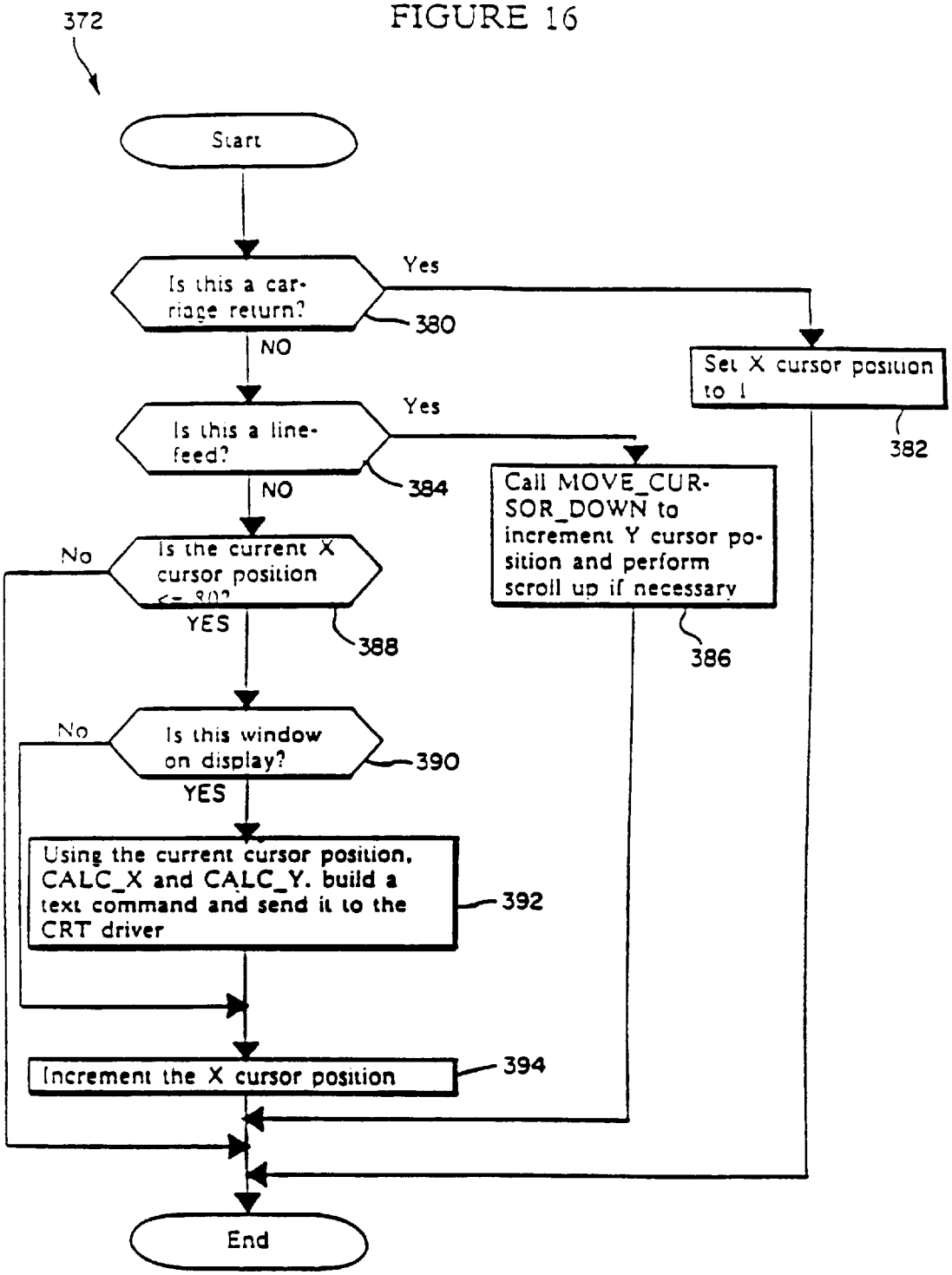
FIG. 16 is a flowchart of the display text step shown in FIG. 15.

Referring to FIG. 16, when the display text 372 is executed, at step 380 the program determines whether the character received from the host computer 64 is a carriage return, in which case the program branches to step 382 where it sets the X cursor position equal to one, which is the left-most X cursor position on the CRT screen. The program then terminates since it responds to only one character at a time.

At step 384 the program determines whether the character received from the host computer 64 is a line feed, in which case it branches to step 386 where a move cursor down routine is called to move the cursor one position down. The move cursor down routine is described in more detail below.

At step 388, the program determines whether the current X cursor position is less than or equal to 80. If it is not, then the program terminates because the program does not write past the 80th character position on the CRT screen, since the application window 98 is only 80 characters wide.

At step 390, the program determines whether the window is on display. If the window is not on display, the program bypasses step 392, which causes a text command to be sent to the CRT driver so that the character received is displayed on the CRT screen. Step 392 uses a pair of subroutines CALC_X and CALC_Y, described below, to determine the X, Y pixel position corresponding to the current cursor position. After the character has been displayed on the CRT screen, the X cursor position is incremented so that the character just displayed will not be overwritten by the next character.

Figure 20A:
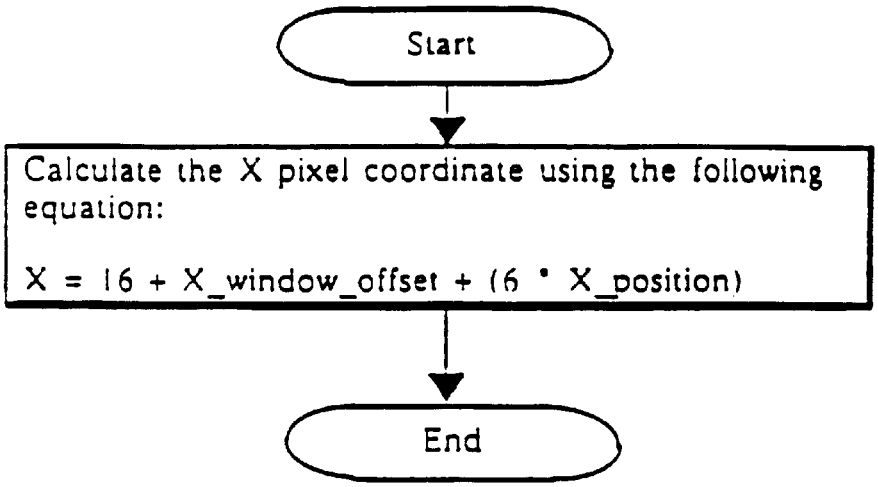
FIGS. 20a and 20b, are flowcharts of two subroutines called by a number of steps shown in FIGS. 19a through 19k.
Figure 20B:
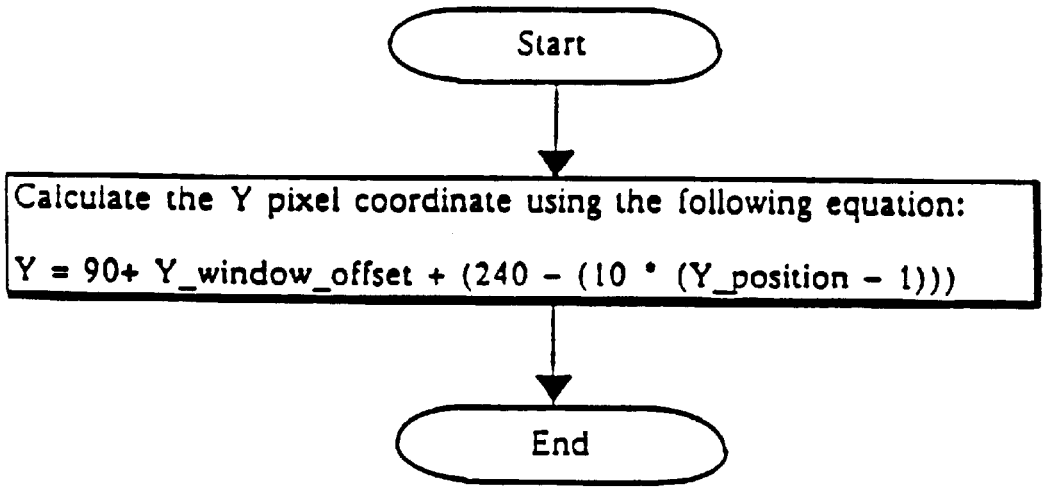

The CALC_X and CALC_Y subroutines are shown in FIGS. 20a and 20b, respectively. The function of these subroutines is to change a specified X, Y coordinate position to its corresponding X, Y pixel position. The X, Y coordinates of the application window 98 vary from (1, 1) at the upper left-hand corner of the window to (24, 80) at the lower right-hand corner of the window. Each coordinate in the X direction corresponds to six pixels since each character of text is six pixels wide. Each coordinate in the Y direction corresponds to 10 pixels since each character of text is 10 pixels high.

Now referring to FIG. 20a, the X pixel position is determined by using the following Equation [1] set forth below:

$$X=16+X_window\ offset+(6^* X_{13}position),$$

where X is the X pixel position being calculated, 16 is the number of pixels comprising the blank vertical left-hand border portion 110 of the CRT screen, $X_{13}window_{13}$ offset is a predetermined window offset with respect to the left vertical border portion 110, the number 6 is the number of horizontal pixels used for each character, and X_position is the X coordinate position for which the X pixel position is being calculated.

The CALC_Y subroutine shown in FIG. 20b is generally similar to the CALC_X routine of FIG. 20a. However, one basic difference is that while the calculated X pixel position increases with the X_position, the calculated Y pixel position decreases as the Y_position increases. This is so simply because the Y coordinate position of the application window 98 is defined to increase from top to bottom, whereas the Y pixel position of the CRT screen of the terminal 60 is defined to increase from bottom to top. Thus, the cursor coordinate position of the top left-hand corner of the window 98 is (1, 1), while the pixel position of the lower left-hand corner of the CRT screen of the terminal 60 is (0, 0).

Now referring to FIG. 20b, the Y pixel position is determined by using Equation [2] set forth below:

$$Y=90+Y_{13}\text{window_offset}+(240-(10*(Y_\text{position}-1)))$$

where Y is the Y pixel position being calculated, the number 90 is the number of pixels used for the process control portion 92, Y_window_offset is a predetermined window offset with respect to the process control portion 92 of the display, the number 240 represents the pixel height of the application window 98 in which text appears, the number 10 is the number of vertical pixels used for each character, and Y_position is the Y coordinate position for which the Y pixel position is being calculated.

It should be appreciated that the use in Equation [2] of the number 90, which corresponds to the height of the process control portion 92 of the display, prevents any visual application program information from being displayed in the process control portion 92.

Figure 17:
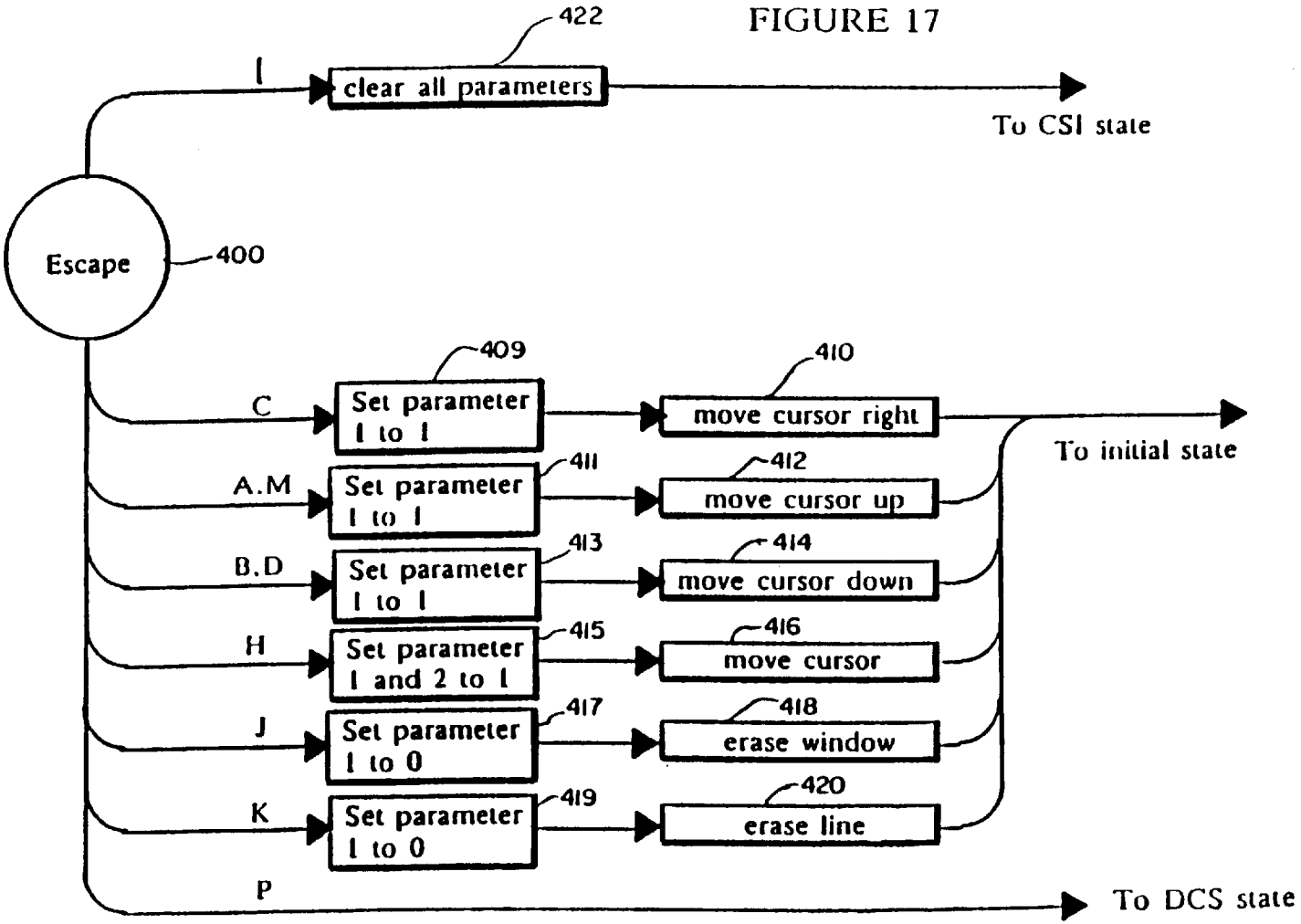
FIG. 17 is an illustration of a number of state transitions from the Escape state to the Initial and CSI states as shown in FIG. 15.

A number of state transitions from the escape state 400 to the initial and control sequence introducer ("CSI") states 370, 406 of FIG. 15 are shown in FIG. 17. Once the program enters the escape state 400 after receiving the "Esc" character from the host computer 64, the program may branch to either the CSI state 406 or the initial state 370, depending upon the character input after the "Esc" character. In addition, the program executes one of a number or intermediate steps, such as moving the cursor right, for example, before changing to the new state.

Now referring to FIG. 17, the program changes from the escape state 400 to the initial state 370 upon receiving any of the following characters: A, B, C, D, H, J, K, and M. In addition, each of these characters causes a particular intermediate step to be performed. In particular, the character C causes the cursor to be moved right one position at step 410; the characters A or M cause the cursor to be moved up one line at step 412; the characters B or D cause the cursor to be moved down one line at step 414; the character H causes the cursor to be moved to a predetermined position at step 416; the character J causes the window to be erased at step 418; and the character K causes a number of lines to be erased at step 420. The steps 410–420 are described in more detail below.

The receipt of a "["causes the program to transition from the escape state 400 to the CSI state 406 after all parameters have been cleared at step 422. In the CSI state 406, a number of parameters are used. Step 422 clears any old values of these parameters that may remain.

Figure 18:
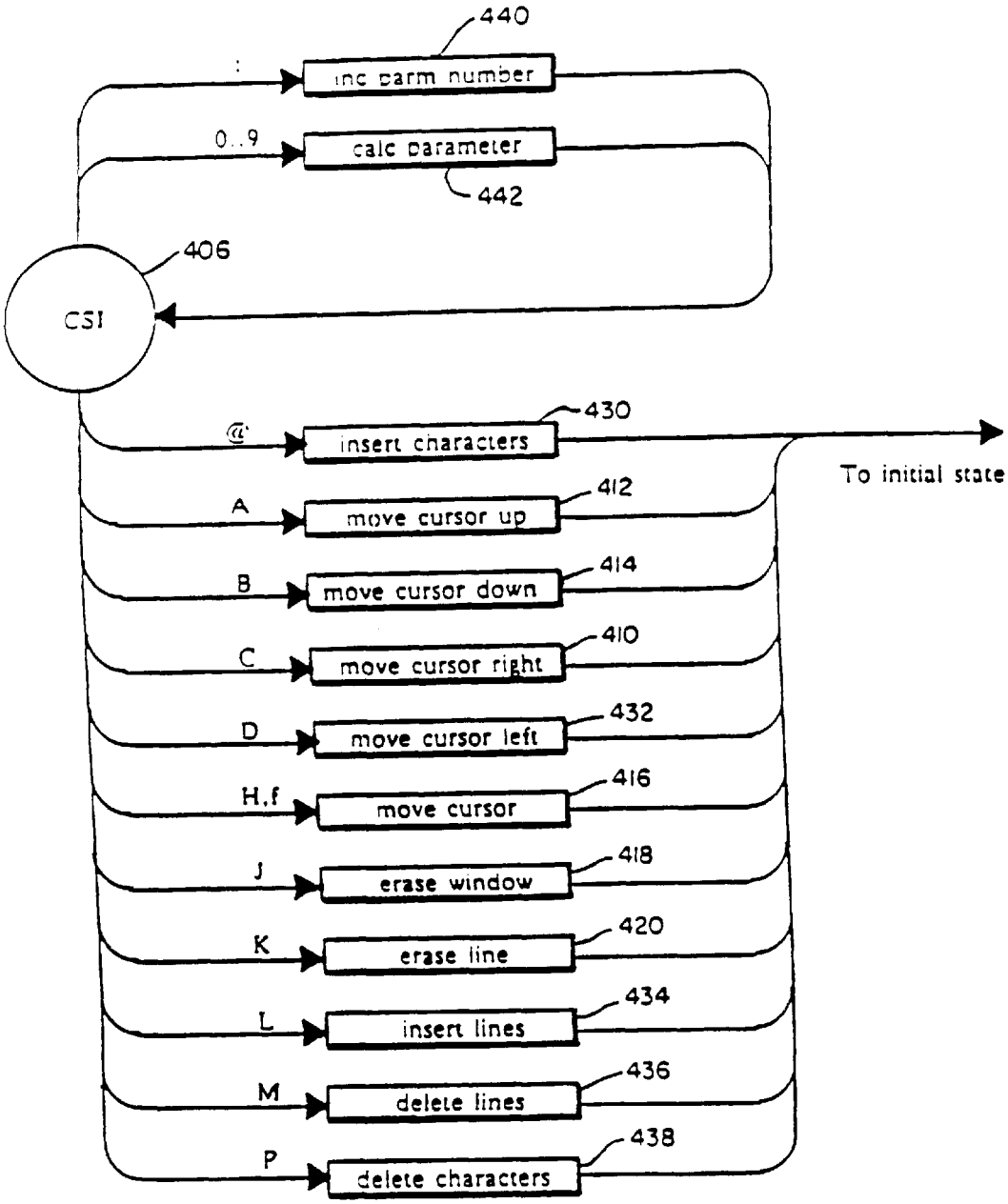
FIG. 18 is an illustration of a number of state transitions from the CSI state to the Initial state as shown in FIG. 15.

A number of state transitions from the CSI state 406 to the initial state 370 of FIG. 15 are shown in FIG. 18. The program transfers from the CSI state 406 to the initial state 370 and also performs one of a number of intermediate steps, depending upon the character input while the program is in the CSI state 406.

Referring to FIG. 18, the character "@" causes a number of characters to be inserted into text being displayed on the CRT screen by performing the step 430. The character "A" causes the cursor to be moved up by performing the step 412; the character "B" causes the cursor to be moved down by performing the step 414; the character "C" causes the cursor to be moved right by using the step 410; the character "D" causes the cursor to be moved left by performing the step 432; the characters "H" or "f" cause the cursor to be moved to a predetermined location by performing the step 416; the character "J" causes a window to be erased by performing the step 418; the character "K" causes a number of lines to be erased by performing the step 420; the character "L" causes lines to be inserted by performing the step 434; the character "M" causes lines to be deleted by performing step 436; and the character "P" causes characters to be deleted by performing the step 438. Each of these steps 410–438 is set forth in detail below.

Some of the steps shown in FIG. 18 are also shown in FIG. 17. For example, the move cursor right step 410 is shown in both FIGS. 17 and 18. The reason for this is that these steps may be used either with parameters whose values are specified by the host computer 64 or with predetermined parameters if no parameters are specified by the host computer 64. For example, the move cursor right command includes a parameter specifying how many screen positions right the cursor should be moved. This parameter may be specified by the host computer 64, or it may be set to a predetermined value if it is not specified.

If the parameters are not specified, their values are preset as shown in FIG. 17; otherwise, their values are ascertained at steps 440–442 shown in FIG. 18, each parameter being separated by the ";" character. In particular, in FIG. 17, a first parameter, parameter 1 is set to one at each of steps 409, 411, 413, and is set to zero at each of steps 417, 419. At step 415, parameter 1 and a second parameter, parameter 2, are both set to zero.

Referring to FIG. 18, at step 442, each parameter received when the program is in the CSI state 406 is converted from its ASCII form to binary form. After a parameter is received and converted, if the program receives the ";" character from the host computer 64, meaning that another parameter follows, then step 442 is repeated. The specific use of the parameters received in this manner will be apparent from the description of the steps 410–438 described in more detail below.

Figure 19A:
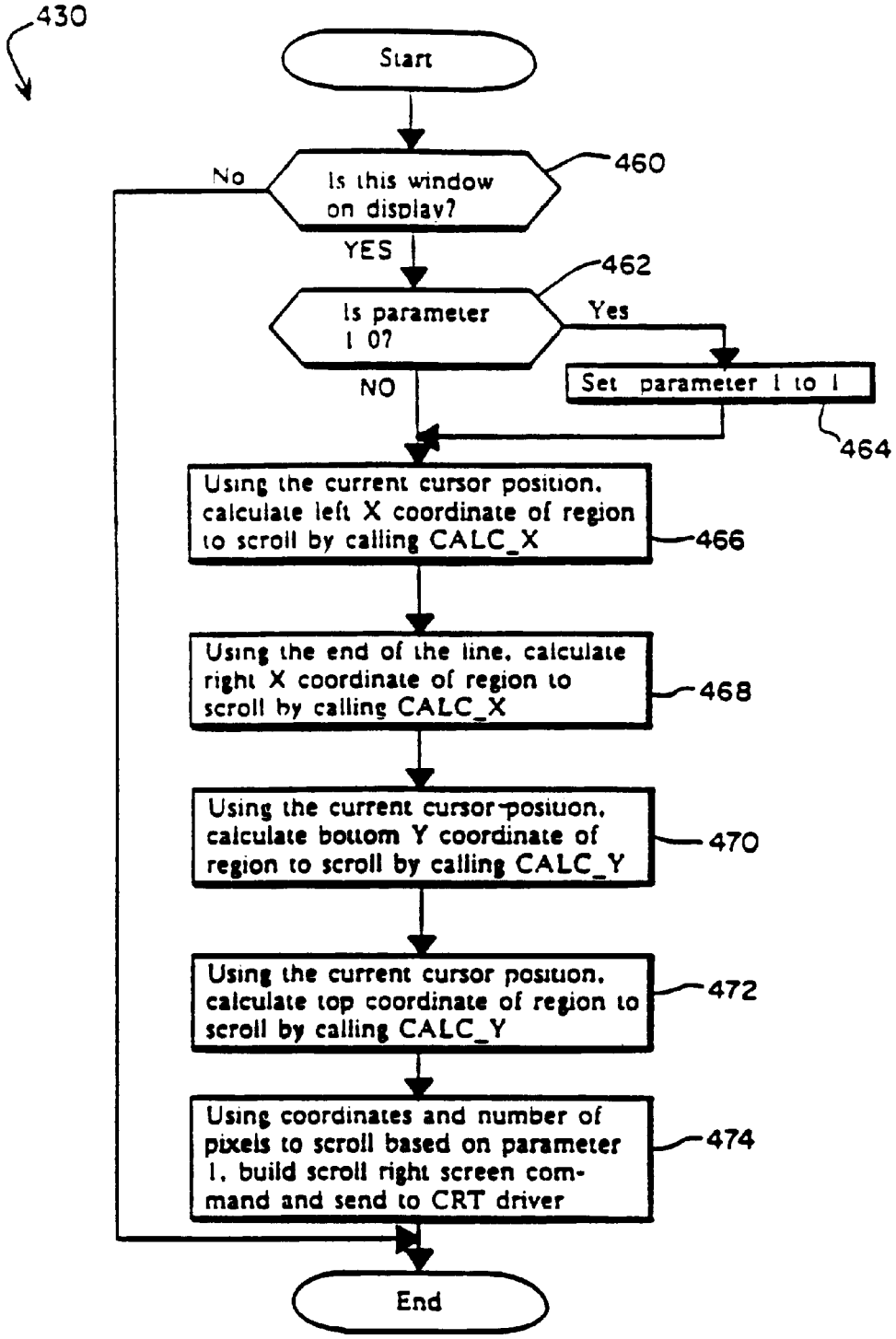
FIG. 19a through 19k are flowcharts of various steps shown in FIGS. 17 and 18.

A flowchart of the insert characters step 430 of FIG. 18 is shown in FIG. 19a. During this step, the insertion of one or more characters into text already displayed on the CRT screen is enabled by creating a scroll right screen command and sending it to the CRT driver 46. As a result of the scroll right screen command, the text appearing on the screen is scrolled right to create a gap for the insertion of the desired text during the subsequent execution of the display text step 372. The insert characters step 430 is used with a single parameter which if nonzero, specifies the number of characters to be inserted, or if zero, specifies that a single character will be inserted.

Now referring to FIG. 19a, at step 460, the program determines whether the window for which the characters are to be inserted is currently on display. If a window is not on display, no output can be made to the window from the host computer 64. Thus at step 460, if the window is not on display, the program branches to the end without performing any action. At step 462, the program determines if parameter 1 equals zero. If it does, meaning that only a single character will subsequently be inserted, then the program branches to step 464 where parameter 1 is set to one.

Steps 466–472 determine the X, Y pixel position of each of the four corners of the horizontal line of text that will be scrolled right to make room for the character(s) that are to be inserted. At step 466, using the current X cursor position, the left X pixel position of the region to scroll is calculated using the CALC_X subroutine shown in FIG. 20a and described above. At step 468, using the X position of the end of the line, which in this case equals 80, the right X pixel position of the region to scroll is calculated using the CALC_X subroutine. At step 470, the bottom Y pixel position of the line on which the character(s) are to be inserted is calculated by calling the CALC_Y subroutine, and at step 472, the top Y pixel position of the line on which the character(s) are to be inserted is determined from the CALC_Y subroutine.

At step 474, the box specified by the X and Y pixel positions determined in steps 466–472 is scrolled right the number of cursor positions specified by parameter 1 by sending a scroll right command to the CRT driver 46. As a result, a blank line portion is created so that the desired character(s) may be subsequently inserted during later execution of the display text step 372.

Figure 19B:
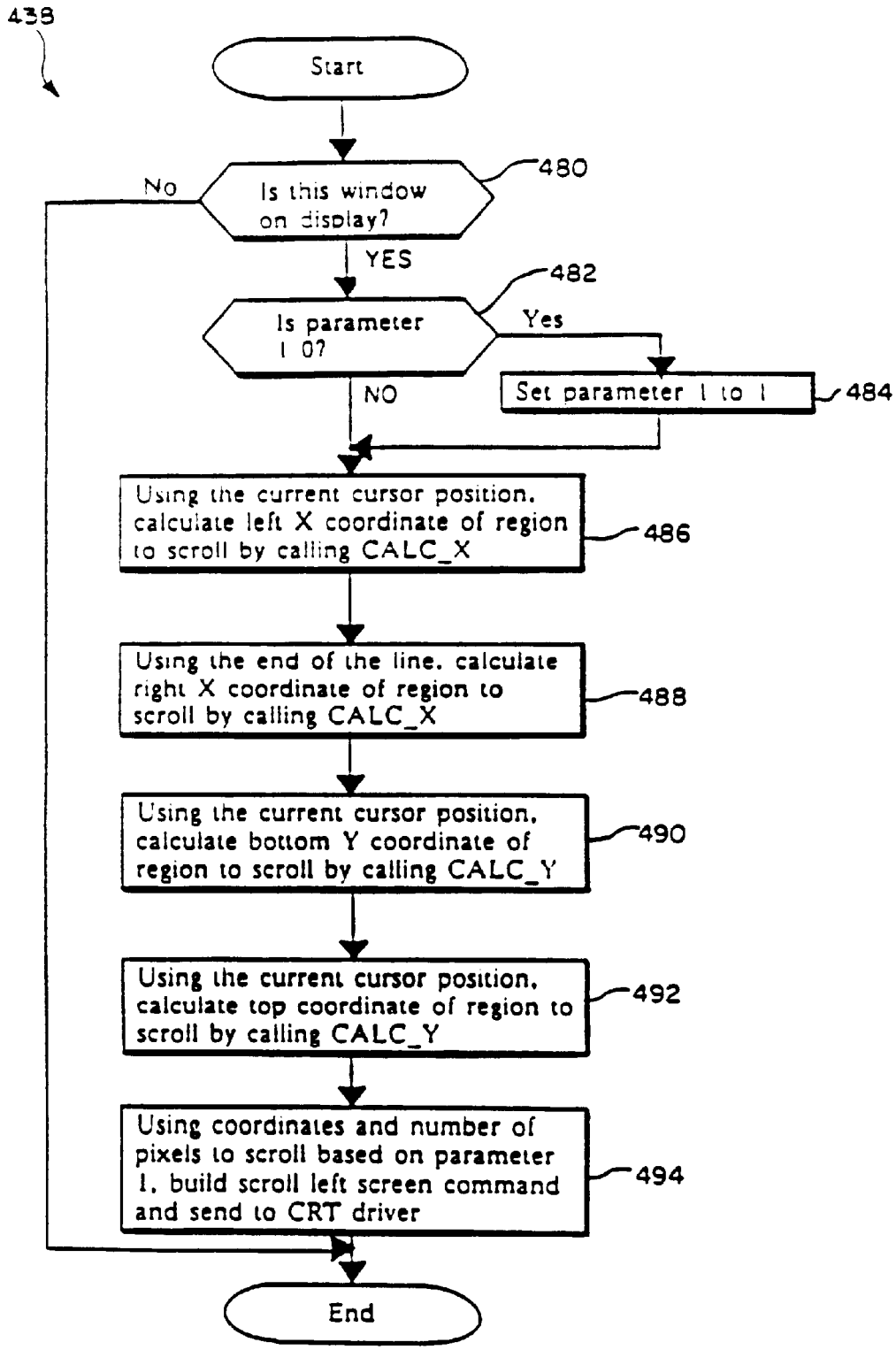

A flowchart of the delete characters step 438 of FIG. 18 is shown in FIG. 19b. During this step, the deletion of one or more characters from text already displayed on the CRT screen is enabled by creating a scroll left screen command and sending it to the CRT driver 46. As a result of the scroll left screen command, the text appearing on the screen is scrolled left so that the desired character(s) are deleted. The delete characters step 438 is used with a single parameter which if nonzero, specifies the number of characters to be deleted, or if zero, specifies that a single character will be deleted.

Now referring to FIG. 19b, at step 480, the program determines whether the window for which the characters are to be deleted is currently on display. If the window is not on display, no output can be made to the window. Thus at step 480, if the window is not on display, the program branches to the end without performing any action. At step 482, the program determines if parameter 1 equals zero. If it does, meaning that only a single character is to be deleted, then the program branches to step 484 where parameter 1 is set to one.

Steps 486–492 determine the X, Y pixel position of each of the four corners of the horizontal line of text that is to be scrolled left to delete the desired character(s). At step 486, using the current X cursor position, the left X pixel position of the region to scroll is calculated using the CALC_X subroutine shown in FIG. 20a and described above. At step 488, using the X position of the end of the line from which character(s) are to be deleted, which in this case equals 80, the right X pixel position of the region to scroll is calculated using the CALC_X subroutine. At step 490, the bottom Y pixel position of the line from which the character(s) are to be deleted is calculated by calling the CALC_Y subroutine, and at step 492, the top Y pixel position of the line from which the character(s) are to be deleted is determined from the CALC_Y subroutine.

At step 494, the box specified by the X and Y pixel positions determined in steps 486–492 is scrolled left the number of cursor positions specified by parameter 1 by sending a scroll left command to the CRT driver 46. As a result, the character(s) which are to be deleted are overwritten by the character(s) to their immediate right on the CRT screen.

Figure 19C:
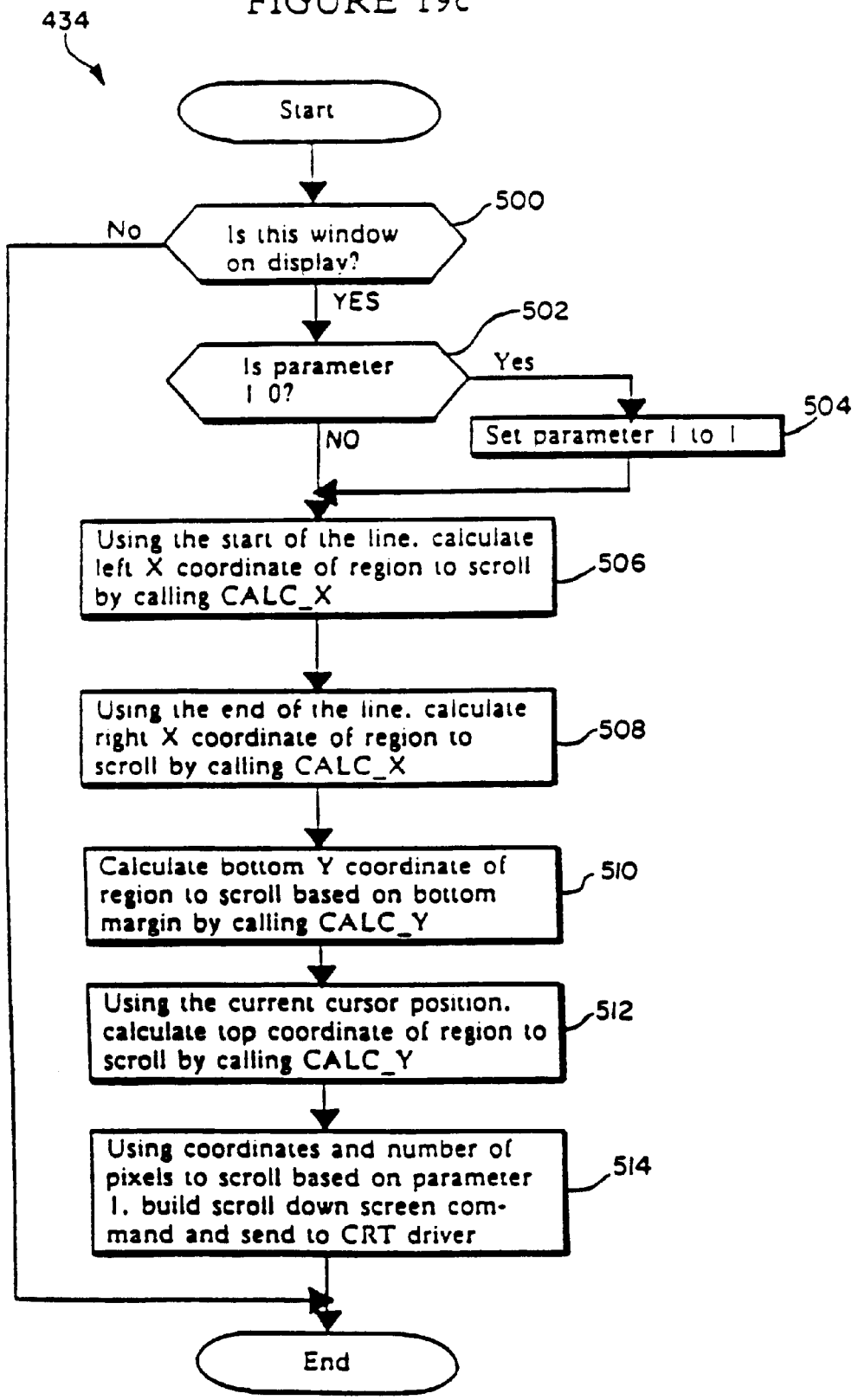

A flowchart of the insert lines step 434 of FIG. 18 is shown in FIG. 19c. During this step, the insertion of one or more lines of text into text already displayed on the CRT screen is enabled by creating a scroll down screen command and sending it to the CRT driver 46. As a result of the scroll down screen command, the text appearing on the screen is scrolled down to create a gap for the insertion of the desired lines of text during the subsequent execution of the display text step 372. The insert lines step 434 is used with a single parameter which if nonzero, specifies the number of lines to be inserted, or if zero, specifies that a single line will be inserted.

Now referring to FIG. 19c, at step 500, the program determines whether the window for which the lines are to be inserted is currently on display. If the window is not on display, no output can be made to the window. Thus at step 500, if the window is not on display, the program branches to the end without performing any action. At step 502, the program determines if parameter 1 equals zero. If it does, meaning that only a single line will subsequently be inserted, then the program branches to step 504 where parameter 1 is set to one.

Steps 506–512 determine the X, Y pixel position of each of the four corners of the block of text that will be scrolled down to make room for the line(s) to be inserted. At step 506, using the X position of the start of a line, which in this case equals 1, the left X pixel position of the region to scroll is calculated using the CALC_X subroutine shown in FIG. 20a and described above. At step 508, using the X position of the end of a line, which in this case equals 80, the right X pixel position of the region to scroll is calculated using the CALC_X subroutine. At step 510, using the Y pixel position of the bottom margin of the application window 98, the bottom Y pixel position of the region to scroll is calculated by calling the CALC_Y subroutine, and at step 512, using the current cursor position, the top Y pixel position of the region to scroll is determined from the CALC_Y subroutine.

At step 514, the rectangular region specified by the X and Y pixel positions determined in steps 506–512 is scrolled down the number of line positions specified by parameter 1 by sending a scroll down command to the CRT driver 46. As a result, a blank rectangular screen portion is created so that the desired lines of text may be subsequently inserted during later execution of the display text step 372.

Figure 19D:
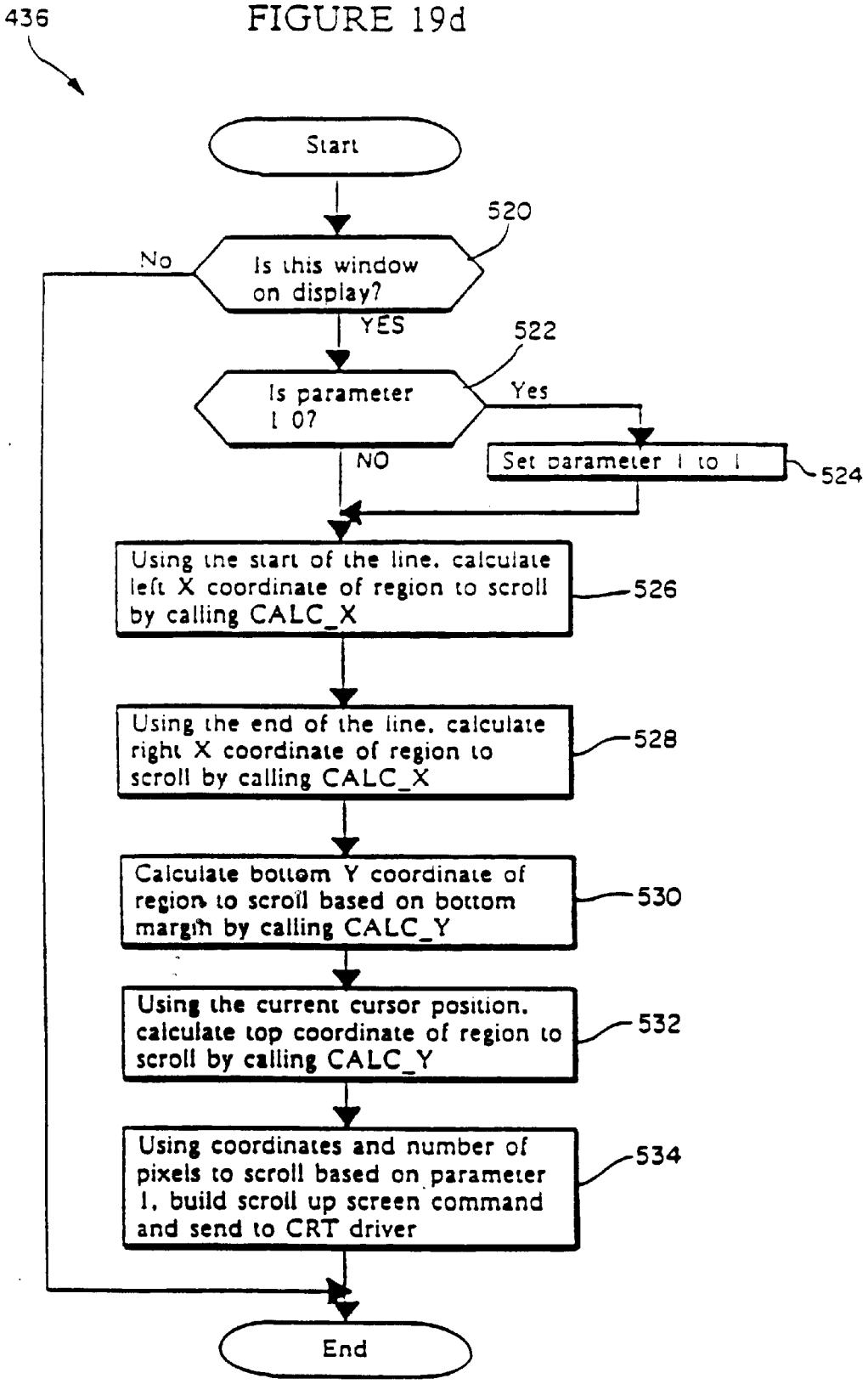

A flowchart of the delete lines step 436 of FIG. 18 is shown in FIG. 19d. During this step, the deletion of one or more lines of text from the CRT screen is accomplished by creating a scroll up screen command and sending it to the CRT driver 46. As a result of the scroll up screen command, the desired lines of text are effectively deleted. The delete lines step 436 is used with a single parameter which if nonzero, specifies the number of lines to be deleted, or if zero, specifies that a single line is to be deleted.

Now referring to FIG. 19d, at step 520, the program determines whether the window for which the lines are to be deleted is currently on display. If the window is not on display, no output can be made to the window. Thus at step 520, if the window is not on display, the program branches to the end without performing any action. At step 522, the program determines if parameter 1 equals zero. If it does, meaning that only a single line is to be deleted, then the program branches to step 524 where parameter 1 is set to one.

Steps 526–532 determine the X, Y pixel position of each of the four corners of the block of text that will be scrolled up to delete the specified line(s) of text. At step 526, using the X position of the start of a line, which in this case equals 1, the left X pixel position of the region to scroll is calculated using the CALC_X subroutine shown in FIG. 20a and described above. At step 528, using the X position of the end of a line, which in this case equals 80, the right X pixel position of the region to scroll is calculated using the CALC_X subroutine. At step 530, using the Y pixel position of the bottom margin, of the application window 98, the bottom Y pixel position of the region to scroll is calculated by calling the CALC_Y subroutine, and at step 532, using the current cursor position, the top Y pixel position of the region to scroll is determined from the CALC_Y subroutine.

At step 534, the rectangular region specified by the X and Y pixel positions determined in steps 526–532 is scrolled up the number of line positions specified by parameter 1 by sending a scroll up command to the CRT driver 46. As a result, the desired lines of text are deleted.

Figure 19E:
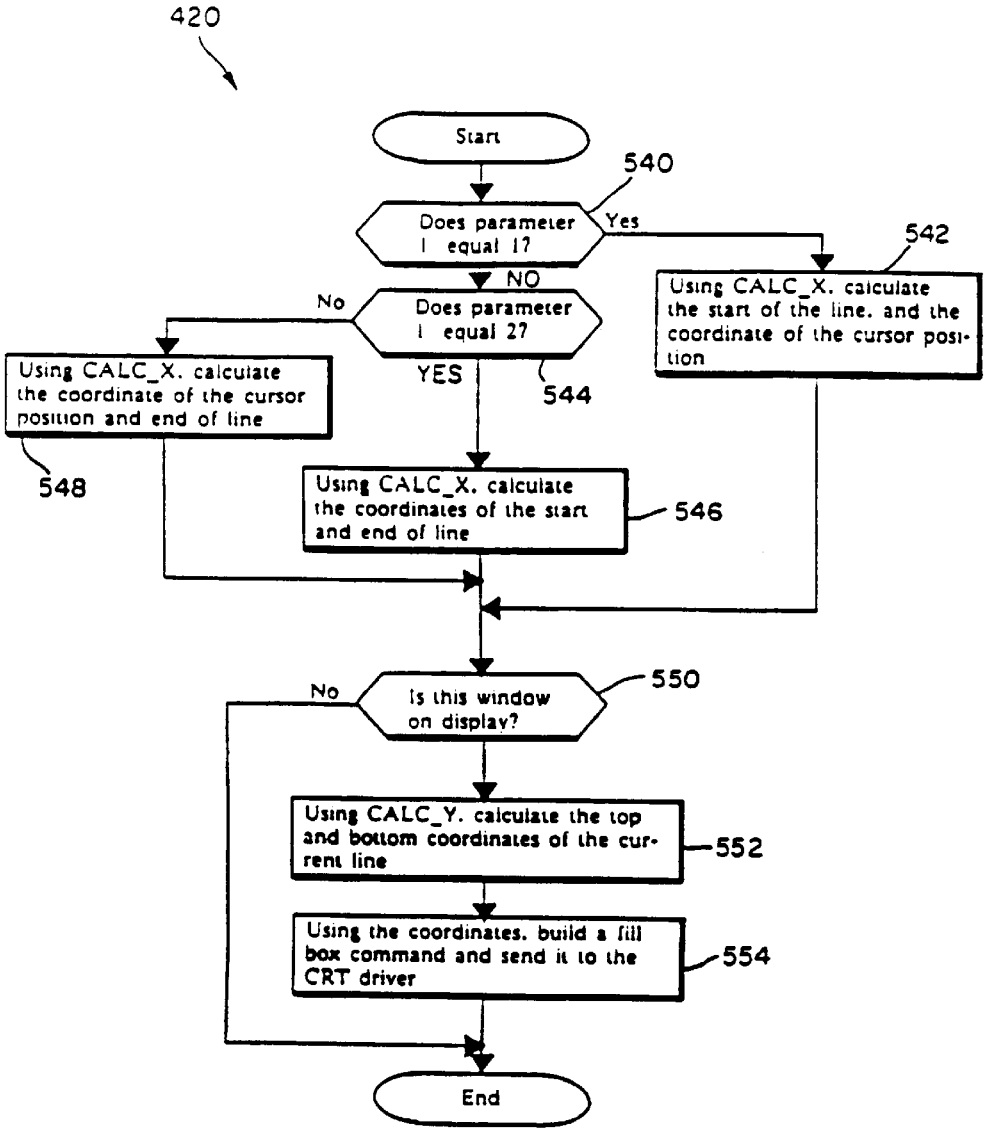

The erase line step 420 shown in FIGS. 17 and 18 is shown in detail in FIG. 19e. The erase line step 420 causes a specified portion of a line of text to be erased from the CRT screen by sending a fill box command to the CRT driver 46, which box is blank.

The erase line step 420 uses a single parameter, parameter 1. If parameter 1 equals one, then portion of the line before the current cursor position is erased. If parameter 1 equals two, then the entire line on which the cursor is position is erased. If parameter 1 is not equal to either one or two, then the portion of the line after the current cursor position is erased.

Now referring to FIG. 19e, at step 540 the program determines whether parameter 1 equals one. If it does, meaning that the portion of the line before the current cursor position is to be erased, then the program branches to step 542 where the left-most X pixel position of the line to be erased is calculated by the subroutine CALC_X, using the X cursor position of the start of a line, which in this case is one, and the rightmost X pixel position of the line to be erased is calculated by the subroutine CALC_X, using the current X cursor position.

If parameter 1 was not equal to one at step 540, the program branches to step 544 where the program determines whether parameter 1 equals two. If it does, meaning that the entire line is to be erased, then the program branches to step 546, where the leftmost and rightmost X pixel positions of the line to be erased are determined from the X positions of the start and the end of a line, respectively, which in this case equal one and 80, respectively.

If parameter 1 is not equal to either one or two, meaning that the portion of the line after the current X cursor position is to be erased, the program branches to step 548 where the left-most X pixel position of the line to be erased is calculated by the subroutine CALC_X, using the X coordinate of the cursor position, and the rightmost X pixel position of the line to be erased is calculated by the subroutine CALC_X, using the X position of the end of a line, which in this case equals 80.

At step 550 the program determines whether the window from which the line or portion of the line is to be erased is on display. If the window is not on display, then the program ends without taking further action.

Because the X pixel positions of the line or portion of the line to be erased was determined in steps 542, 546, or 548, only the Y pixel position of the line to be erased remains to be determined. At step 552, the upper and lower Y pixel positions of the line or line portion to be erased are determined from the CALC_Y subroutine, using the upper and lower Y coordinate positions of the current line. Then at step 554, the line or line portion specified by the X and Y pixel positions determined above at steps 542, 546, or 548 and 552 is erased by sending a fill box command to the CRT driver, the fill box command causing a blank box to be written to the screen.

Figure 19F:
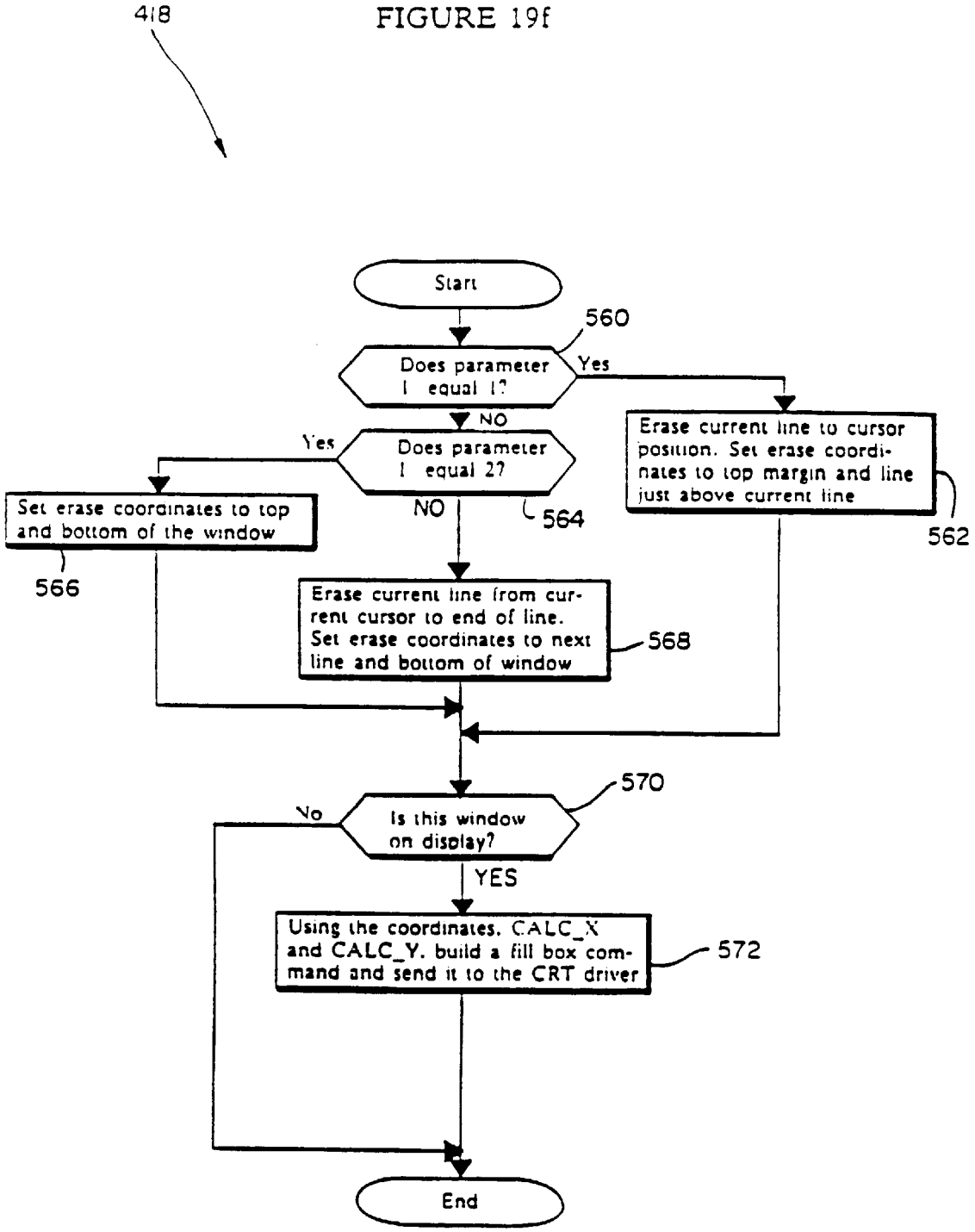

The erase window step 418 shown in FIGS. 17 and 18 is shown in detail in FIG. 19f. As described in detail below, the erase window step 418 causes a specified portion of text to be erased from a window displayed on the CRT screen by (1) erasing a portion of a line and (2) erasing a rectangular screen portion adjacent the erased line by sending a fill box command to the CRT driver, which box is blank. As a result of steps (1) and (2), the screen portion erased may not be rectangular.

The erase window step 418 uses a single parameter, parameter 1. If parameter 1 equals one, then the portion of the screen from the beginning of the window, which corresponds to upper left coordinate position of the window, to the current cursor position is erased. If parameter 1 equals two, then the entire window is erased. If parameter 1 is not equal to either one or two, then the portion of the window after the current cursor position is erased.

Now referring to FIG. 19f, at step 560 the program determines whether parameter 1 equals one. If it does, meaning that the portion of the screen from the beginning of the window to the current cursor position is to be erased, then the program branches to step 562 where the portion of the line before the current cursor position is erased. The upper and lower Y pixel positions are then determined from the CALC_Y subroutine using the Y coordinate of the top of the window and the Y coordinate of the line above the current cursor position, respectively.

If parameter 1 was not equal to one at step 560, the program branches to step 564 where the program determines whether parameter 1 equals two. If it does, meaning that the entire window is to be erased, then the program branches to step 566, where the upper and lower Y pixel positions are determined from the CALC_Y subroutine, using the Y coordinates of the top and bottom of the window, respectively.

If parameter 1 is not equal to either one or two, meaning that the portion of the window after the current cursor position is to be erased, the program branches to step 568 where the portion of the line following the current cursor position is erased. The upper and lower Y pixel positions are then determined from the CALC_Y subroutine, using the Y coordinate positions corresponding to the line after current Y cursor position and the Y coordinate of the bottom of the window, respectively.

At step 570 the program determines whether the window from which the text portion is to be erased is on display. If the window is not on display, then the program ends without taking further action.

Because the Y pixel positions of the rectangular portion to be erased was determined in steps 562, 566, or 568, only the left and right X pixel positions of the portion to be erased remain to be determined. At step 572, the left and right X pixel positions of portion to be erased are determined from the CALC_X subroutine, using the left and right X coordinates of a window line. Then the rectangular portion specified by the X and Y pixel positions determined above at steps 562, 566, or 568 and 572 is erased by sending a fill box command to the CRT driver, the fill box command causing a blank box to be written to the screen.

Figure 19G:
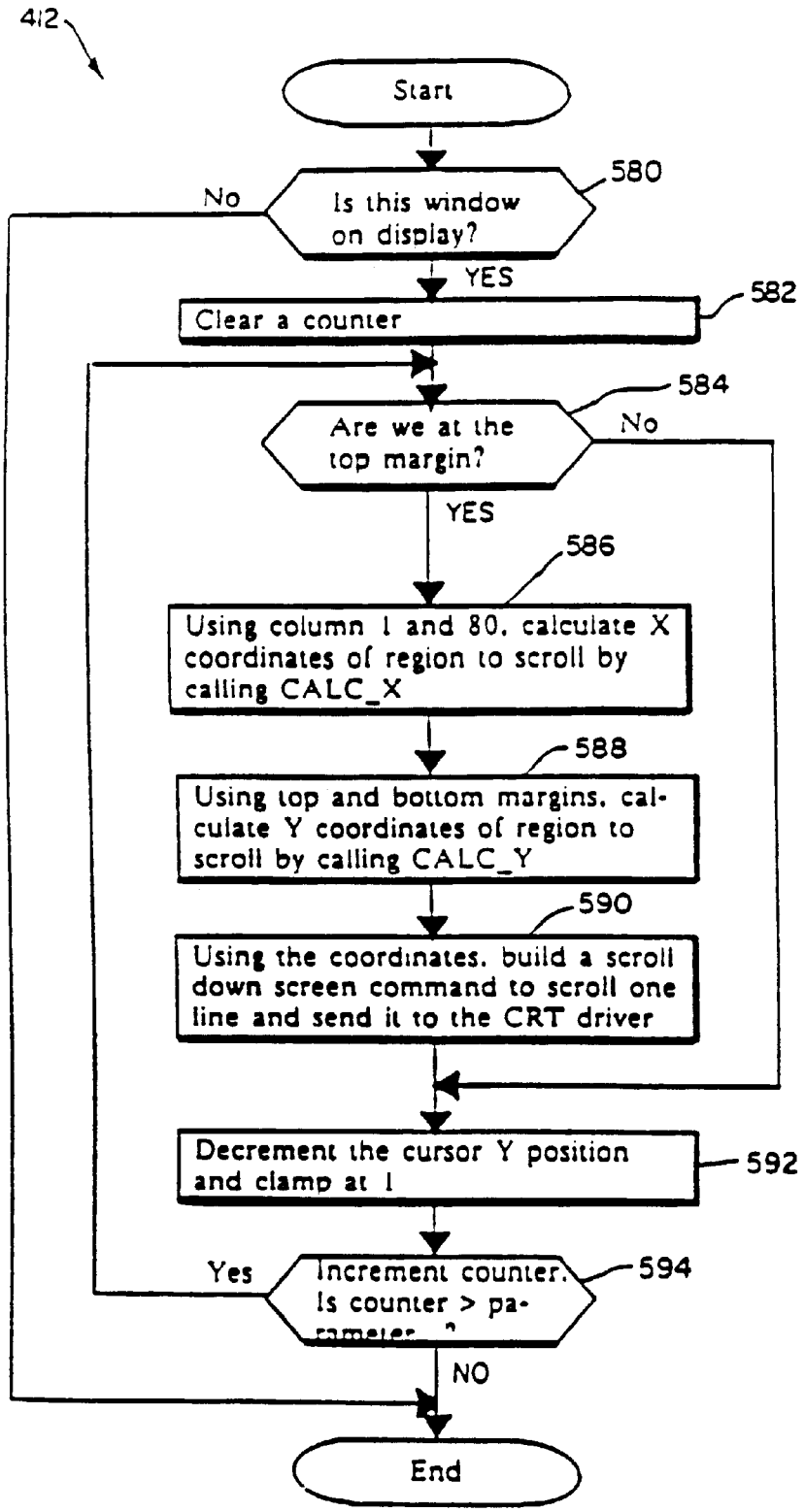

A flowchart of the move cursor up step 412 of FIGS. 17 and 18 is shown in FIG. 19g. The move cursor up step 412 causes the cursor to be moved up a specified number of positions, the number of positions being specified by a single parameter, parameter 1. If the cursor reaches the top margin of the window in the course of its movement, then the window is scrolled down, one line at a time, so that the line to which the cursor is to be moved will appear on the display.

Referring to FIG. 19g, at step 580, if the window in which the cursor is to be moved is not on display, then no action is taken and the program ends. At step 582, a counter (not shown) is initialized to zero. The purpose of the counter is to keep track of the number of positions the cursor has been moved up during the step 412 so that the program can determine when it has moved the cursor the number of positions specified by parameter 1.

At step 584, the program determines whether the cursor is at the top margin of the window. If the cursor is not at the top margin, then the cursor can be moved up one position without the need to scroll the display down. If the cursor is at the top margin, then a scroll down command is sent to the CRT driver 46. To perform the scroll down, the program branches to step 586 where left and right X pixel positions of the region to scroll are determined from the $CALC_{13}X$ subroutine, using the left and right X coordinates of the window region, respectively. In this case, since the window lies across the entire CRT screen, these left and right X coordinates are one and 80, respectively.

At step 588, the upper and lower Y pixel positions of the region to scroll are determined from the $CALC_{13}Y$ subroutine, using the Y coordinates of the top and bottom margin of the window region, respectively. At step 590, the region specified by the X and Y pixel positions determined in steps 586, 588 is scrolled down one position, or 10 pixels, by sending a scroll down command to the CRT driver 46. As a result, a new line of text will appear at the top margin of the window and the cursor will be able to be moved up one Y position.

At step 592 the Y cursor position is decremented, which will cause the cursor to be moved up one line of text. The Y cursor position is then "clamped" at one, meaning that if the current Y cursor position is less than one (an error condition which should not normally occur), then the Y cursor position is set equal to one. At step 594, the counter is incremented by one, and then the count is compared to the value of parameter 1 to determine if the cursor has been moved up the specified number of positions. If not, then the program branches back to step 584 to move the cursor up again.

Figure 19H:
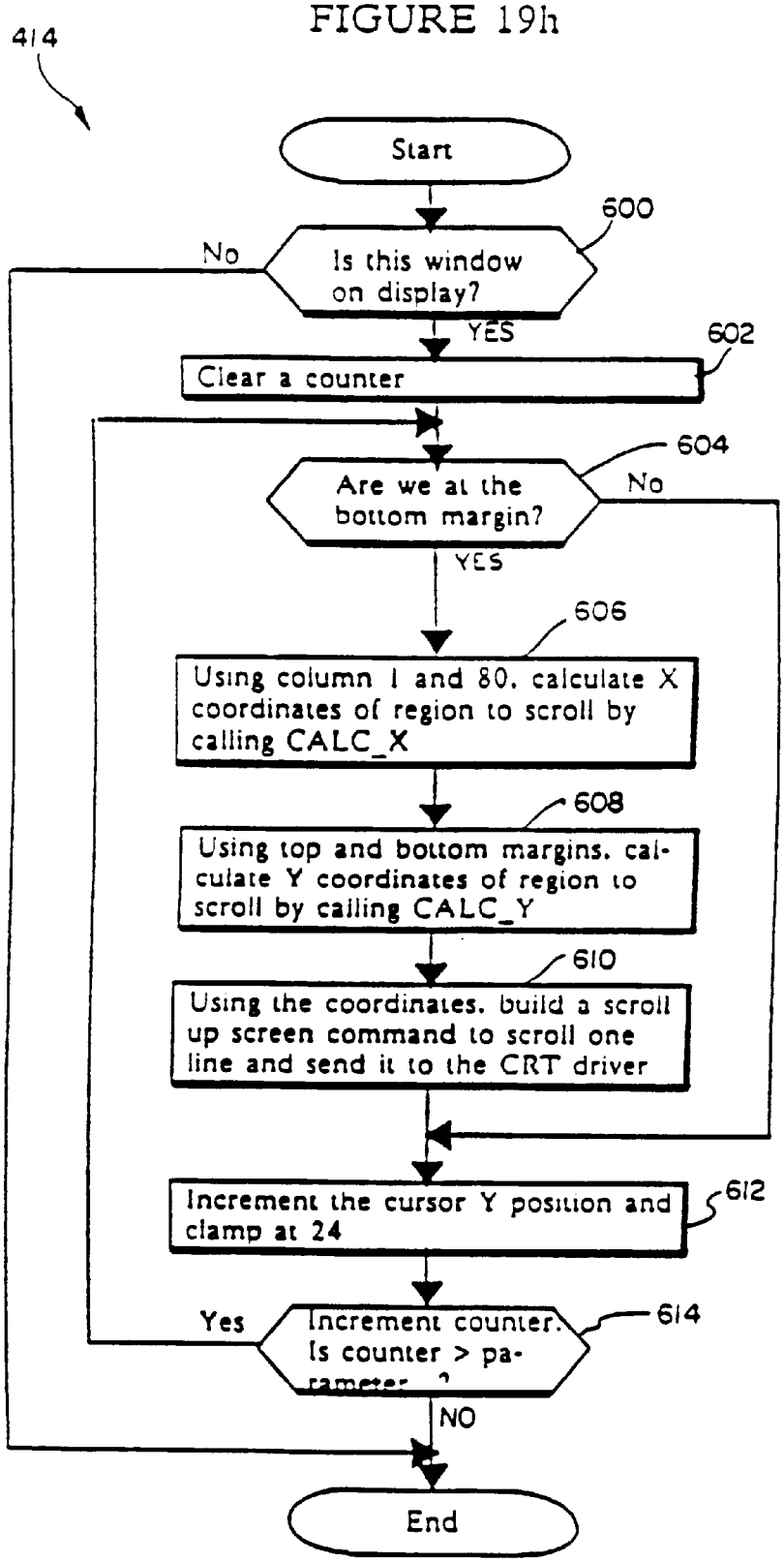

A flowchart of the move cursor down step 414 of FIGS. 17 and 18 is shown in FIG. 19h. The move cursor down step 414 causes the cursor to be moved down a specified number of positions, the number of positions being specified by a single parameter, parameter 1. If the cursor reaches the bottom margin of the window in the course of its movement, then the window is scrolled up, one line at a time, so that the line to which the cursor is to be moved will appear on the display.

Referring to FIG. 19h, at step 600, if the window in which the cursor is to be moved is not on display, then no action is taken and the program ends. At step 602, a counter (not shown) is initialized to zero. The purpose of the counter is to keep track of the number of positions the cursor has been moved down during the step 414 so that the program can determine when it has moved the cursor the number of positions specified by parameter 1.

At step 604, the program determines whether the cursor is at the bottom margin of the window. If the cursor is not at the bottom margin, then the cursor can be moved down one position without the need to scroll the display up. If the cursor is at the bottom margin, then a scroll up command is sent to the CRT driver 46. To perform the scroll up, the program branches to step 606 where left and right X pixel positions of the region to scroll are determined from the $CALC_{13}X$ subroutine, using the left and right X coordinates of the window region, respectively. In this case, since the window lies across the entire CRT screen, these left and right X coordinates are one and 80, respectively.

At step 608, the upper and lower Y pixel positions of the region to scroll are determined from the $CALC_{13}Y$ subroutine, using the Y coordinates of the top and bottom margin of the window region, respectively. At step 610, the region specified by the X and Y pixel positions determined in steps 606, 608 is scrolled up one position, or 10 pixels, by sending a scroll up command to the CRT driver. As a result, a new line will appear at the bottom margin of the window and the cursor will be able to be moved down one Y position.

At step 612, the Y cursor position is incremented, which will cause the cursor to be moved down one line of text. The Y cursor position is then "clamped" at 24, meaning that if the current Y cursor position is greater than 24 (an error condition which should not normally occur since there are only 24 lines of text in the application window 98), then the Y cursor position is set equal to 24. At step 614, the counter is incremented by one, and then the count is compared to the value of parameter 1 to determine if the cursor has been moved down the specified number of positions. If not, then the program branches back to step 604 to move the cursor down again.

Figure 19J:
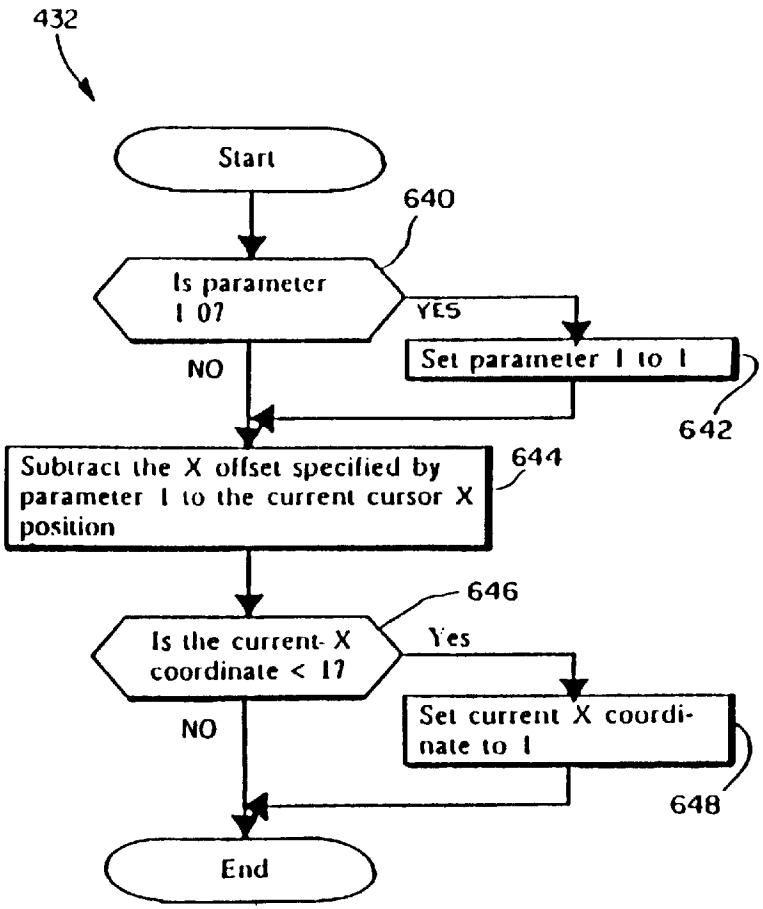
Figure 19I:
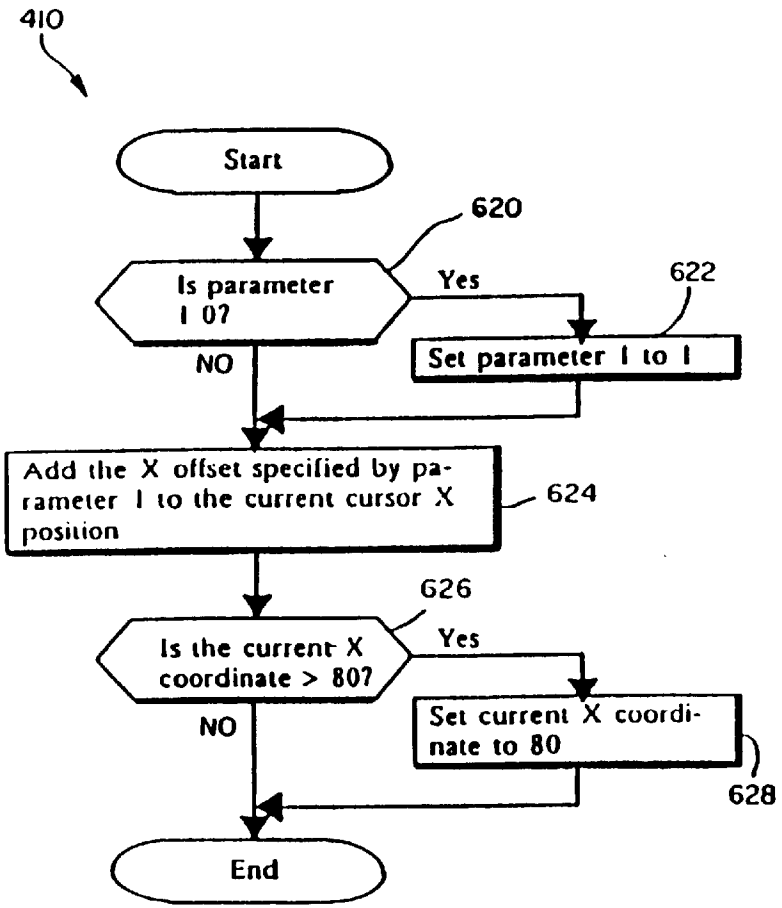

A flowchart of the move cursor right step 410 of FIGS. 17 and 18 is shown in FIG. 19i. The move cursor right step 410 causes the cursor to be moved to the right a specified number of positions, the number of positions being specified by a single parameter, parameter 1. If parameter 1 equals zero, then cursor is moved a single position to the right.

Now referring to FIG. 19i, at step 620 the program determines if parameter 1 is zero. If it is, meaning that the cursor is to be moved right a single position, then the program branches to step 622 where parameter 1 is set equal to one. At step 624, the number of cursor positions, or X offset, specified by parameter 1 is added to the current cursor position. As a result, the cursor will be displayed at the new position. At step 626, the X cursor position is compared to the number 80 , which corresponds to the number of X character positions of the application window. If the new cursor position is greater than 80 , which is an error condition that does not normally occur, the program branches to step 628 where the cursor position is changed so that it equals 80. The program then ends.

A flowchart of the move cursor left step 432 of FIG. 18 is shown in FIG. 19j. The move cursor left step 432 causes the cursor to be moved to the left a specified number of positions, the number of positions being specified by a single parameter, parameter 1. If parameter 1 equals zero, then cursor is moved a single position to the left.

Now referring to FIG. 19j, at step 640 the program determines if parameter 1 is zero. If it is, meaning that the cursor is to be moved left a single position, then the program branches to step 642 where parameter 1 is set equal to one. At step 644, the number of cursor positions, or X offset, specified by parameter 1 is subtracted from the current cursor position. As a result, the cursor will be displayed at the new position. At step 646, the X cursor position is compared to the number one, which corresponds to the leftmost X character position of the application window. If the new cursor position is less than one, which is an error condition that does not normally occur, the program branches to step 648 where the cursor position is changed so that it equals one. The program then ends.

Figure 19K:
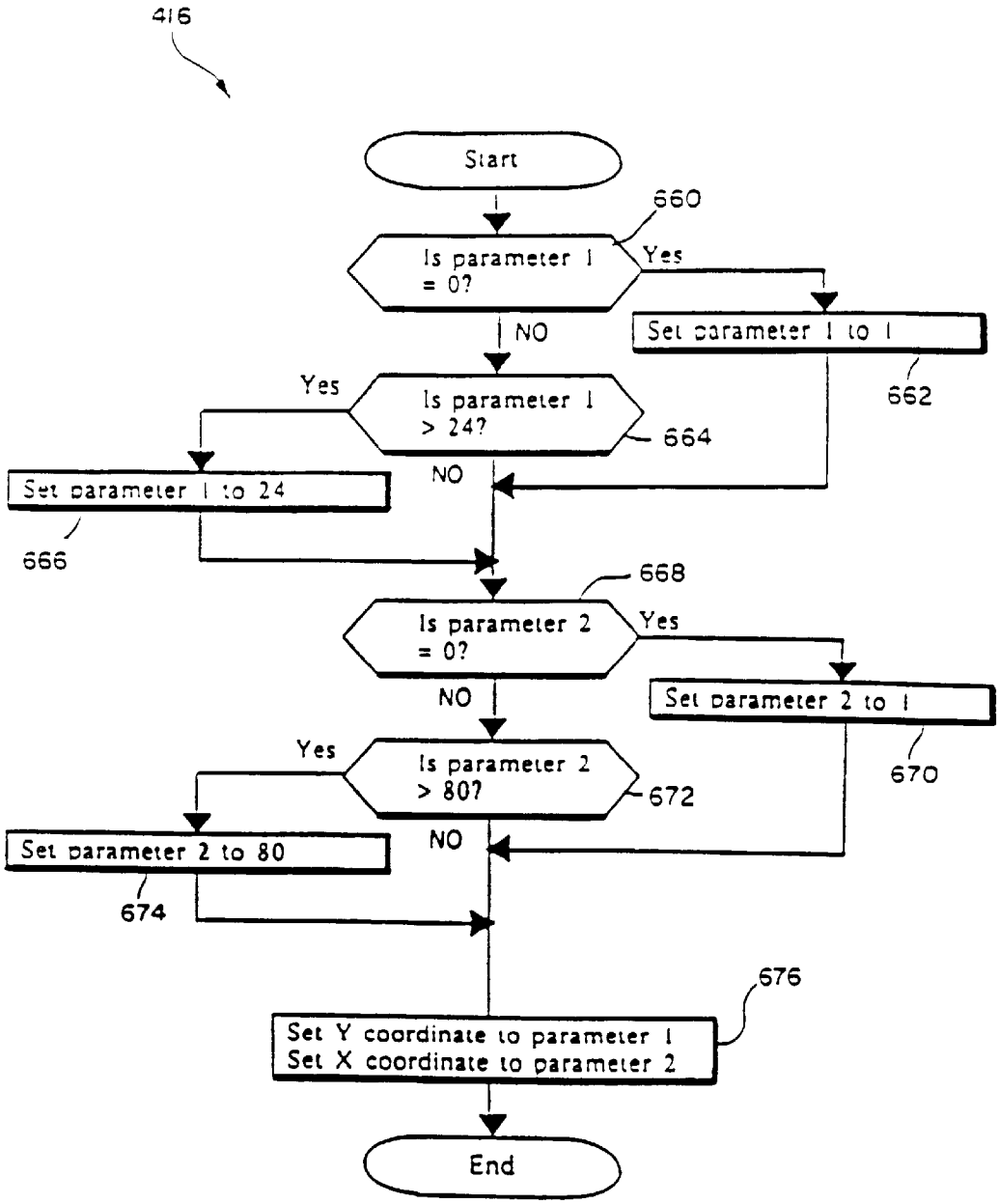

A flowchart of the move cursor step 416 of FIGS. 17 and 18 is shown in FIG. 19k. The move cursor step 416 causes the cursor to be moved to a new location, based upon the X, Y coordinates specified by a pair of parameters, parameter 2 and parameter 1, respectively. If parameters 1 and 2 are both zero, the cursor is positioned to the top left corner of the window at cursor position (1, 1). This step 416 differs from the move cursor steps previously described since they move the cursor a predetermined number of positions relative to its current position, while this step 416 specifies an absolute position independent of the current cursor position.

Now referring to FIG. 19k, at step 660, the program determines whether parameter 1 is equal to zero. If it is, the program branches to step 662 where parameter 1 is set to one. Step 662 is a default step which causes the Y cursor position to be changed to the top line in the window. Since all the parameters were set equal to zero at step 422 (FIG. 17) before the program entered the CSI state 406, if parameter 1 and parameter 2 are not specified, they will equal zero.

At step 664, the value of parameter 1 is tested to determine whether it is greater than 24. If parameter 1 is greater than 24, which is an error condition since there are only 24 lines in the application window 98, then the program branches to step 666 where parameter 1 is set equal to 24, its maximum value.

At step 668, the program determines whether parameter 2 is equal to zero. If it is, meaning that no parameter 2 has been specified, then the program branches to step 670 at which point the value of parameter 2 defaults to one. At step 672, the program determines whether parameter 2 is greater than 80 , which signifies an error condition since there can be no more than 80 characters in a line. If parameter 2 is greater than 80 , then the program branches to step 674 where parameter 2 is set equal to 80 , its maximum value. At step 676, the current X, Y position of the cursor is changed, X being set equal to the value of parameter 2 and Y being set equal to the value of parameter 1. As a result, the cursor will appear in the new position.

The foregoing description of FIGS. 17, 18, 19a–19k, and 20a and 20b relates to transitions made from the escape state 400 and the CSI state 406 and various steps that are performed in connection therewith. That description is concerned primarily with the display of textual information on the CRT screen. The following description, which is made with respect to FIGS. 15, 21, 22a–22e, 23a and 23b relates primarily to the display of graphics on the CRT screen.

Figure 21:
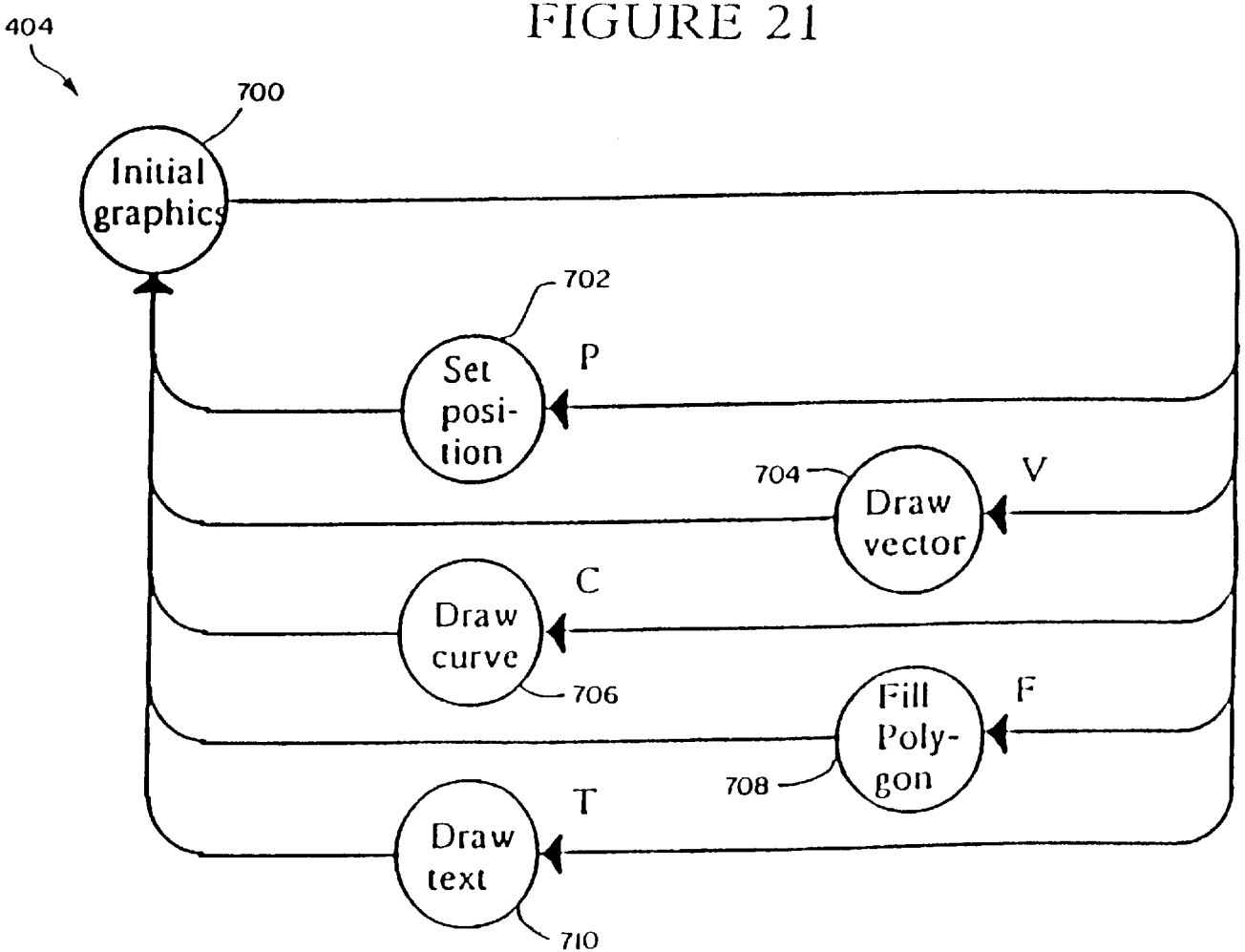
FIG. 21 is a state diagram of the graphics state shown in FIG. 15.

A state diagram of the graphics state 404 of FIG. 15 is shown in FIG. 21. The graphics functions that may be performed when the program is in the graphics state 404 include setting the cursor to a predetermined position on the CRT screen, drawing a vector, drawing a curve, filling a polygon, and drawing text.

Now referring to FIG. 21, the graphics state 404 comprises six separate states, including an initial graphics state 700 which awaits the receipt of graphics commands from the host computer 64, and five additional states during which particular functions are performed in connection with displaying information on the CRT screen. In particular, these five states include a set position state 702 to which the program passes upon receipt of the "P" character from the host computer 64; a draw vector state 704 to which the program passes upon receipt of the "V" character; a draw curve state 706 upon receipt of the "C" character; a fill polygon state 708 upon receipt of the "F" character; and a draw text state 710 upon receipt of the "T" character.

Figure 22A:
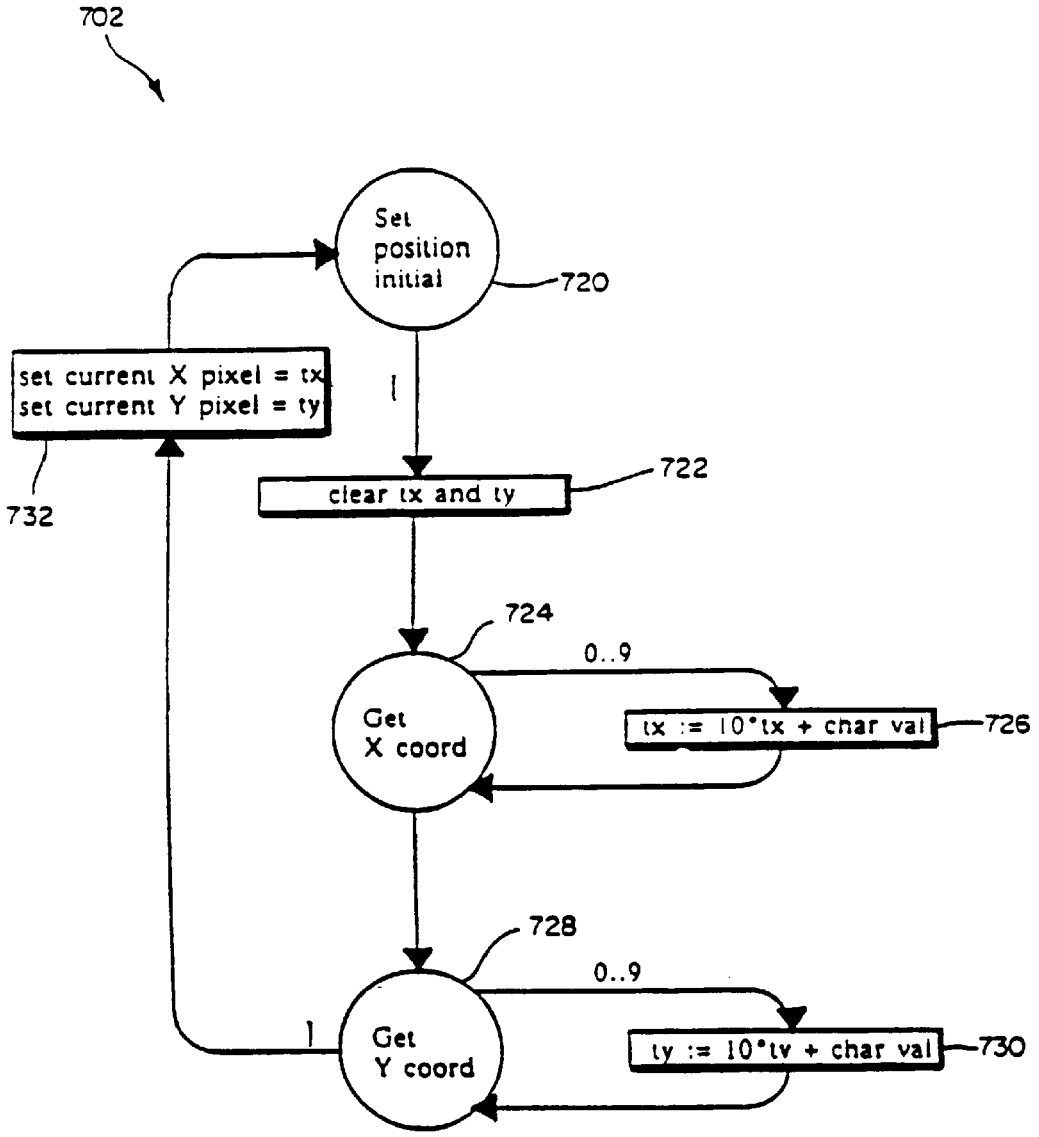
FIGS. 22a through 22e are state diagrams of various states shown in FIG. 21.

A state diagram of the set position state 702 of FIG. 21 is shown in FIG. 22a. The state diagram of FIG. 22a functions by recognizing a particular sequence of characters from the host computer 64, and setting the cursor position to a predetermined location on the CRT screen depending upon the sequence of characters received. The set position state diagram recognizes the character string "P[X,Y]" and, in response, moves the cursor to a predetermined pixel position based upon the parameters X, Y transmitted between the brackets. State diagrams are conventional and well known programming means which are particularly suited to recognizing patterns of characters.

Now referring to FIG. 22a, the state diagram 702 reacts to the character string "P[X, Y]" by moving the cursor to a predetermined pixel position on the CRT screen. The receipt of a "P" causes the transition to a set position initial state 720 from the initial graphics state 700 shown in FIG. 21. Upon receipt of the "[" character, the program performs step 722 and then branches to a state 724 in order to get the pixel position specified by X. At step 722, two parameters, tx and ty, are initialized to zero. These two parameters, which are used in various steps described below, specify X and Y pixel positions on the CRT screen of a DEC terminal, respectively, the upper left-hand portion of the screen being defined as the pixel position (0, 0).

While in state 724, the program receives the X parameter, which may comprise one or more of the ASCII characters 0 through 9. Each time a character is received the program branches to step 726 at which point it converts the ASCII character to its associated binary character value, and adds this amount to the current value of tx multiplied by 10 in order to contribute its proper decimal value. For example, if the characters "3" and "5" are received in succession, tx would equal 3 after the first execution of step 726 and tx would equal 35 after the second execution of step 726. When a comma is received, signalling the end of the characters specifying the X pixel position, the program transfers to a state 728 during which the Y pixel position is received. This state 728 operates in the same way as state 724, and thus at step 730 the value of the Y pixel position is computed and saved in ty.

The receipt of the "]" character signals the program that all ASCII numerals specifying the Y pixel position have been received, and the program thus branches to step 732, where the current X, Y pixel position of the cursor is set equal to the tx, ty position just determined.

Figure 22B:
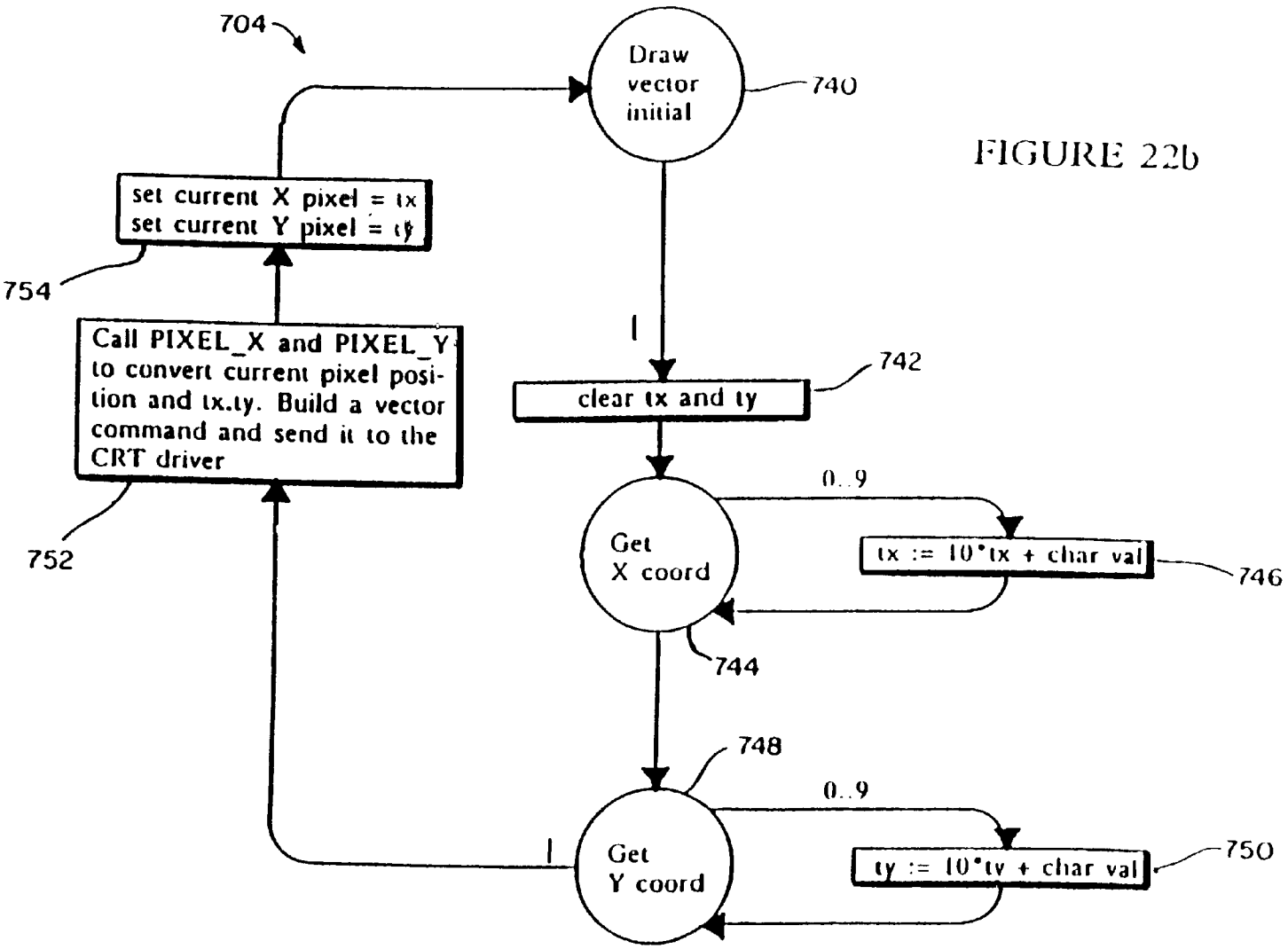

A state diagram of the draw vector state 704 of FIG. 21 is shown in FIG. 22b. The state diagram of FIG. 22b functions by recognizing a particular sequence of characters from the host computer 64, and drawing a vector from the current cursor pixel position to a specified pixel position on the CRT screen, depending upon the sequence of characters received. The draw vector state diagram recognizes the character string "V[X, Y]" and, in response, draws a line from the current cursor pixel position to a pixel position based upon the parameters X, Y transmitted between the brackets.

Now referring to FIG. 22b, the state diagram 704 reacts to the character string "V[X, Y]" by drawing a vector from the current cursor pixel position to a specified pixel position on the CRT screen. The receipt of a "V" causes the transition to a draw vector initial state 740 from the initial graphics state 700 shown in FIG. 21. Upon receipt of the "[" character, the program performs step 742 and then branches to a state 744 in order to determine a pixel position specified by X. At step 742, the two parameters tx and ty are initialized to zero.

While in state 744, the program receives the X parameter, which may comprise one or more of the ASCII characters 0 through 9. Each time a character is received, the program branches to step 746 at which point it converts the ASCII character to its associated binary character value, and adds this amount to the current value of tx multiplied by 10 in order to contribute its proper decimal value. When a comma is received, signalling the end of the characters specifying the X pixel position, the program transfers to a state 748 during which the Y pixel position is received. This state 748 operates in the same way as state 744, and thus at step 750 the value of the Y pixel position is computed and saved in ty.

The receipt of the "]" character signals the program that all ASCII numerals specifying the Y pixel position have been received, and the program thus branches to step 752. At step 752, a vector is drawn from the current cursor pixel position to the pixel position specified by (tx, ty).

Before the vector can be drawn on the CRT screen of the process control terminal 60, however, the current cursor pixel position and the pixel position specified by (tx, ty) must be transformed. The reason that the transformation is required is that a standard DEC terminal to which the host computer 64 communicates has a CRT screen 800 pixels wide by 480 pixels tall, with the upper left-hand corner of the screen being defined as the (0, 0) pixel position. However, the application window 98 displayed on the CRT screen of the terminal 60 is 480 pixels wide by 240 pixels tall, the lower left-hand corner of the window being defined as the (0, 0) pixel position. Thus, in order to display substantially the same image in the application window 98 on the CRT screen as that transmitted by the host computer 64, a pixel transformation is performed before any graphics are displayed on the CRT screen by the CRT driver 46.

Figure 23A:
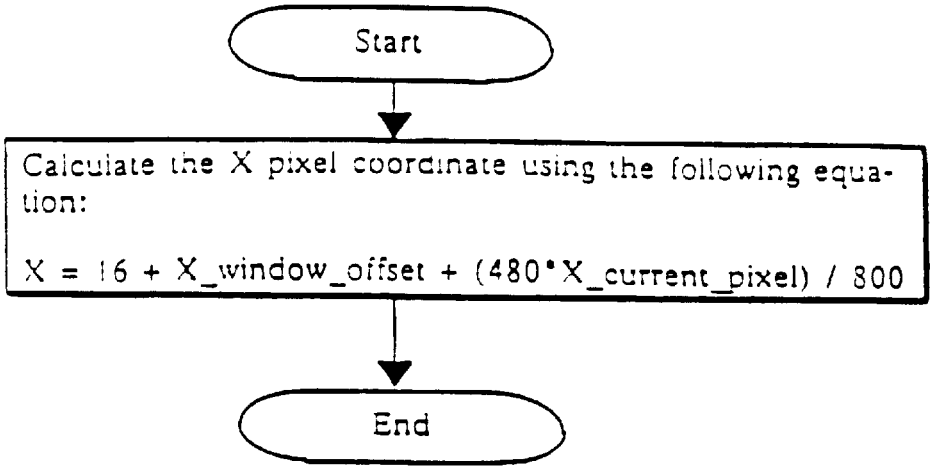
FIGS. 23a and 23b are flowcharts of two subroutines called by a number of the steps shown in FIGS. 22a through 22e.

A flowchart of the subroutine that accomplishes this X pixel transformation, $PIXEL_X$, is shown in FIG. 23a. The X pixel position specified by the host computer 64 is transformed by using Equation [3] set forth below:

$$X=16+X_window\ offset+(480^* X_pixel)/800,$$

where X is the X pixel position being calculated for the CRT screen of the terminal 60, the number 16 corresponds to the vertical border portion 110 of the display, X_window_offset is a predetermined window offset with respect to the vertical border portion 110, the number 480 is the horizontal width of the display of the CRT screen, $X_{13}$ pixel is the pixel position for a DEC terminal for which X is being calculated, and the number 800 is the horizontal width of the display of a standard DEC terminal.

Figure 23B:
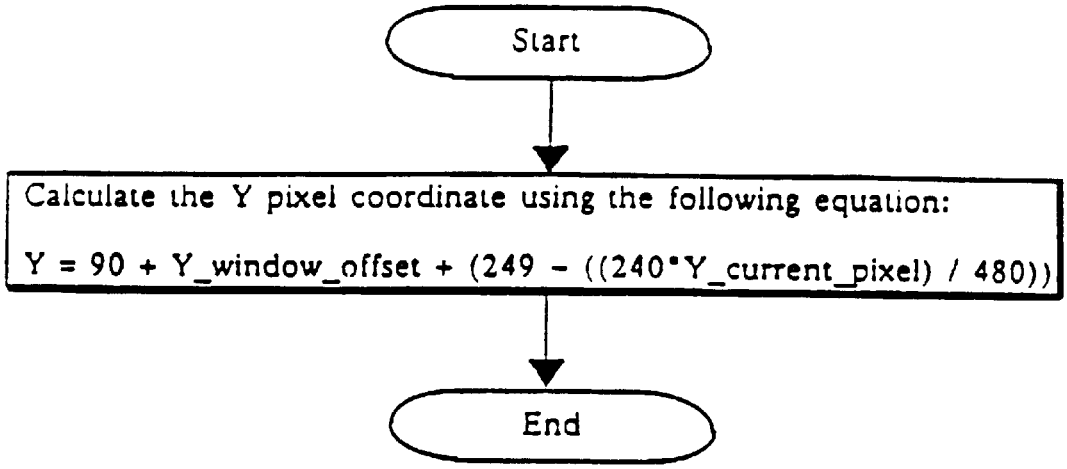

A flowchart of the subroutine that accomplishes this Y pixel transformation, PIXEL_Y, is shown in FIG. 23b. The Y pixel position specified by the host computer is transformed by using the Equation [4] set forth below:

$$Y=90+Y_window_offset-(249-((240^* Y_pixel)/480,$$

where Y is the Y pixel position being calculated for the CRT screen of the terminal 60, the number 90 corresponds to the process control portion 92 of the display, Y_window_offset is a predetermined window offset with respect to the process control portion 92, the number 249 is related to the height in pixels of the application window 98, the number 240 is equal to the visual display height in pixels of the application window 98, Y_pixel is the pixel position for a standard DEC terminal for which Y is being calculated, and the number 480 is the height in pixels of the display of the DEC terminal.

Referring back to step 752 in FIG. 22b, the PIXEL_X and PIXEL_Y subroutines are called to convert both the current cursor pixel position and the tx, ty pixel position, and then a vector is drawn from the former position to the latter position by sending a draw vector command to the CRT driver 46. At step 754, the current cursor pixel position is set equal to (tx, ty) to record the new cursor position. The variables tx and ty are not changed during the execution of the PIXEL_X and PIXEL_Y routines, and thus the current cursor position represents the DEC pixel format.

Figure 22C:
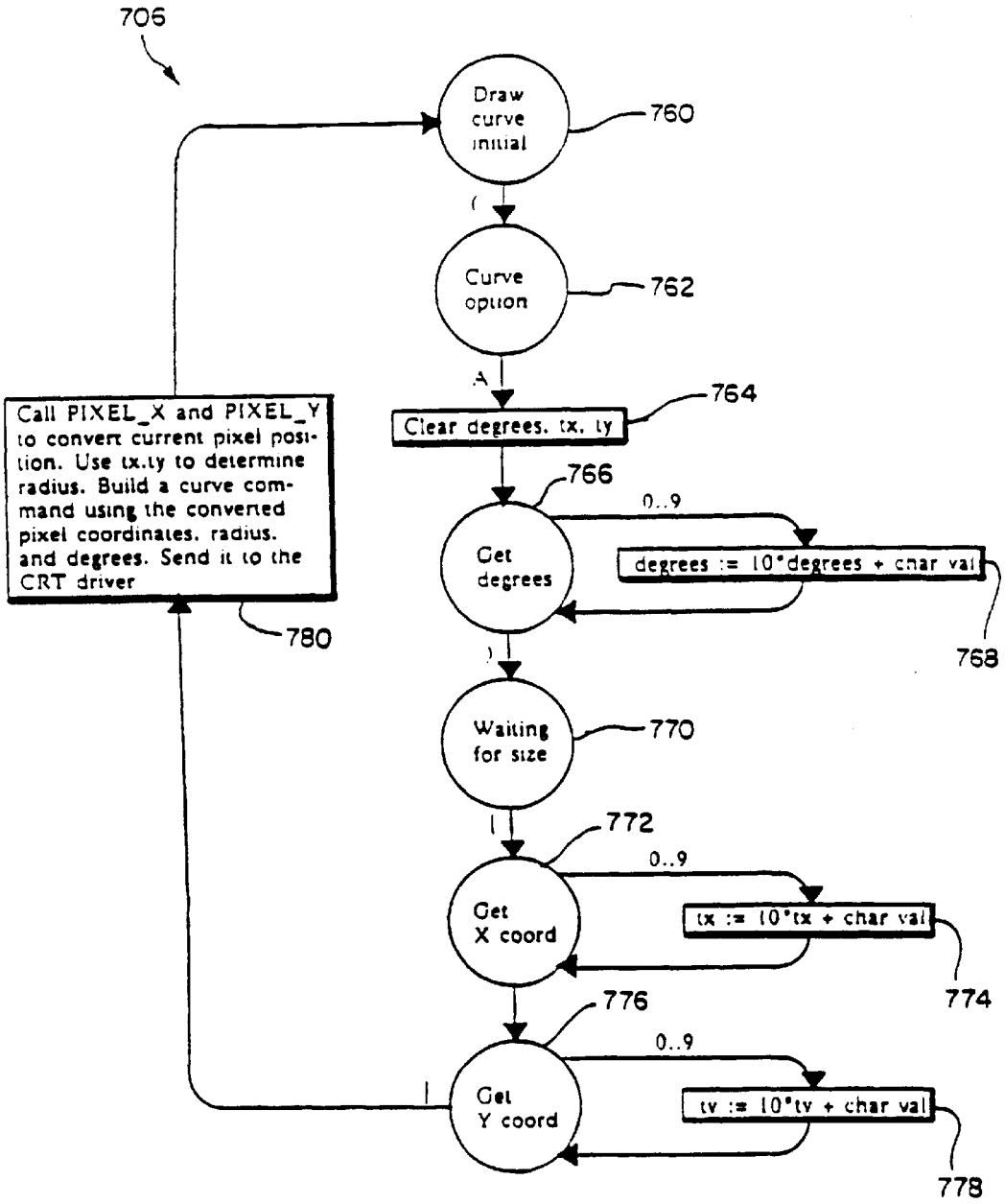

A state diagram of the draw curve state 706 of FIG. 21 is shown in FIG. 22c. The state diagram of FIG. 22c functions by recognizing a particular sequence of characters from the host computer 64, and drawing a curve on the CRT screen based upon the sequence of characters received. The draw curve state diagram determine a pixel position specified by X, response, draws a circular curve having its center at the current cursor pixel position, the curve beginning at a pixel position based upon the parameters X, Y, and the length of the curve depending upon an angle specified by the parameter # following the character "A" in the parentheses.

Now referring to FIG. 22c, the receipt of a "C" causes the transition to a draw curve initial state 760 from the initial graphics state 700 shown in FIG. 21. Upon receipt of a left parenthesis, the program branches to a curve option state 762 at where the program waits for the character "A." The "A" character signifies that the numbers which follow specify an angular displacement in degrees, for example 90°, through which the curve will be drawn. For example, if "A" is followed by the three ASCII characters "3," "6," and "0," a circle will be drawn on the CRT screen. Upon receipt of an "A," the program performs step 764 where the parameters tx and ty are cleared by setting them equal to zero, and then the program branches to a state 766 where it waits for the angular displacement in degrees of the curve to be drawn.

While in the state 766, the program receives the number of degrees of angular displacement of the curve, which may be specified by one or more of the ASCII characters 0 through 9. Each time a character is received, the program branches to step 766 at which point it converts the ASCII character to its associated binary character value, and adds this amount to the current value of degrees multiplied by 10 in order to contribute its proper decimal value. When a right parenthesis is received, signalling the end of the characters specifying the angular displacement, the program transfers to a state 770 which waits for the X and Y parameters. Upon receipt of the "[" character, the program branches to a state 772 in order to determine a pixel position specified by X.

While in state 772, the program receives the X parameter, which may comprise one or more of the ASCII characters 0 through 9. Each time a character is received, the program branches to step 774 at which point it converts the ASCII character to its associated binary character value, and adds this amount to the current value of tx multiplied by 10 in order to contribute its proper decimal value. When a comma is received, signalling the end of the characters specifying the X pixel position, the program transfers to a state 776 during which the Y pixel position is received. This state 776 operates in the same way as state 772, and thus at step 778 the value of the Y pixel position is computed and saved in ty.

The receipt of the "]" character signals the program that all ASCII numerals specifying the Y pixel position have been received, and the program thus branches to step 780.

At step 780, a circular curve is drawn. Before the curve is drawn, the PIXEL_X and PIXEL_Y subroutines are called to convert both the current cursor pixel position and the pixel position specified by (tx, ty) to the display format of the terminal 60. After the two points have been converted, the curve is drawn, the center of the circular curve being the current cursor pixel position, and the circular curve beginning at the point specified by the transformed (tx, ty). The curve is drawn for a length corresponding to the angular displacement in degrees as calculated at step 768. The draw curve command is then transmitted to the CRT driver 46, which then causes the specified curve to appear on the CRT screen.

Figure 22D:
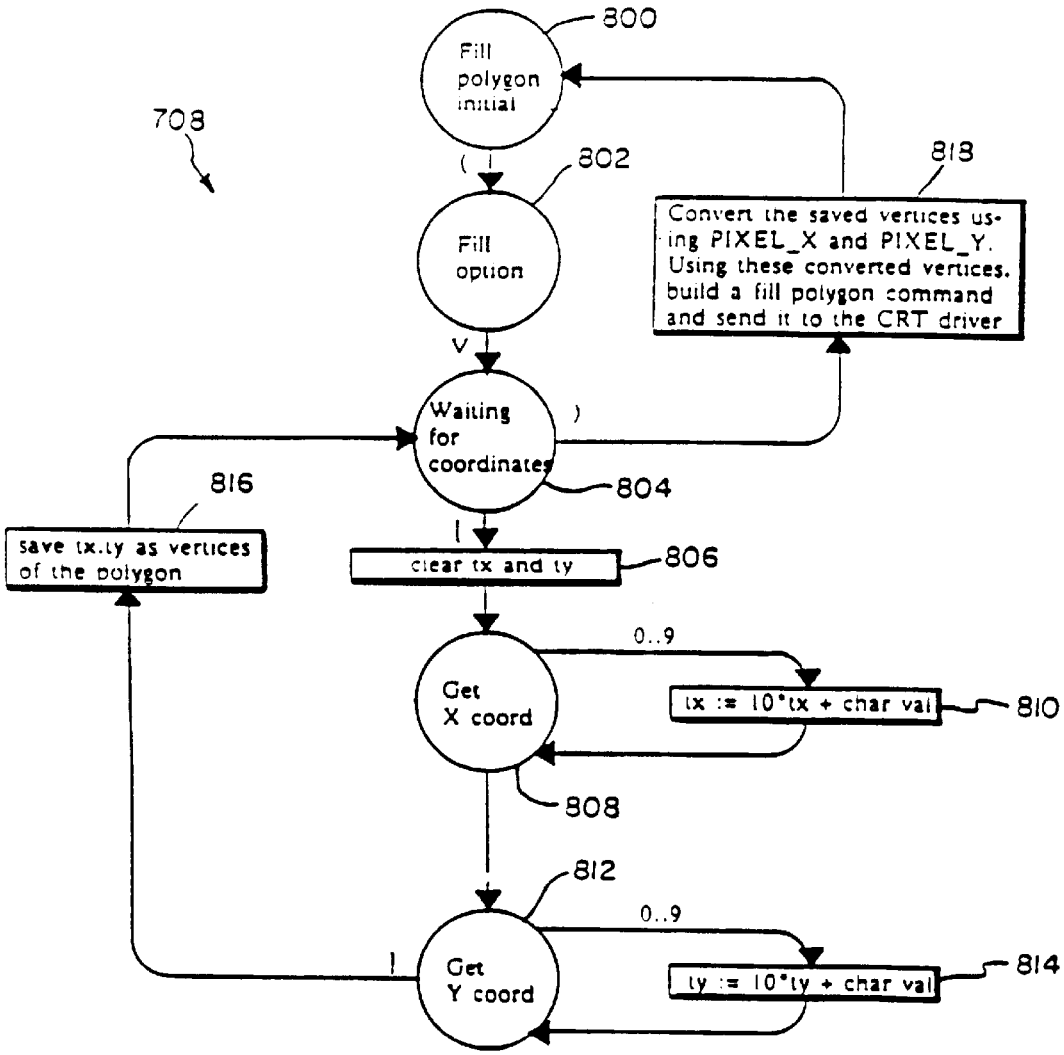

A state diagram of the fill polygon state 708 of FIG. 21 is shown in FIG. 22d. The fill polygon state diagram 708 causes a polygon to be constructed, the polygon being defined by a variable number of vertices. The polygon is constructed by drawing a line from the current cursor pixel position to a first vertex, a separate line connecting each pair of subsequent vertices, and a line connecting the last vertex to the original cursor position so that the polygon is enclosed. The state diagram 708 recognizes the character string "F(V[X1, Y1][X2, Y2] . . . [Xn, Yn])" and, in response, causes the corresponding polygon to be drawn on the CRT screen.

Now referring to FIG. 22d, the receipt of an "F" causes the transition to a fill polygon initial state 800 from the initial graphics state 700 shown in FIG. 21. Upon receipt of a left parenthesis, the program branches to a fill option state 802 where the program waits for the character "V" which indicates that the vertices from which the polygon is to be constructed follow. Upon receipt of the "[" character, the program clears the parameters tx and ty at step 806 and then branches to a state 808 in order to determine a pixel position specified by X.

As described above, while in state 808, the program receives the X parameter, branching to a step 810 each time a character is received to compute the tx value. When a comma is received, signalling the end of the characters specifying the X pixel position, the program transfers to a state 812 during which the Y pixel position is received. This state 812 operates in the same way as state 808, and thus at step 814 the value of the Y pixel position is computed and saved in ty.

The receipt of the "]" character signals the program that all ASCII numerals specifying the Y pixel position have been received, and the program thus branches to step 816, where the vertex specified by (tx, ty) is saved in memory. The program then branches back to state 804, at which point the next vertex will be received by repeating steps 806–816. The subsequent vertices are stored in memory in the order in which they were received. After the final vertex has been received and the program is in state 804, the right parenthesis ")" will be received. This signals the program that there are no more vertices that will be transmitted. Also, the last vertex transmitted will always coincide with the original cursor pixel position so that the polygon drawn will define a closed area.

The polygon is drawn at step 818. At step 818, the original cursor position and each of the vertices is converted to the pixel format of the terminal 60 by calling the PIXEL_X and PIXEL_Y subroutines, and then a fill polygon command is constructed by specifying that a lines be drawn from the original cursor pixel position to the first vertex, between each pair of subsequent vertices, and between the last vertex and the original cursor position so that the polygon is enclosed. The fill polygon command is transmitted to the CRT driver 46 which displays the polygon on the CRT screen.

Figure 22E:
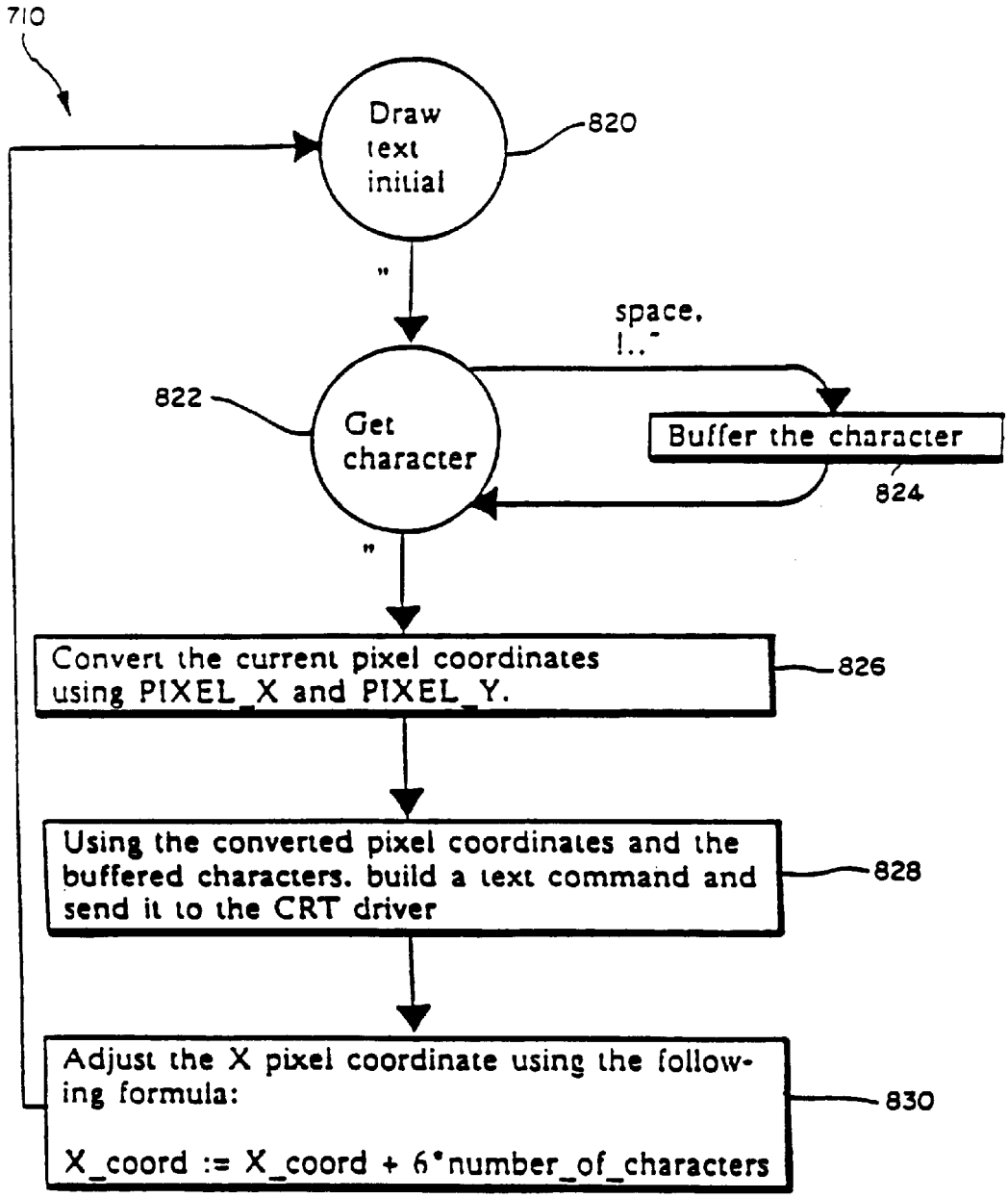

A state diagram of the draw text state 710 of FIG. 21 is shown in FIG. 22e. The draw text state 710 causes a specified text string to be display on the CRT screen at the current cursor pixel position. The state diagram recognizes a character string enclosed within quotation marks such as "Larry" and causes the character string to be displayed on the screen.

Now referring to FIG. 22e, the receipt of a "T" causes the program to transition to a draw text initial state 820 from the initial graphics state 700 shown in FIG. 21. Upon receipt of a first quotation mark, the program branches to a get character state 822 during which the characters between the quotation marks are received and temporarily stored in a buffer at step 824. Upon receipt of another quotation mark, signalling the end of the character string to be displayed, the program branches to a state 826, where the current cursor pixel position is converted, using the PIXEL_X and PIXEL_Y subroutines, to the pixel format of the terminal 60. Then at step 828, using the converted pixel coordinates and the buffered character, a text command is sent to the CRT driver 46 which causes the specified character string to be displayed on the screen. The program then branches to step 830 at which point the current X cursor pixel position is increased in accordance with the following equation:

$$X_coord=X_coord+6*number_of_characters,$$

where X_coord is the cursor pixel position, the number 6 is the width in pixels of each character displayed, and number_of_characters is the number of characters that was displayed on the CRT screen.

Another feature of the invention is an automatic login feature that allows an operator to be automatically logged in to an application program being run by the host computer upon the start of execution of the application program.

In a conventional computer system, before an operator may gain access to a particular application program, he is required to login by providing a username and in some instances a password. In the context of the present invention, each time an operator wants to show a display containing an application window that is not logged in, he would have to login by providing a username and a password.

The automatic login feature of the present invention saves operator time by causing a predetermined node address, username and password to be transmitted to the host computer 64 without the need for the operator to enter such information via the keyboard of the terminal. Referring to FIG. 6, the application window display element 128 shown at the right-hand portion includes the memory location 144 for the node address of the host computer 64 on which the application window program is to be run, the memory location 146 for the username, and the memory location 148 for the password. These memory locations are included for the application window element 128 only if the automatic login feature is desired. If these predetermined memory locations are provided, the operator will be automatically logged in to the application program without being tested for his username or a password.

Figure 24:
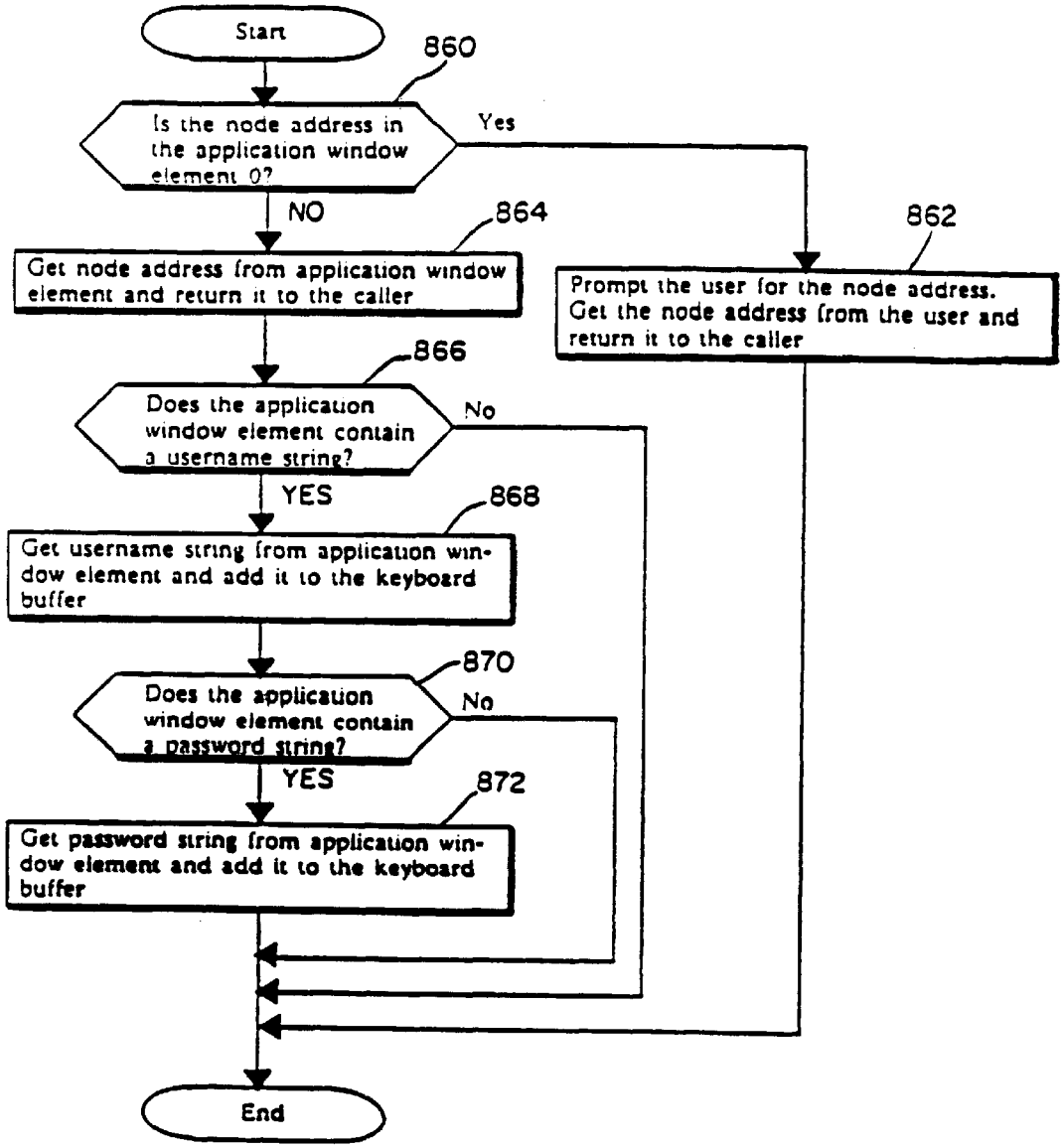
FIG. 24 is a flowchart of an automatic login process in accordance with the present invention.

A flowchart of an automatic logic process utilized by the present invention is shown in FIG. 24. At step 860, the program determines whether the node address of the application window element equals zero. If it does, indicating that the automatic login feature of the invention is not being used with this particular application window, then the program branches to step 862 where the operator is prompted for the node address since one was not provided. The program then ends.

At step 864, since a node address was provided, the program gets the node address from the application window element 128 and sends it to the caller, which is the sequencer 330 shown in FIG. 14. Referring back to FIG. 24, the program then branches to step 866 where the program determines whether the window element contains a username character string. If it does not, meaning that the automatic login feature is not currently being used for this window, then the program ends. Otherwise, at step 868, the username is retrieved from the application window element and placed in the keyboard buffer of the CRT terminal 60 for transmission to the host computer 64. This act of automatically placing the username in the keyboard buffer has the same effect as if the operator had typed in the username himself.

The program then branches to step 870 where the program determines whether the window element contains a password character string. If it does not, meaning that the automatic login feature is not currently being used for this window, then the program ends. Otherwise, at step 872, the password is retrieved from the application window element and placed in the keyboard buffer of the CRT terminal 60 for transmission to the host computer 64. This act of automatically placing the password in the keyboard buffer has the same effect as if the operator had typed in the password himself.

After the username and password are transmitted to the host computer 64, they are compared to predetermined login information including a username and password to determine whether access to the computer program should be granted. Since the automatic login feature of the invention is designed to automatically allow operator access to an application program, the login information stored in the display element should always match the predetermined login information. Upon the determination that the corresponding login information matches, the operator will be automatically logged in to the application program, which is then run by the host computer with input from the operator.

Modifications and alternative embodiments of the invention will be apparent to those skilled in the art in view of the foregoing description. Accordingly, this description is to be construed as illustrative only, and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A process control terminal for allowing an operator to perform process control functions and application functions in addition to the process control functions, said process control terminal reserving a predetermined screen portion for process control information to eliminate the possibility that process control alarms will not appear on the screen and thus not be brought to the attention of a process control operator, said process control terminal comprising:

a processor;

a bus connected to said processor;

a display terminal connected to said bus, said display terminal having a screen;

a process control network controller connected to said bus for allowing process control information to be received from a process controller;

a host network controller connected to said bus for allowing application information to be received from a host computer and for allowing application information to be transmitted to a host computer;

first means for periodically determining the existence of an alarm condition, said first means causing an alarm indication to be generated in a first predetermined portion of said screen, said first predetermined portion of said screen being reserved for process control information only; and second means for causing said application information to be displayed on said screen, said second means including means for preventing said application information to be displayed on said first predetermined portion of said screen reserved for said process control information, said preventing means causing said application information to be displayed on a second predetermined portion of said screen to ensure that said process control information cannot be overwritten by said application information thus causing a process control operator monitoring said screen to miss an alarm condition.

2. A process control terminal as defined in claim 1 wherein said alarm indication comprises an alarm message.

3. A process control terminal as defined in claim 1 wherein attention messages are displayed in said first predetermined portion of said screen.

4. A process control terminal as defined in claim 1 wherein said means for preventing said application information to be displayed on said first predetermined screen portion comprises means for adding a predetermined screen offset to application information that is intended for display on said screen.

5. A process control terminal as defined in claim 4 wherein said predetermined screen offset corresponds to 90 pixels.

6. A process control terminal comprising:

display means for displaying information;

first means, coupled to said display means, for receiving process control information from a process controller;

second means, coupled to said display means, for transmitting application information to and receiving application information from a host computer;

alarm means, coupled to said display means, for determining the existence of an alarm condition; and display generation means for causing visual information to be displayed on said display means, said display generation means causing an alarm indication to be displayed only in a first predetermined portion of said display means, said display generation means causing said application information to be displayed in a second predetermined portion of said display means to ensure that said process control information cannot be overwritten by said application information thus causing a process control operator monitoring said display means to miss an alarm condition.

7. A process control terminal as defined in claim 6 wherein said application information is unrelated to said process control information.

8. A process control terminal as defined in claim 6 wherein said display generation means includes means for adding a predetermined screen offset to application information that is intended for display on said display means.

9. A process control terminal comprising:

a display screen;

a controller that receives process control information from a process controller and application information from a host computer, said controller determining the existence of an alarm condition; and a display generator that causes visual information to be displayed on said display screen, said display generator causing an alarm indication to be displayed in a first predetermined portion of said display screen and said application information to be displayed only in a second predetermined portion of said display screen to ensure that said alarm indication cannot be overwritten by said application information thus causing a process control operator monitoring said display screen to miss an alarm condition.

10. A process control terminal as defined in claim 9 wherein said controller comprises:

a process network controller that receives process control information from a process controller;

a bus connected to said process controller;

a host network controller coupled to said bus, said host network controller transmitting application information to a host computer and receiving application information from a host computer; and a processor coupled to said bus, said processor determining the existence of an alarm condition.

11. A process control terminal as defined in claim 9 wherein said display generator comprises a display interpreter and a display driver.

12. A process control terminal as defined in claim 9 additionally comprising a memory containing a first database in which process control information is stored.

13. A process control terminal as defined in claim 12 wherein said memory contains a second database in which electronic information relating to at least one display is stored.

14. A process control terminal as defined in claim 9 wherein said application information is unrelated to said process control information.

15. A process control terminal for allowing an operator to perform process control functions and application functions, said process control terminal emulating a preexisting terminal to facilitate the use of said process control terminal in preexisting computer systems, said process control terminal comprising:

a display screen;

a controller than receives process control information from a process controller and application information from a host computer, said controller determining the existence of an alarm condition; and a display generator that causes visual information to be displayed on said display screen, said display generator causing an alarm indication to be displayed in a first predetermined portion of said display screen and application information to be displayed only in a second predetermined portion of said display screen said display generator responding to application information received from a host computer by moving a cursor displayed on said screen up in response to the receipt of the character "A" from a host computer and moving the cursor displayed on said screen down in response to the receipt of the character "B" from a host computer.

16. A process control terminal for allowing an operator to perform process control functions and application functions in addition to the process control functions, said process control terminal reserving a predetermined screen portion for process control information to eliminate the possibility that process control alarms will not appear on the screen and thus not be brought to the attention of a process control operator, said process control terminal emulating a preexisting terminal to facilitate the use of said process control terminal in preexisting computer systems, said process control terminal comprising:

a processor;

a bus connected to said processor;

a display terminal connected to said bus, said display terminal having a screen;

a process control network controller connected to said bus for allowing process control information to be received from a process controller;

a host network controller connected to said bus for allowing application information to be received by a host computer and for allowing application information to be transmitted to a host computer;

first means for periodically determining whether there is an alarm condition, said first means causing an alarm indication to be generated in a first predetermined portion of said screen reserved for process control information, said first means comprising:

a process network driver than periodically determines whether there is an alarm condition, said process network driver generating a list of alarm conditions;

an alarm process that generates an electronic alarm signal in response to finding an alarm condition; and a display driver for receiving said electronic alarm signal from said alarm process, said display driver causing a visual alarm message corresponding to said electronic alarm signal to appear on said screen to alert a process control operator to the existence of an alarm condition; and second means for causing said application information to be displayed on said screen, said second means including means for preventing said application information to be displayed in said first predetermined portion of said screen reserved for said process control information, said preventing means causing said application information to be displayed only on a second predetermined portion of said screen to ensure that said alarm indication cannot be overwritten by said application information thus causing a process control operator monitoring said screen to miss an alarm condition, said second means responding to application information received from a host computer by moving a cursor displayed on said screen up in response to the receipt of the character "A" from a host computer, moving the cursor on said screen down in response to the receipt of the character "B" from a host computer, erasing from said screen a portion of a line of text in response to the receipt of the character "K" from a host computer, deleting from said screen a portion of a line of text in response to the receipt of the character "M" from a host computer, and drawing a curve on said screen in response to the receipt of a character string including the character "C" from a host computer.

17. A method of displaying process control information in a first predetermined portion of a screen and application information in a second predetermined portion of the screen, said method comprising the steps of:

(a) receiving process control information from a process controller;

(b) determining the existence of an alarm condition;

(c) displaying process control information relating to said alarm condition in a first portion of a display screen;

(d) receiving application information from a host computer, said application information being unrelated to said process control information; and (e) displaying said application information only in a second portion of the display screen.

18. A method of displaying process control information in a first predetermined portion of a screen and application information in a second predetermined portion of the screen, said method emulating the method of displaying application information used by a preexisting terminal, said method comprising the steps of:

(a) receiving process control information from a process controller;

(b) determining the existence of an alarm condition;

(c) displaying process control information relating to said alarm condition in a first portion of a display screen;

(d) receiving application information from a host computer; and (e) displaying said application information only in a second portion of the display screen to ensure that said process control information cannot be overwritten by said application information thus causing a process control operator monitoring the display screen to miss an alarm condition, said step (e) comprising the steps of:

(f) moving a cursor on the display screen up in response to the receipt of the character "A" from a host computer;

(g) moving the cursor on the display screen down in response to the receipt of the character "B" from a host computer;

(h) erasing from the display screen a portion of a line of text in response to the receipt of the character "K" from a host computer; and (i) deleting from the display screen a portion of a line of text in response to the receipt of the character "M" from a host computer.

19. A method of displaying process control information in a first predetermined portion of a screen and application information in a second predetermined portion of the screen, said method emulating the method of displaying application information used by a preexisting terminal, said method comprising the steps of:

(a) receiving process control information from a process controller;

(b) storing said process control information in a database in memory;

(c) determining the existence of an alarm condition;

(d) generating a list of all alarm conditions determined in said step (c);

(e) periodically searching said alarm list and generating an electronic alarm signal in response to an alarm condition in said alarm list;

(f) responding to said electronic alarm signal by generating a visual alarm indication in a first portion of a display screen;

(g) receiving application information from a host computer; and (h) displaying said application information only in a second portion of the display screen, said step (h) comprising the steps of:

(i) moving a cursor on the display screen up in response to the receipt of the character "A" from a host computer;

(j) moving the cursor on the display screen down in response to the receipt of the character "B" from a host computer;

(k) erasing from the display screen a portion of a line of text in response to the receipt of the character "K" from a host computer; and (l) deleting from the display screen a portion of a line of text in response to the receipt of the character "M" from a host computer.

20. A process control terminal with automatic login capability, comprising:

a display screen;

a keyboard means for receiving process control information from a process controller and application information from a host computer, said application information being generated by an application program;

means coupled to said receiving means for displaying said process control information in a first portion of said display screen and said application information only in a second portion of said display screen; and means for automatically logging in said application program without requiring an operator to enter login information via said keyboard.

21. A process control terminal as defined in claim 20 wherein said login information comprises a username and a password.

22. A process control terminal as defined in claim 20 wherein said means for automatically logging in said application program comprises a memory and means for accessing a predetermined portion of said memory to retrieve said login information.

23. A method of displaying process control information in a first predetermined portion of a screen and application information in a second predetermined portion of the screen, said method comprising the steps of:

(a) receiving process control information from a process controller;

(b) determining the existence of an alarm condition;

(c) displaying process control information relating to said alarm condition in a first portion of a display screen;

(d) receiving application information from a host computer;

(e) display said application information in a second portion of the display screen; and (f) keeping said first portion of said display screen separate from said second portion of said display screen with the use of a predetermined screen offset to ensure that said process control information cannot be overwritten by said application information thus causing a process control operator monitoring the display screen to miss an alarm condition.

*24. A process control terminal for allowing an operator to perform process control functions and application functions in addition to the process control functions, the process control terminal reserving a screen portion for process control information to avoid a possibility that process control alarms will not appear on the screen and thus not be brought to the attention of a process control operator, the process control terminal comprising:*

*a processor;*

*a bus connected to the processor;*

*a display terminal connected to the bus, the display terminal having a screen;*

*a process control network controller connected to the bus for allowing process control information to be received from a process controller;*

*a host network controller connected to the bus for allowing application information to be received from a host computer and for allowing application information to be transmitted to a host computer;*

*means for periodically determining the existence of an alarm condition based upon the process control information; and*

*means for causing process control information and application information to be displayed on the screen, the process control information including an alarm indi-*

*cation generated in response to the determining of the existence of an alarm condition and displayed on a predetermined portion of the screen, the process control information and the application information being displayed in a controlled manner so that application information displayed on the screen does not overwrite the alarm indication displayed on the predetermined portion of the screen so as to interfere with a process control operator's ability to monitor the alarm indication and thereby observe an occurrence of the alarm condition.*

*25. The process control terminal of claim 24 wherein the alarm indication comprises an alarm message.*

*26. The process control terminal of claim 24 wherein the means for causing process control information and application information to be displayed on the screen includes means for causing the process control information to be displayed in a first portion of the screen, and means for causing the application information to be displayed in a second portion of the screen.*

*27. The process control terminal of claim 26 wherein the means for causing process control information and application information to be displayed further comprises:*

*means for preventing the second portion of the screen from overlapping the first portion of the screen.*

*28. A process control terminal comprising:*

*a display screen;*

*a controller that receives process control information from a process controller and application information from a host computer, the controller determining the existence of an alarm condition; and*

*a display generator that causes visual information to be displayed on the display screen, the display generator causing an alarm indication and application information to be displayed on the display screen so that the alarm indication is displayed on a first predetermined portion of the display screen and the application information when it is displayed on the display screen does not overwrite the alarm indication displayed within the first predetermined portion and thereby interfere with a process control operator's ability to monitor the alarm indication and observe an occurrence of the alarm condition.*

*29. The process control terminal of claim 28 wherein the controller comprises:*

*a process network controller than receives process control information from a process controller;*

*a bus connected to the process controller;*

*a host network controller coupled to the bus, the host network controller transmitting application information to a host computer and receiving application information from a host computer; and*

*a processor coupled to the bus, the processor determining the existence of an alarm condition.*

*30. The process control terminal of claim 28 wherein the display generator comprises a display interpreter and a display driver.*

*31. The process control terminal of claim 28 and further comprising a memory containing a first database in which process control information is stored.*

*32. The process control terminal of claim 31 wherein the memory contains a second database in which electronic information relating to at least one display is stored.*

*33. The process control terminal of claim 28 wherein the application information is unrelated to the process control information.*

*34. A process control terminal for allowing an operator to perform process control functions and application functions, the process control terminal comprising:*

*a display screen;*

*a controller that receives process control information from a process controller and application information from a host computer, the controller determining the existence of an alarm condition based upon the process control information; and*

*a display generator which causes visual information to be displayed on the display screen, the display generator causing an alarm indication to be displayed on a predetermined portion of the display screen in response to the controller determining the existence of an alarm condition, and causing application information to be displayed on the display screen so that both the alarm indication and the application information are visible to a process control operator, and so that the application information will not bury the alarm indication displayed on the predetermined portion of the display screen and thereby interfere with the process control operator's monitoring of the display screen for the alarm indication.*

*35. A process control terminal comprising:*

*display means for displaying information;*

*first means for receiving process control information from a process controller;*

*second means for transmitting application information to and receiving application information from a host computer;*

*alarm means, coupled to the first means, for determining the existence of an alarm condition based upon the process control information; and*

*display generation means, coupled to the first means, the second means and the alarm means, for causing visual information to be displayed on the display means, the display generation means causing an alarm indication and application information to be displayed so that the application information displayed does not overwrite a predetermined portion of the display means displaying the alarm indication so as to interfere with a process control operator's ability to monitor the alarm indication and observe an occurrence of the alarm condition.*

*36. A method of displaying process control information and application information, the method comprising:*

*receiving process control information from a process controller;*

*determining the existence of an alarm condition based upon the process control information;*

*displaying process control information relating to the alarm condition on the screen;*

*receiving application information from a host computer, the application information being unrelated to the process control information; and*

*displaying the application information and the process control information on the display separate portions of screen when displayed simultaneously so that displaying of the application information does not cause the process control information displayed in a first predetermined portion of the screen to disappear from the display screen and thereby interfere with a process control operator's ability to monitor the process control information and observe the occurrence of the alarm condition.*

*37. A process control terminal comprising:*

*a display screen;*

*a controller that receives process control information from a process control network and application information from a local area network, the controller determining the existence of an alarm condition based upon the process control information;*

*a display generator that causes visual information to be displayed on the display screen, the display generator causing an alarm indication and application information to be displayed simultaneously on separate portions of the display screen so that the alarm information displayed does not bury the alarm indication displayed on a predetermined portion of the display screen and thereby interfere with a process control operator's ability to monitor the alarm indication and observe an occurrence of the alarm condition.*

*38. The process control terminal of 37 wherein the controller comprises:*

*a process network controller that receives process control information from the process control network;*

*a bus connected to the process network controller;*

*a local area network controller coupled to the bus, the local area network controller transmitting application information to and receiving application information from the local area network; and*

*a processor coupled to the bus, the processor determining the existence of an alarm condition.*

*39. The process control terminal of claim 37 wherein the display generator comprises a display interpreter and a display driver.*

*40. The process control terminal of claim 37 wherein the process control terminal further comprises a memory containing a first database in which process control information is stored.*

*41. The process control terminal of claim 40 wherein the memory contains a second database in which electronic information relating to at least one display is stored.*

*42. A process control terminal comprising:*

*a display screen;*

*a controller that receives process control information from a process control network and application information from a local area network, the controller determining the existence of an alarm condition based upon the process control information;*

*means for causing process control information to be displayed on a first predetermined portion of the display screen;*

*means for causing application information to be displayed on the display screen; and*

*means for preventing burying of the displayed process control information in the first predetermined portion of the display screen by the displayed application information, thus ensuring that alarm indications are fully visible and readily accessible to a process control operator.*

*43. A process control terminal comprising:*

*a display screen;*

*a controller that receives process control information from a process control network and application information from a local area network, the controller determining the existence of an alarm condition based upon the process control information;*

*means for causing application information to be displayed on the display screen in an application window and process control information to be displayed on the display screen in a process control window reserved exclusively for process control information; and*

*means for preventing burying of the process control window by the application window so that process control information indicating the existence of an alarm condition is fully visible and readily accessible to a process control operator.*

*44. A process control terminal at which a process control operator can perform both process control functions and application functions, the process control terminal including a display screen upon which both process control information from a process control network and application information from a local area network can be displayed, the process control terminal including means for reserving a screen portion exclusively for process control information so that process control information and application information can be displayed simultaneously while avoiding a possibility that displayed process control alarms will be buried by displayed application information and thus not be brought to the attention of the operator.*

*45. A process control terminal comprising:*

*a display screen;*

*a controller that receives process control information from a process controller and application information from a host computer, the controller detecting the existence of an alarm condition; and*

*a display generator that causes visual information representing the process control information and the application information to be displayed on the display screen, the display generator causing an alarm indication representing the alarm condition to be displayed on a first portion of the display screen reserved for the alarm indication so that the application information when displayed appears in portions of the display screen other than the first portion and cannot make the alarm indication disappear from the display screen and thereby interfere with a process control operator's ability to monitor the alarm indication and observe an occurrence of the alarm condition.*

*46. A method of displaying process control information and application information, the method comprising:*

*receiving process control information from a process controller;*

*receiving application information from a host computer;*

*detecting the existence of an alarm condition based upon the process control information; and*

*displaying the application information, the process control information, and an alarm indication representing the alarm condition so that the alarm indication is displayed on a first portion of the display screen and the displaying of the application information cannot make the alarm indication disappear from the first portion of the display screen and thereby interfere with a process control operator's ability to monitor the alarm indication and observe the occurrence of the alarm condition.*

*47. A process control terminal comprising:*

*a display screen capable of displaying process control information and application information;*

*means for detecting the existence of an alarm condition based upon the process control information; and*

*display generator means for causing process control information and application information to be displayed on the display screen and for causing an alarm*

*indication representing the alarm condition to be displayed on a predetermined portion of the display screen so that the application information displayed cannot cause the alarm indication to disappear from the predetermined portion of the display screen and thereby interfere with a process control operator's ability to monitor the alarm indication and observe an occurrence of the alarm condition.*

*48. A process control terminal for allowing an operator to perform process control functions and application functions in addition to the process control functions, the process control terminal reserving a predetermined screen portion for process control information to eliminate the possibility that process control alarms will not appear on the screen and thus not be brought to the attention of a process control operator, said process control terminal comprising:*

*a processor;*

*a bus connected to the processor;*

*a display terminal connected to the bus, the display terminal having a screen;*

*a process control network controller connected to said bus for allowing process control information to be received from a process controller;*

*a host network controller connected to said bus for allowing application information to be received from a host computer and for allowing application information to be transmitted to a host computer;*

*first means for periodically determining the existence of an alarm condition, said first means causing an alarm indication to be generated in a first predetermined portion of said screen; and*

*second means for causing said application information to be displayed on said screen, said second means including means for preventing said application information to be displayed on said first predetermined portion of said screen, said preventing means causing said application information to be displayed on said screen to ensure that said process control information cannot be overwritten by said application information thus causing a process control operator monitoring said screen to miss an alarm condition.*

*49. A method of displaying process control information in a first portion of a screen and application information in a second portion of the screen, said method comprising the steps of:*

*(a) receiving process control information from a process controller;*

*(b) determining the existence of an alarm condition;*

*(c) displaying process control information relating to said alarm condition in a first portion of a display screen;*

*(d) receiving application information from a host computer;*

*(e) displaying said application information in a second portion of the display screen; and*

*(f) keeping said first portion of said display screen separate from said second portion of said display screen to ensure that said process control information cannot be overwritten by said application information thus causing a process control operator monitoring the display screen to miss an alarm condition.*

* * * * *

UNITED STATES PATENT AND TRADEMARK OFFICE

CERTIFICATE OF CORRECTION

PATENT NO. : RE 38,640 E
DATED : October 26, 2004
INVENTOR(S) : Larry O. Jundt

It is certified that error appears in the above-identified patent and that said Letters Patent is hereby corrected as shown below:

Column 31,
Line 32, delete “than”, insert -- that --.

Column 32,
Line 10, delete “than”, insert -- that --.

Column 37,
Line 12, delete “alarm”, insert -- application --.

Column 38,
Line 35, after “information”, insert -- , --.
Line 36, after “displayed”, insert -- , --.

Signed and Sealed this

Twenty-fifth Day of October, 2005

JON W. DUDAS
*Director of the United States Patent and Trademark Office*